June 23, 1953 B. A. WITTKUHNS ET AL 2,642,784
MACHINE FOR MAKING PAPER CONTAINERS
Filed April 6, 1949 31 Sheets-Sheet 1

INVENTORS
BRUNO A. WITTKUHNS
H. GEORGE D. NUTTING
BY GILBERT F. HILL
Austin, Wilhelm + Carlson
ATTORNEYS.

INVENTORS
BRUNO A. WITTKUHNS
H. GEORGE D. NUTTING
GILBERT F. HILL
BY Austin, Wilhelm & Carlson
ATTORNEYS.

INVENTORS
BRUNO A. WITTKUHNS
H. GEORGE D. NUTTING
GILBERT F. HILL
BY Austin, Wilhelm & Carlson
ATTORNEYS.

June 23, 1953  B. A. WITTKUHNS ET AL  2,642,784
MACHINE FOR MAKING PAPER CONTAINERS
Filed April 6, 1949  31 Sheets-Sheet 9

INVENTORS.
BRUNO A. WITTKUHNS
H. GEORGE D. NUTTING
GILBERT F. HILL
BY Austin, Wilhelm & Carlson
ATTORNEYS.

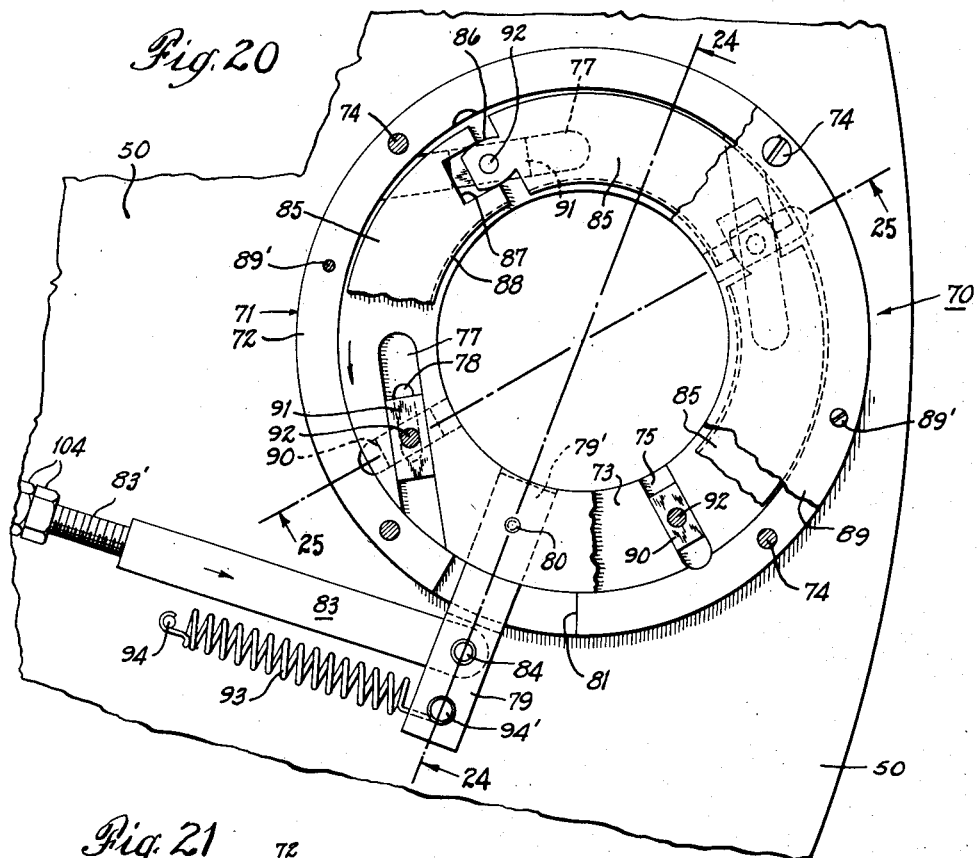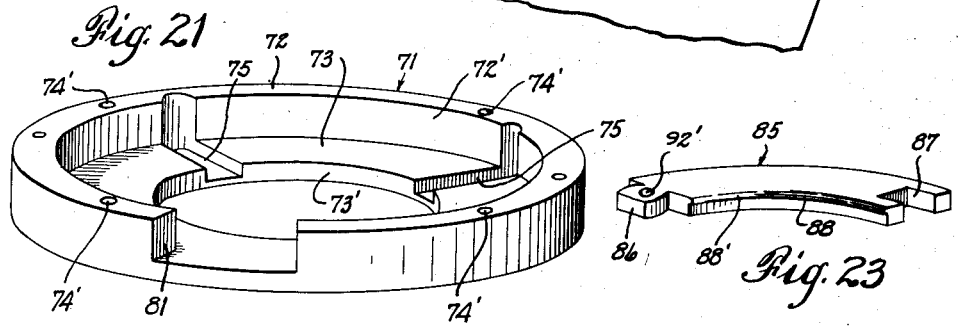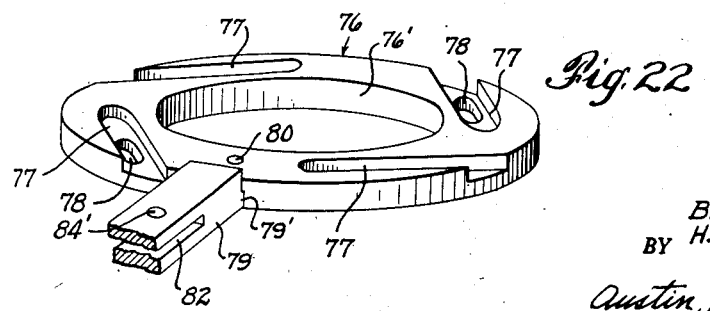

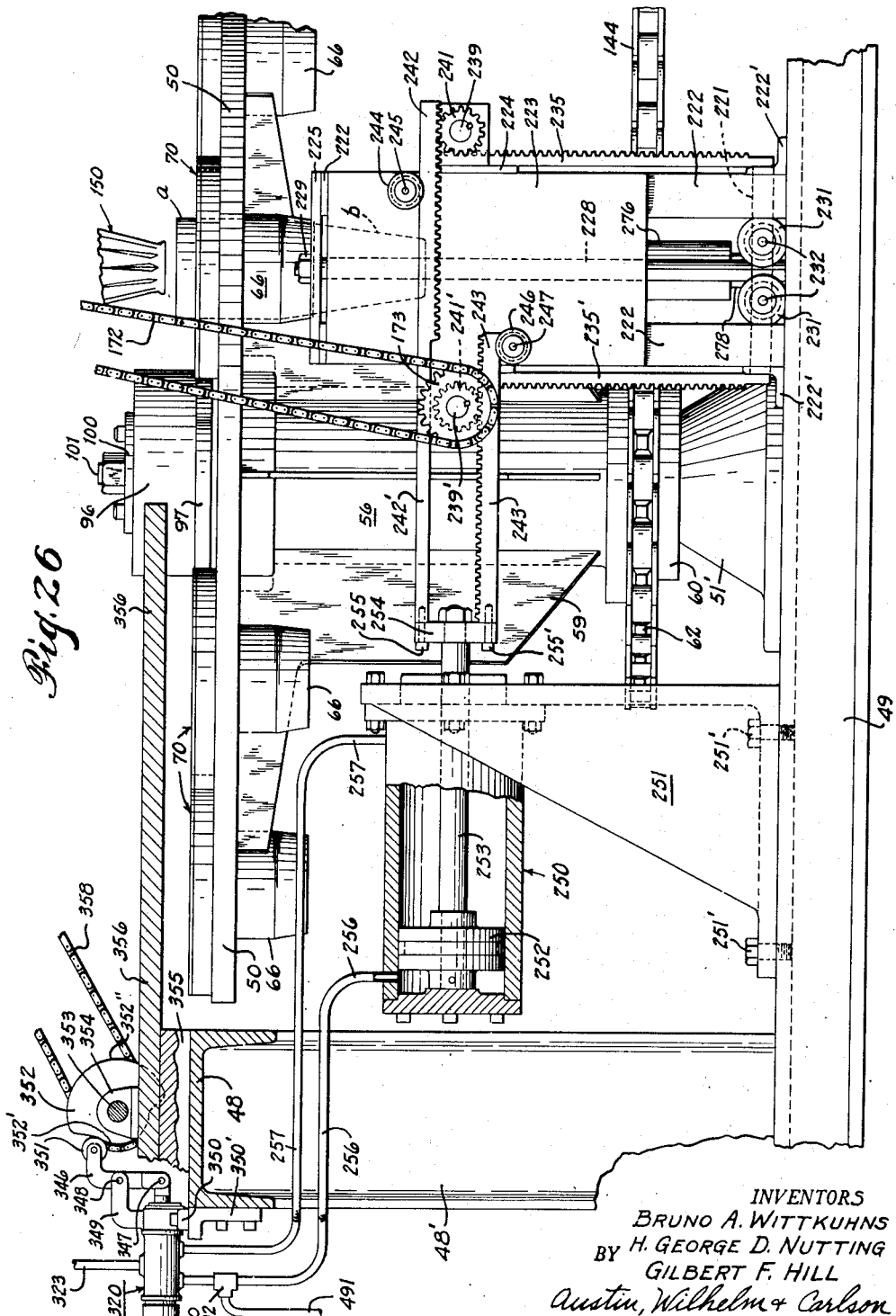

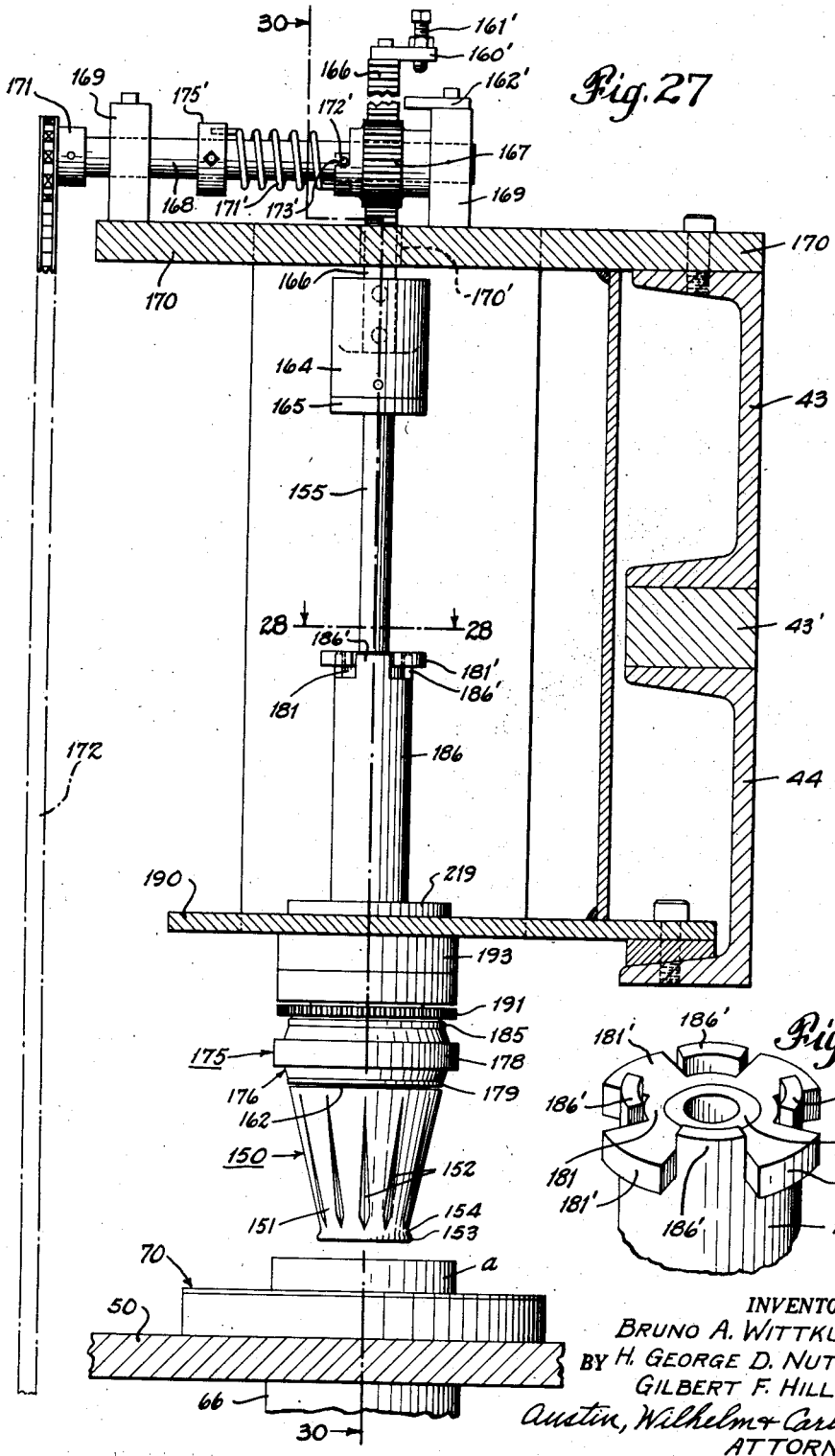

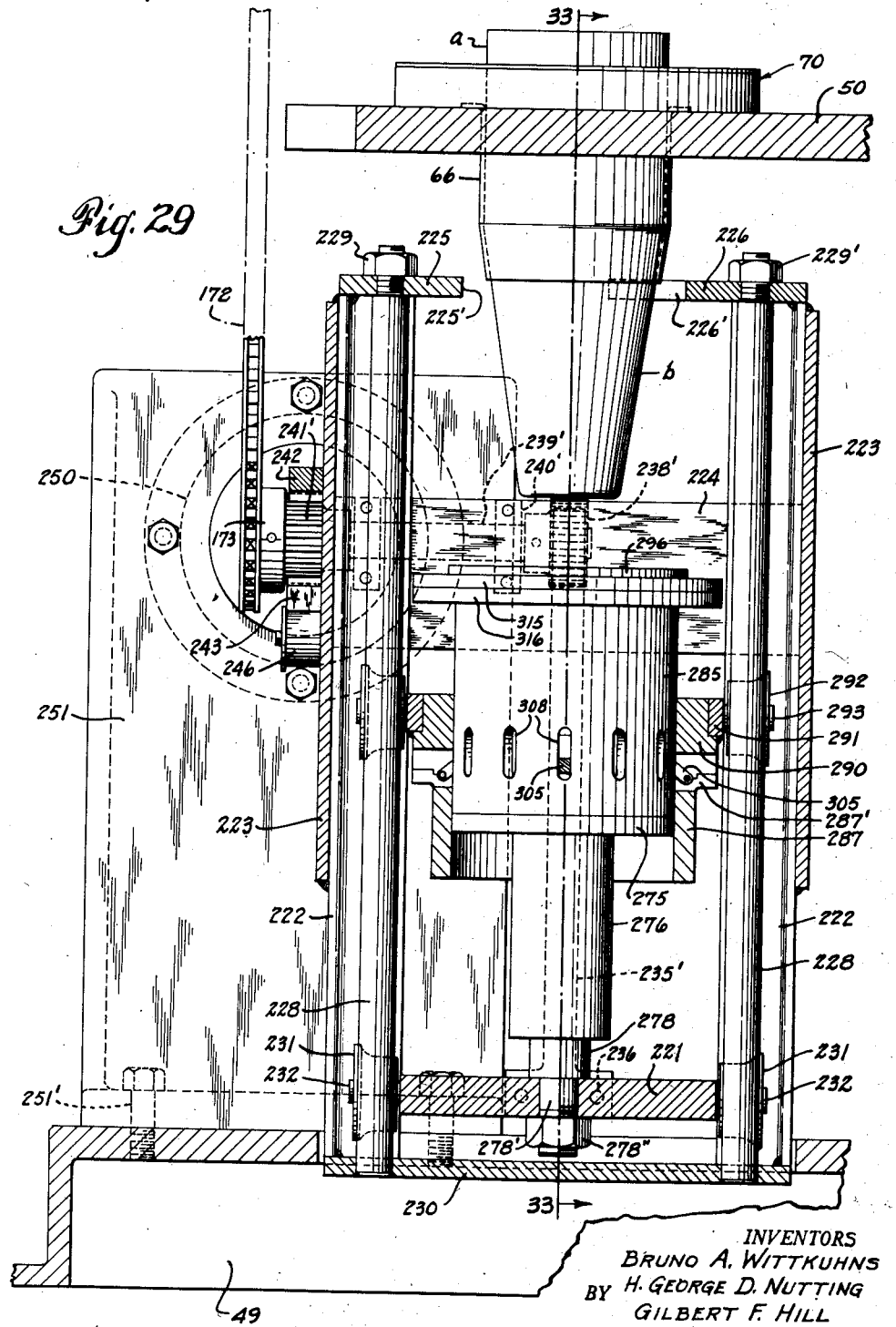

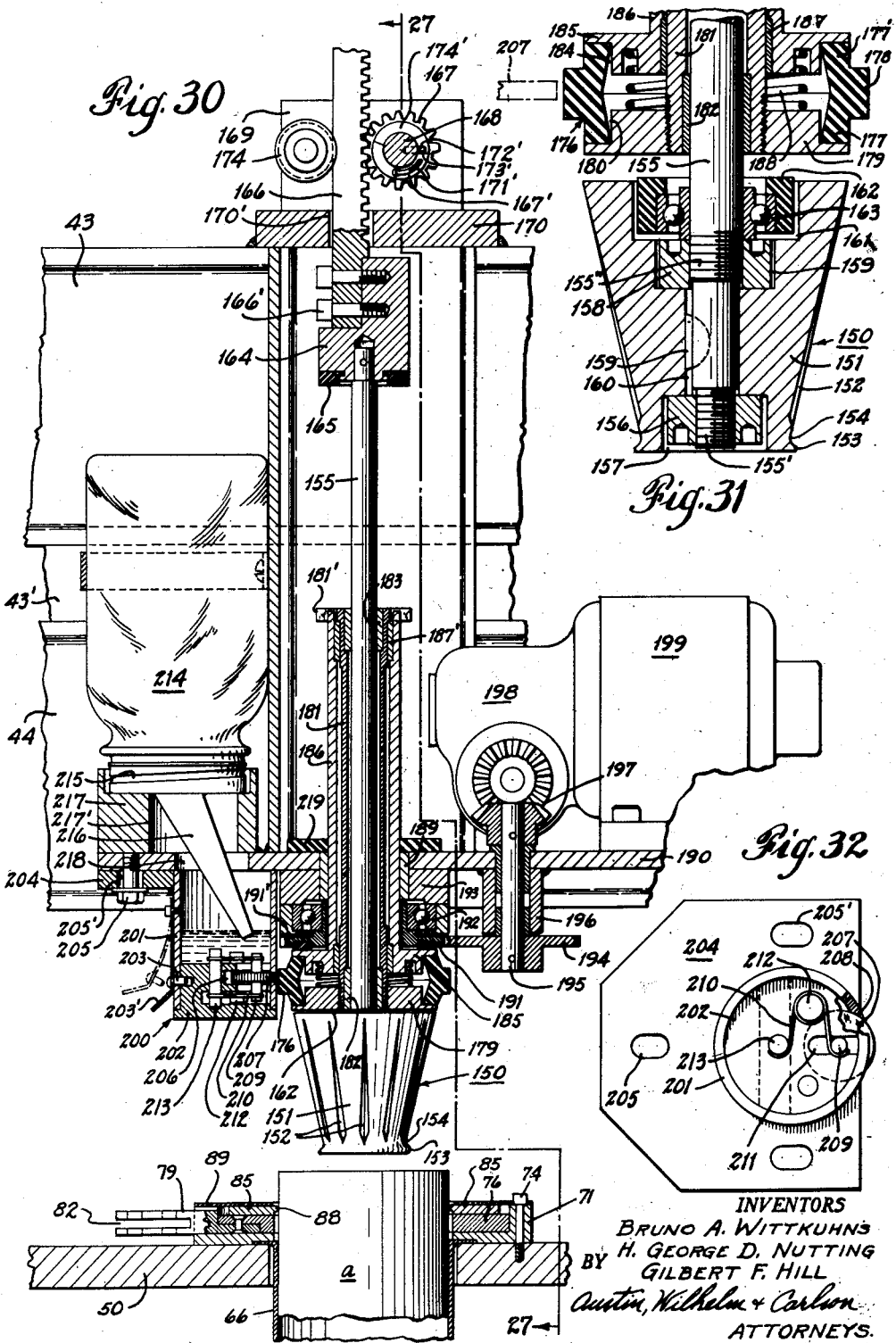

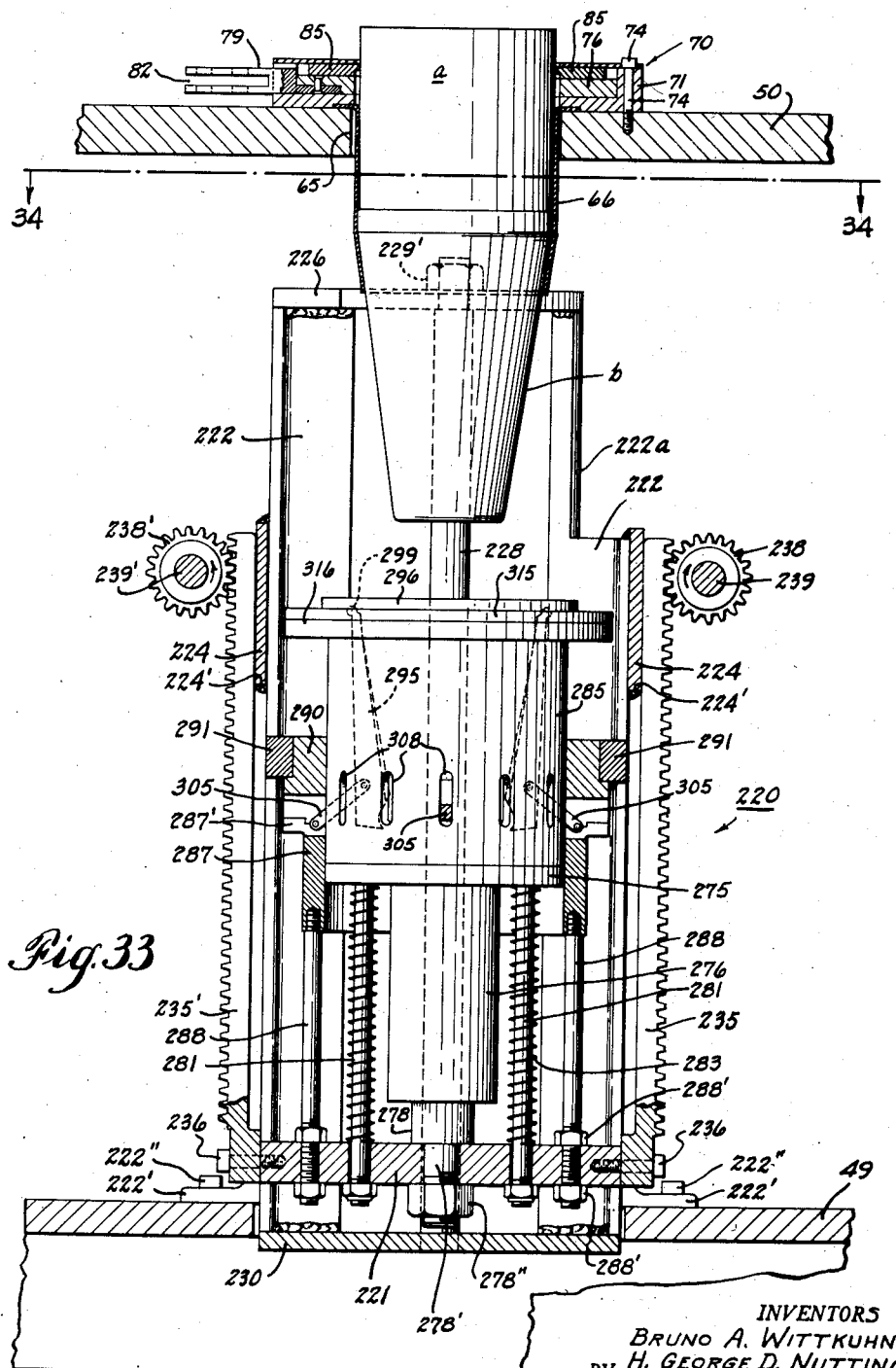

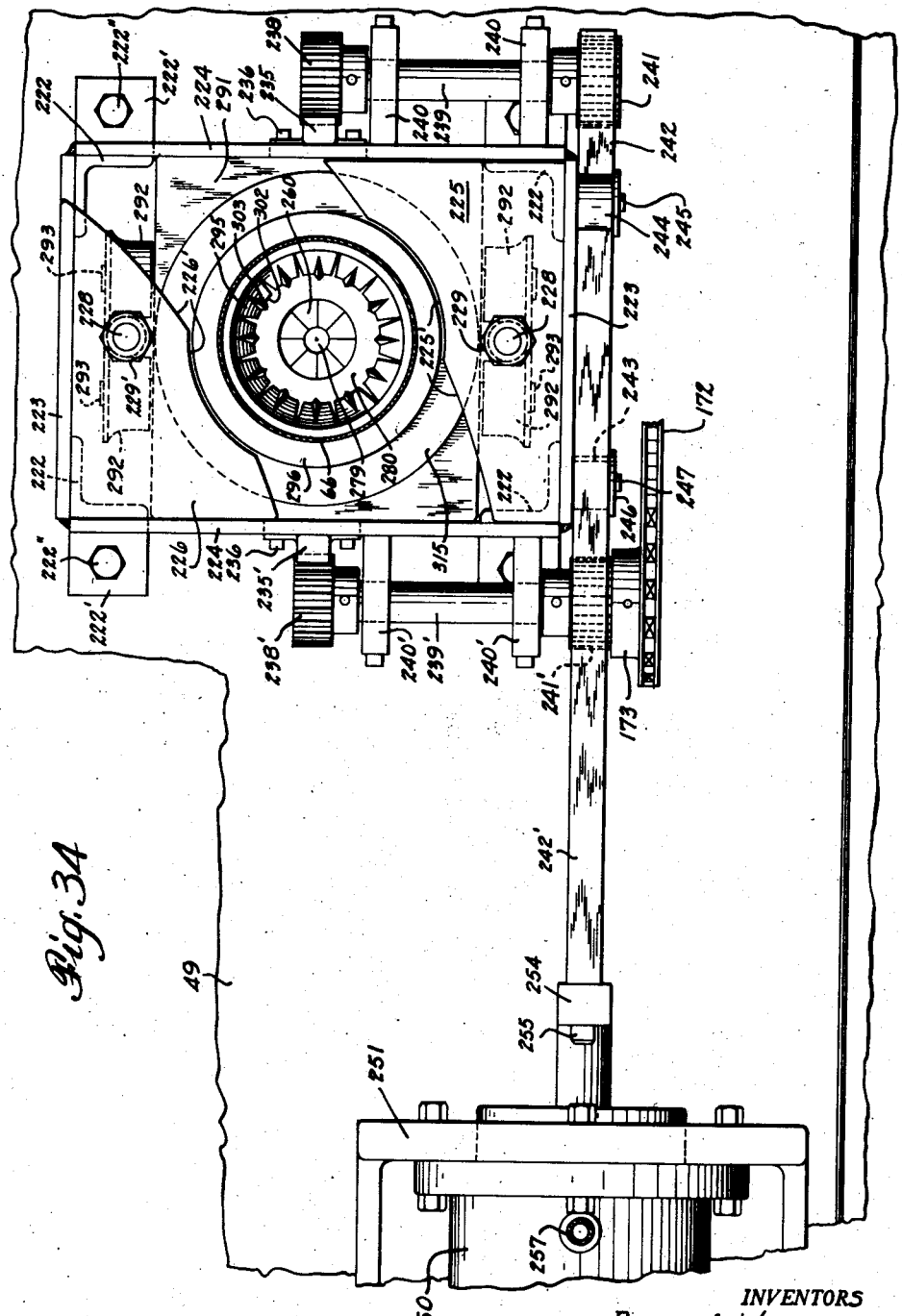

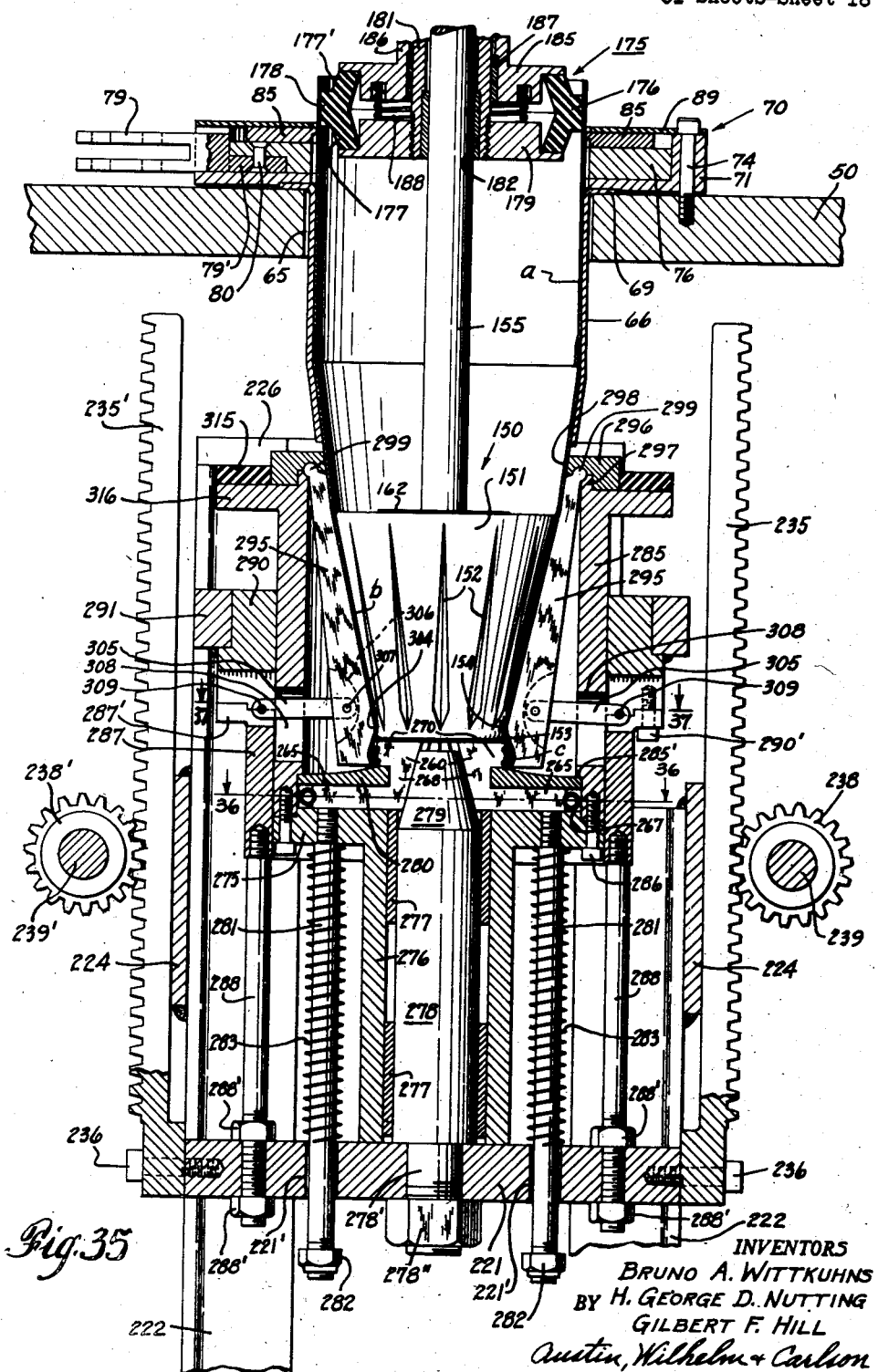

INVENTORS
BRUNO A. WITTKUHNS
BY H. GEORGE D. NUTTING
GILBERT F. HILL
Austin, Wilhelm + Carlson
ATTORNEYS

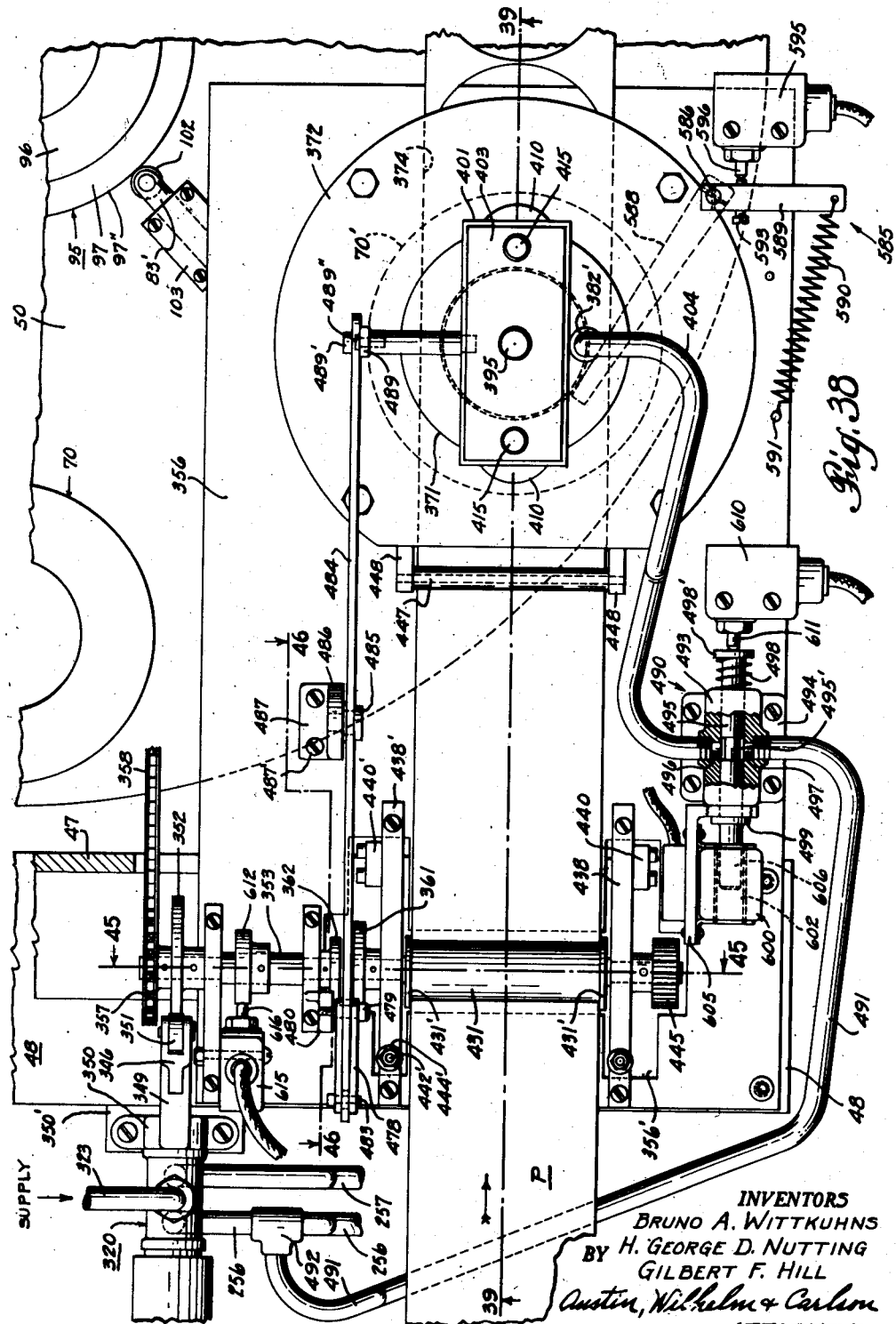

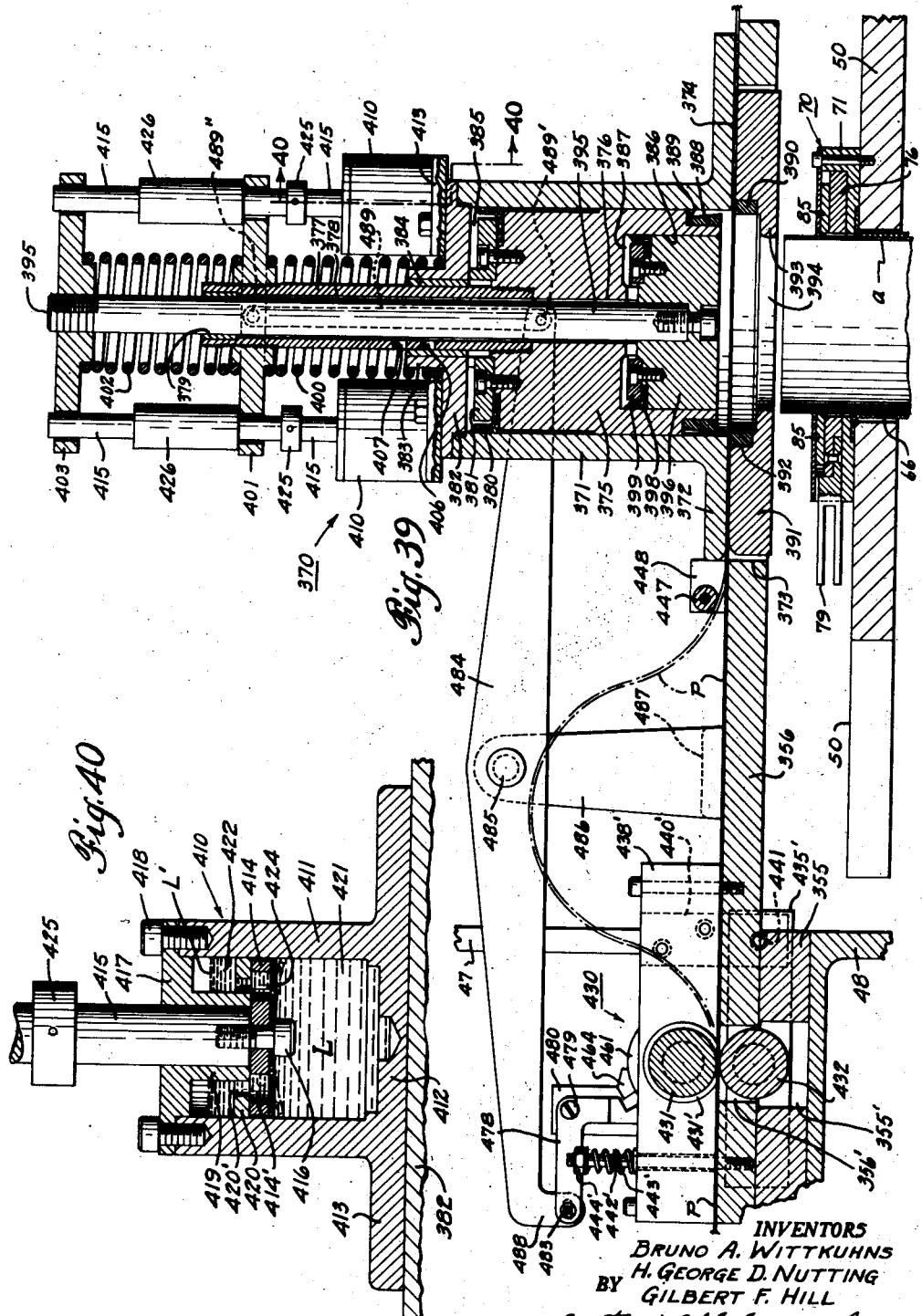

INVENTORS
BRUNO A. WITTKUHNS
H. GEORGE D. NUTTING
GILBERT F. HILL
BY Austin, Wilhelm & Carlson
ATTORNEYS.

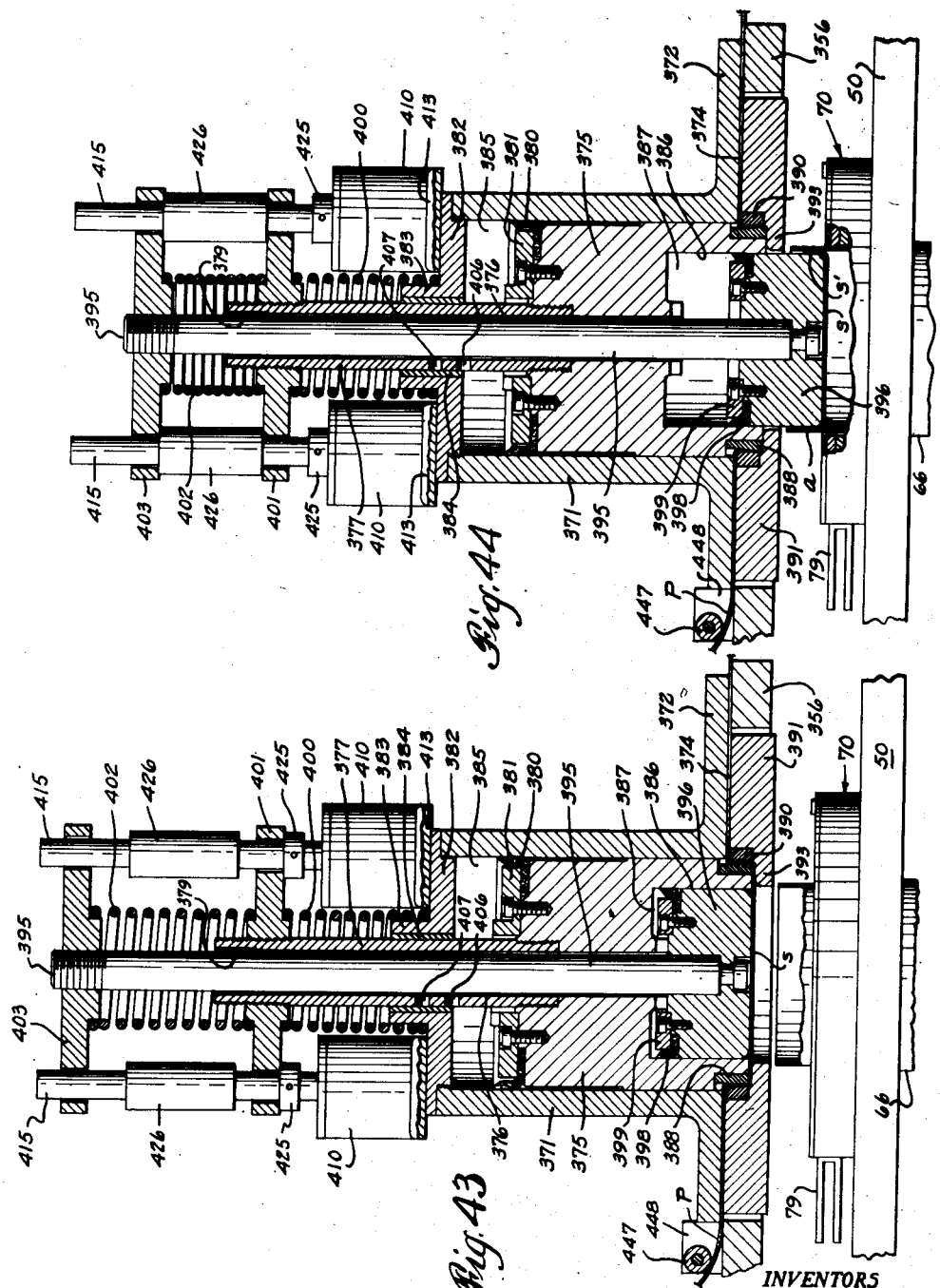

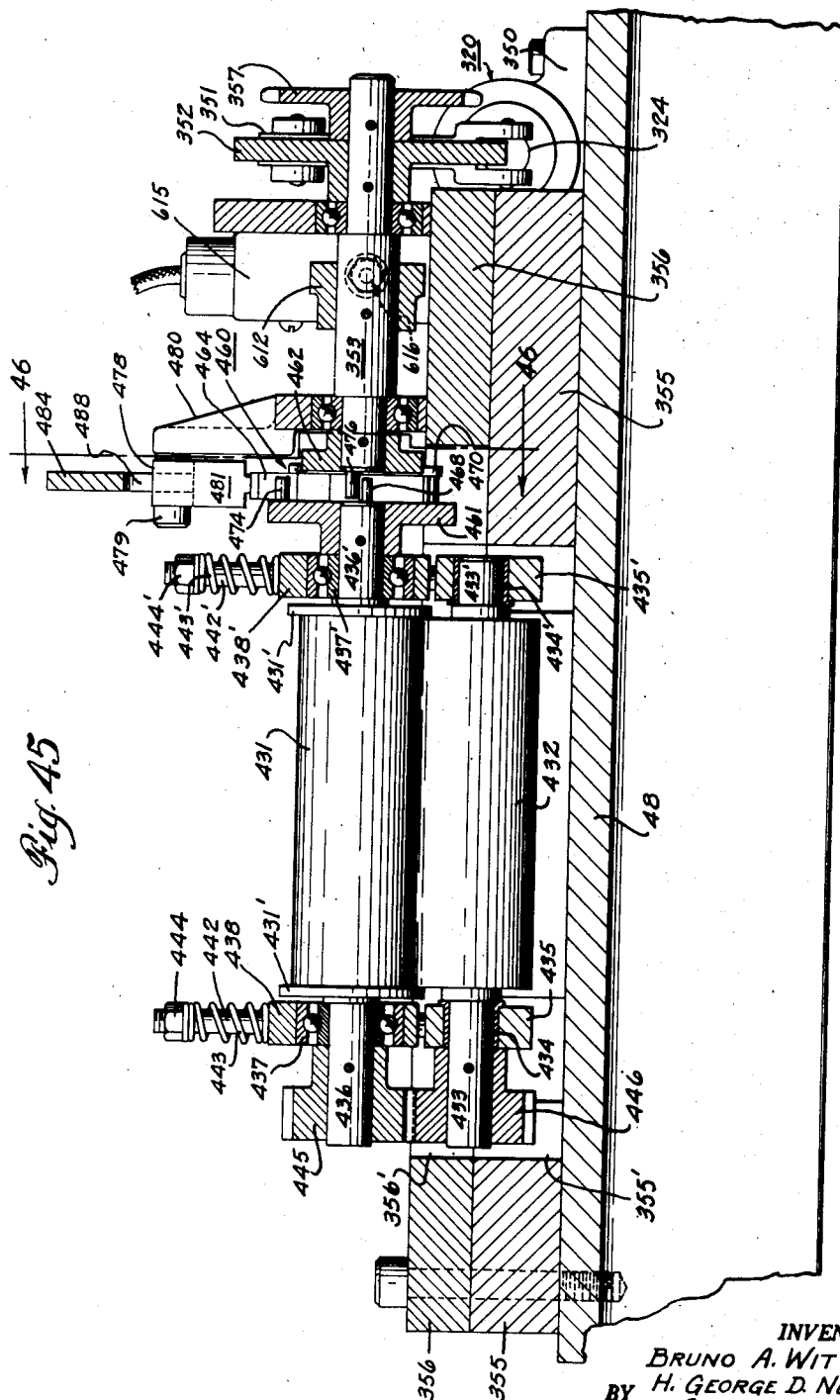

June 23, 1953  B. A. WITTKUHNS ET AL  2,642,784
MACHINE FOR MAKING PAPER CONTAINERS
Filed April 6, 1949  31 Sheets-Sheet 25
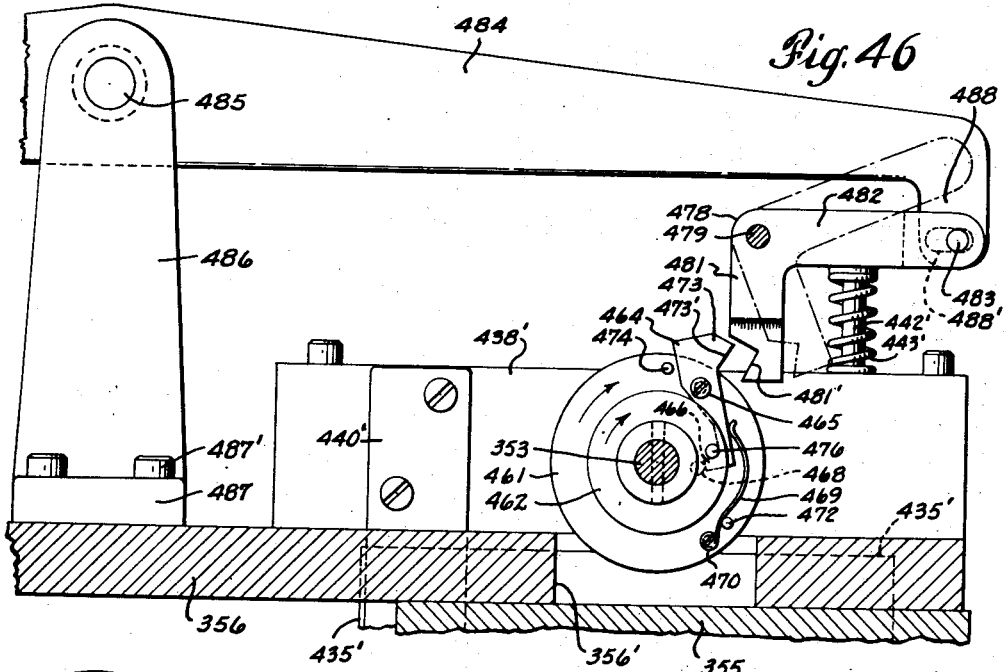
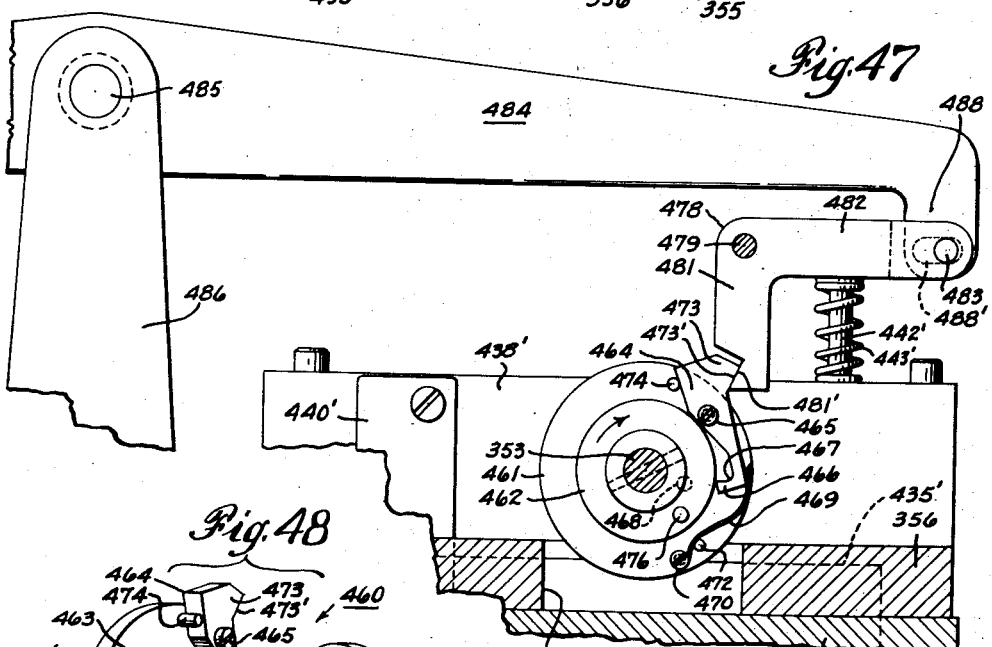
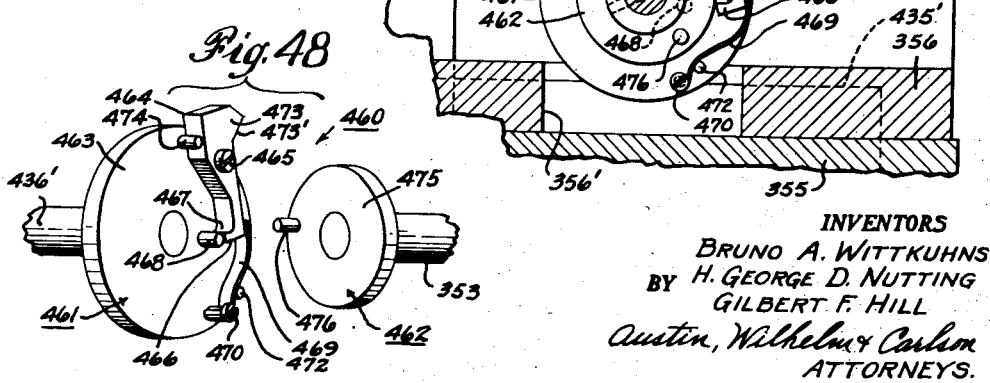
INVENTORS
BRUNO A. WITTKUHNS
BY H. GEORGE D. NUTTING
GILBERT F. HILL
Austin, Wilhelm & Carlson
ATTORNEYS.

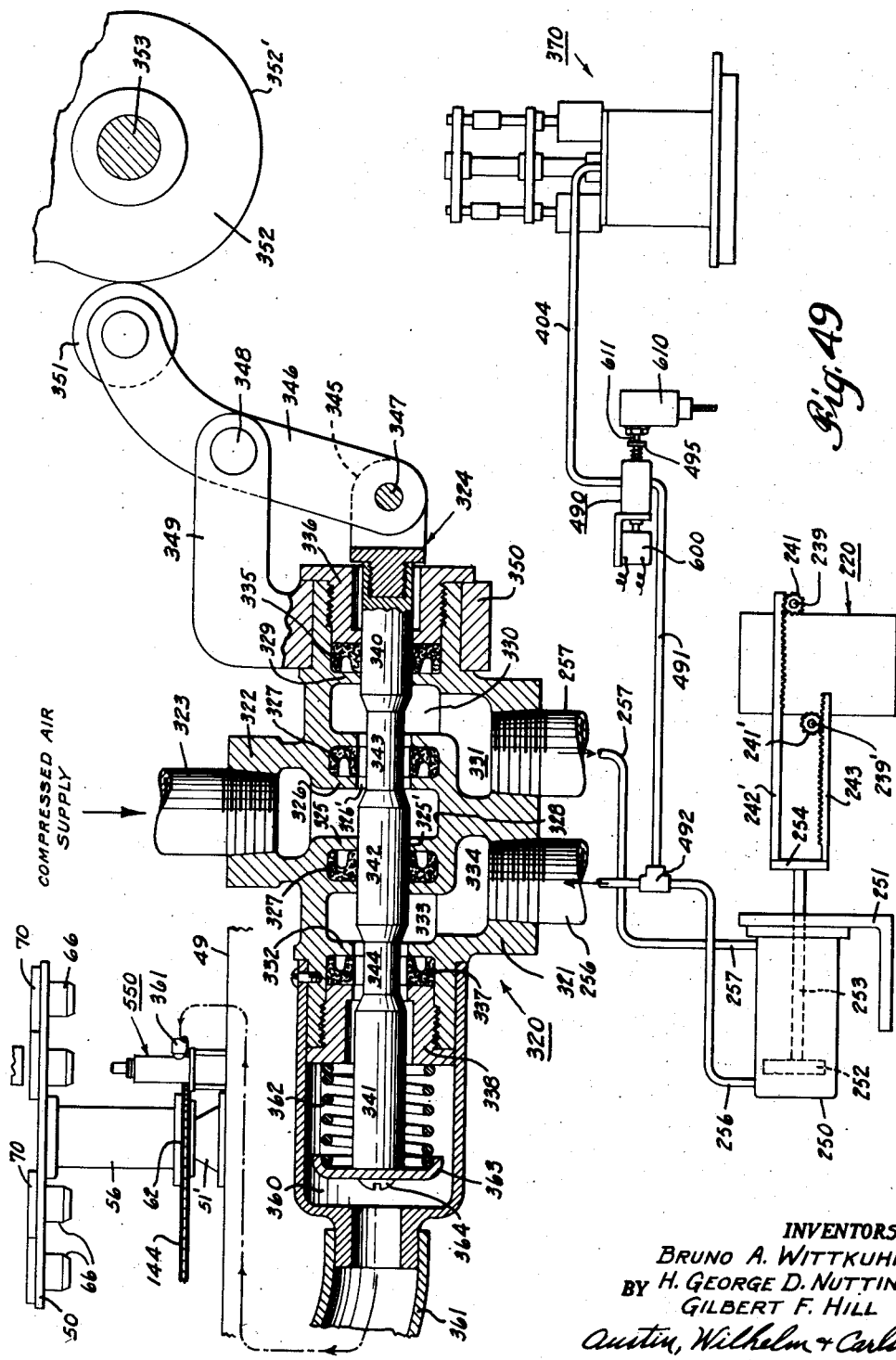

June 23, 1953  B. A. WITTKUHNS ET AL  2,642,784
MACHINE FOR MAKING PAPER CONTAINERS
Filed April 6, 1949  31 Sheets-Sheet 27

INVENTORS
BRUNO A. WITTKUHNS
H. GEORGE D. NUTTING
GILBERT F. HILL
BY Austin, Wilhelm & Carlson
ATTORNEYS.

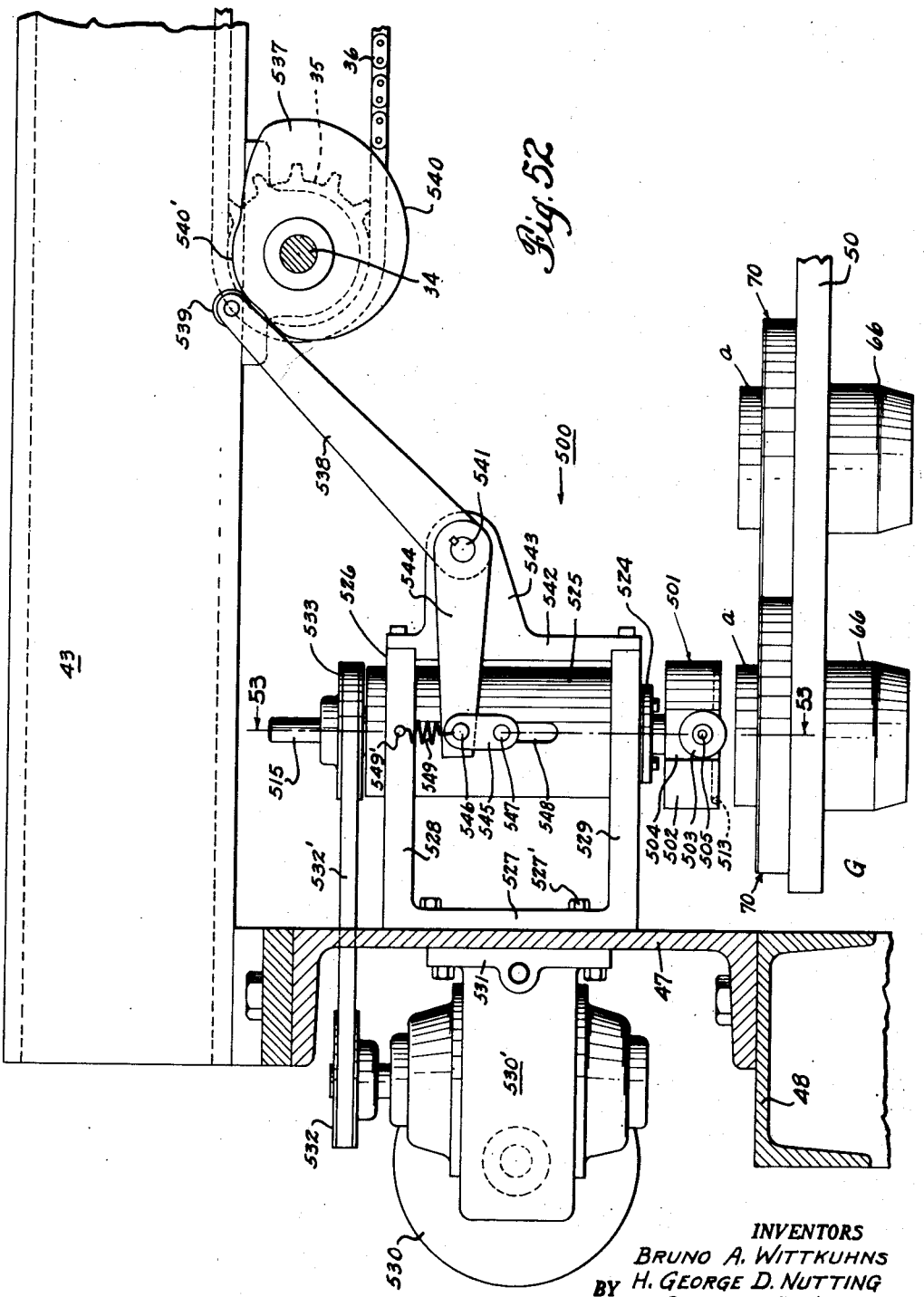

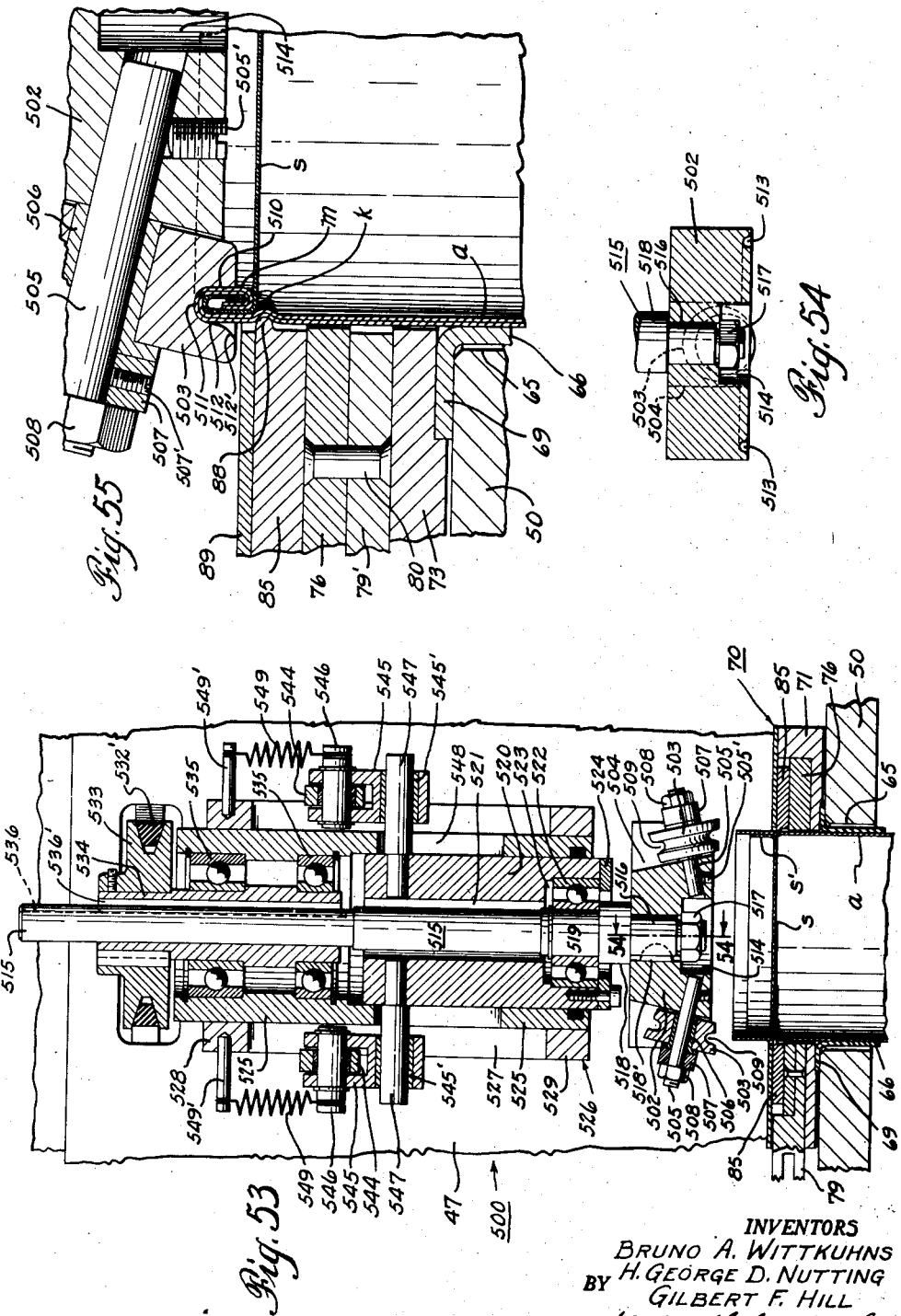

June 23, 1953   B. A. WITTKUHNS ET AL   2,642,784
MACHINE FOR MAKING PAPER CONTAINERS Filed April 6, 1949                     31 Sheets-Sheet 30

INVENTORS
BRUNO A. WITTKUHNS
H. GEORGE D. NUTTING
GILBERT F. HILL
BY Austin, Wilhelm + Carlson
ATTORNEYS.

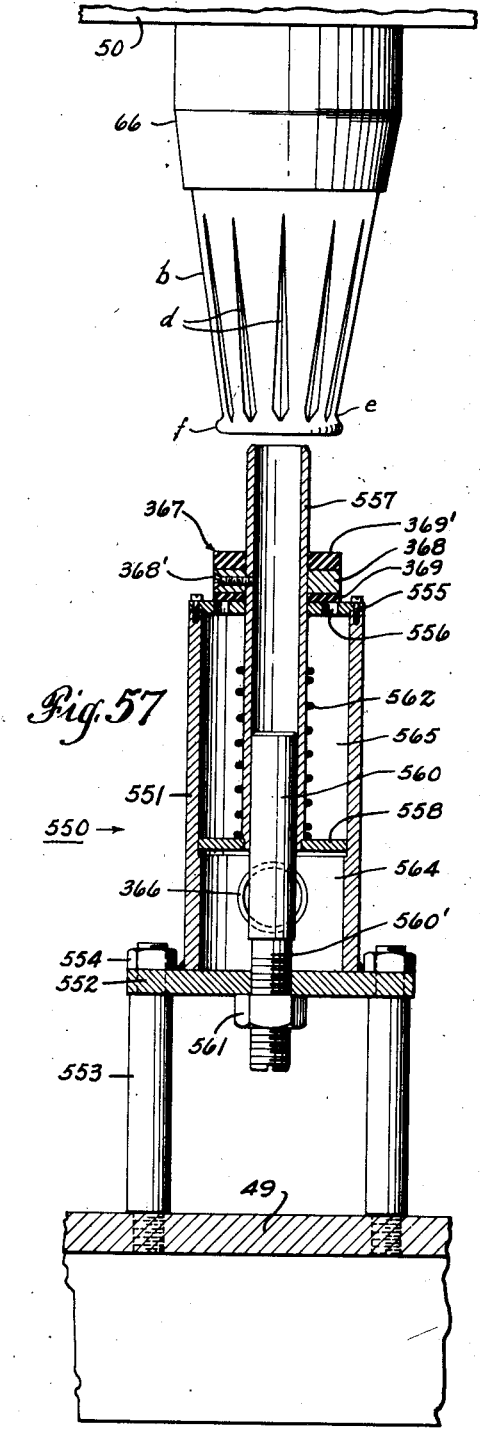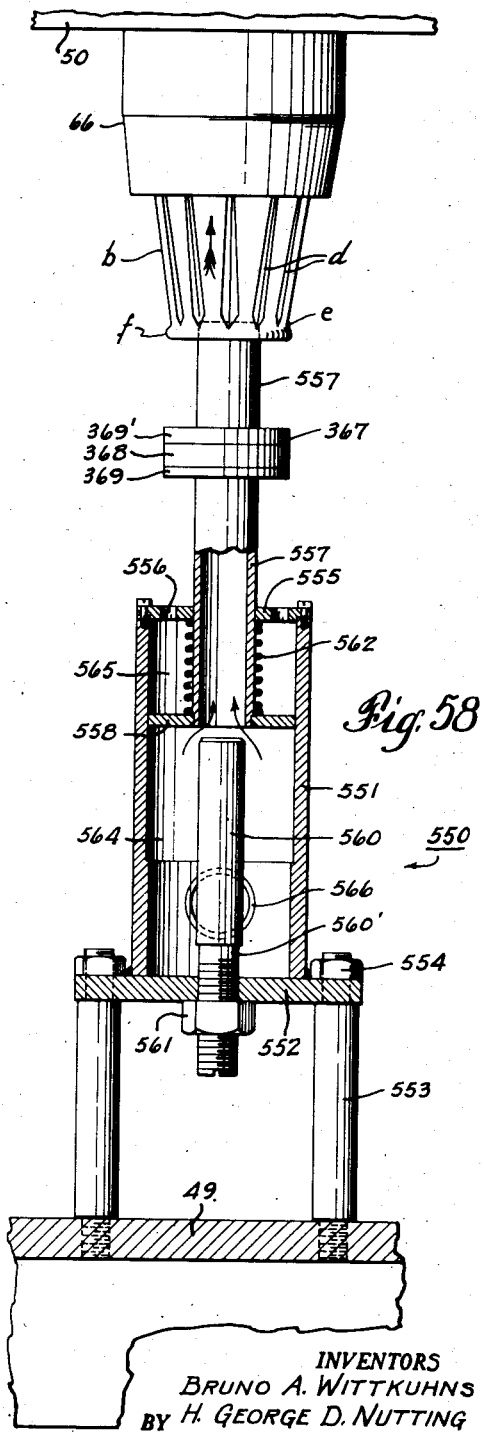

Patented June 23, 1953

2,642,784

UNITED STATES PATENT OFFICE 2,642,784

MACHINE FOR MAKING PAPER CONTAINERS

Bruno A. Wittkuhns and H. George D. Nutting, Summit, and Gilbert F. Hill, Madison, N. J., assignors to National Paper Bottle Co. Inc., New York, N. Y., a corporation of New York Application April 6, 1949, Serial No. 85,782

33 Claims. (Cl. 93—39.3)

This invention relates to a machine for making paper containers, and more particularly to an improved machine for the economical manufacture of paper containers formed from wound paper blanks particularly adapted for the packaging of milk and free flowing materials.

Paper containers have heretofore been made in various shapes and forms for the packaging of milk, juices and other liquid and free flowing materials. Paper containers having the general form of glass bottles, and presenting a cylindrical part from which a truncated part extends, are particularly convenient and desirable for the packaging and transportation of milk and other liquid products since they are suited for filling on standard glass bottle filling equipment and may be conveniently grasped and carried from the truncated neck portion thereof.

Paper containers simulating glass bottles may be formed from paired blanks comprising a substantially rectangular blank paired with a generally arcuate shaped blank, the two blanks being wound together to form a container body of double-ply construction, with the plies of the conical part wound together and interleavened with the plies of the cylindrical part in a manner to form a mid-sectional joint. The paper plies forming the bottle body are bonded by an adhesive layer sandwiched between the plies, and the contracted end of the bottle body is spun over to form an inwardly extending bead. The truncated conical part of the bottle body may desirably be fluted or corrugated for strengthening purposes and to provide a contracted neck portion adjacent the bottle mouth. The bottle mouth may also be shaped to present a bulging outer surface to facilitate retension of a hood cap thereon and the mouth forming bead is also desirably compressed and compacted, with the inner surface thereof shaped to provide spaced circular rims or shoulders defining a closure cap receiving groove therebetween. The bottom end of the bottle body is closed by a bottom forming member presenting a closure skirt which may be glued in position, the skirt and the lower end of the bottle body being rolled together to form a supporting bead inset within the lower end of the bottle body as formed.

The composite machine for producing the completed paper bottles from paired rectangular and arcuate blanks, may be constructed in two sections, which sections may be operated independently from separate driving mechanisms, but preferably the two machine sections are integrated together and driven in synchronism from a common driving unit. The first section of the machine embodies a winding station where a rectangular blank paired with an arcuate blank is wound on a rotatable mandrel. At the next succeeding station, the bottle body as wound on the mandrel is ironed and compressed to further smooth and calender the bottle body, compress the mid-sectional joint and vertical joints thereof, and insure a lasting adhesive bond between the paper plies thereof. At the next succeeding station, the mouth end of the bottle body is spun over into an inwardly rolled firmly compressed bead which defines the pouring and filling mouth of the bottle body. At the next succeeding station the bottle body is stripped from its supporting mandrel.

The mandrels onto which the paired blanks are wound and supported until removed therefrom, may be mounted upon a suitable traveling conveyor which operates to advance the spaced mandrels to the successive operating stations. The mandrel supporting conveyor may conveniently comprise a turret rotatable about a horizontal axis and upon which the mandrels are mounted in radial spaced arrangement. With four operating stations as above indicated, the turret may conveniently support four mandrels which may be rotated in an orbital path as defined by the axis of the turret, mechanism being provided for rotating the turret in stages through a defined arc, the successive mandrels being held at the successive operating stations for a predetermined dwelling period sufficient to complete the body forming operations prescribed at each operating station.

The operating mechanism at the various forming stations are driven in synchronism with each other and with the mechanism which rotates the mandrel supporting turret, the forming mechanism at the operating stations performing their intended body forming functions during the period the mandrels are in dwelling position at the successive stations. Thus, during the dwelling period, a pair of bottle forming blanks are wound on the mandrel dwelling at the winding station, a second wound bottle body is compressed on its supporting mandrel dwelling at the pressing station, the mouth end of a third bottle body is spun while supported on the mandrel dwelling at the spinning station, and a fourth bottle body is stripped from the mandrel dwelling at the stripping station. The first section of the machine above generally described is particularly described in our copending application Serial No. 85,781, filed April 6, 1949.

The second section of the machine, which is synchronized with the first section of the machine to provide an integrated and composite container forming machine, is particularly described in this application. This second machine section embodies a plurality of container body receiving and supporting cells which may be mounted in spaced relationship on a suitable traveling conveyor which operates to advance the spaced cells to the successive operating stations arranged in spaced relationship along the path of travel of the conveyor. The cell supporting conveyor may conveniently comprise a turntable structure mounted for rotation about a vertical axis and having the cells arranged in uniform spaced relationship around the perimeter thereof. Any desirable number of operating stations may be associated with the second conveyor, a total of six operating stations being illustrated in this application. The operating mechanisms at the various forming stations associated with the second section of the machine are driven in synchronism with each other and with the mechanism which rotates the turntable structure, these forming mechanisms performing their intended container forming functions during the period that the container body supporting cells are in dwelling position at the successive stations.

Thus, during the dwelling period, the container body is removed from its then downwardly directed supporting mandrel at the stripping station associated with the first section of the machine and projected downwardly into the receiving cell at the loading station associated with the second section of the machine. During the same dwelling period, a second container body is fluted, necked and mouth shaped while at residence in its supporting cell at the fluting and mouth shaping station. Also, a bottom forming member is blanked, shaped and inserted into the bottom end of a third container body while supported in its cell in dwelling position at the bottom disc blanking and inserting station. Also, the bottom end of a fourth container body is rolled together with the depending skirt associated with the bottom forming member to provide a reinforcing and supporting bead during residence at the spinning station, and a fifth bottle body is ejected from its supporting cell in dwelling position at the ejecting station.

The swedging and mouth shaping mechanism at the fluting and mouth shaping station includes a swedging anvil designed to reciprocate into and out of the bottom end of the container body to provide an inner support for the truncated conical part of the container body during the swedging operation. A glue applicator device is desirably associated with the swedging anvil to automatically apply a band of adhesive to the inner surface of the container body adjacent the bottom end thereof during residence of the swedging anvil within the bottle body. The fluting and mouth forming station also includes anvil segments having head portions designed to be inserted into the mouth end of the container body and adapted to be driven outwardly to shape the inner face of the mouth bead to the desired contour. Swedging segments at this station are operative to be moved into and out of swedging engagement with the exterior surface of the container body and thus cooperate with the swedging anvil and swedging segments inserted therein to effectively flute the truncated conical part and shape the mouth end of the container body to the desired contour.

The cell supported container body is advanced from the fluting and mouth shaping station to residence position at a bottom blanking and inserting station which includes mechanism for cutting successive bottom forming blanks from advanced sections of a material strip, shaping the blanks into cup-shaped form to present a bottom forming part and a surrounding skirt or flange part, and inserting the shaped blanks into the bottom end of the container bodies as they are successively advanced to residence position at said station. The bottom blanking and inserting station also includes a device which operates to feed successive sections of a material strip into blanking position during residence of the successive bottle bodies at said station. A safety device is also associated with this station which operates to halt the blanking and inserting action of the blanking and inserting mechanism and to also halt the advance of a strip section into blanking position, in the event a supporting cell should arrive in residence position at the bottom blanking and inserting station devoid of a container body.

During the advance of the container body from the bottom blanking and inserting station to the next succeeding bottom spinning station, a set of clamping segments, forming parts of a clamping device associated with each bottle body receiving cell and manipulated by the advanced movement of the second conveyor, are moved into clamping engagement with the bottle body to form an inwardly bulging rim therein, positioned directly below the bottom forming part of the bottom member, which rim rigidly supports the bottom member in fixed position during the spinning operation. Mechanism located at the spinning station includes a spinning head which is axially advanced into progressive engagement with the bottom end of the container body to inwardly roll the bottom end of the container body, along with the depending skirt associated with the bottom member, into an inwardly rolled and compressed supporting and reinforcing bead. When the spinning operation has been completed, the spinning head is automatically retracted from the spun bottom end of the container body. The spinning head is axially manipulated by mechanism driven from and in timed relation with the mechanism which advances the cell supporting conveyor.

As the container supporting cell advances from the spinning station to the container ejecting station, the clamping segments are radially withdrawn from clamping engagement with the container body so that the container lightly rests in its receiving cell. The ejecting station includes mechanism which is pneumatically operated from exhaust compressed air previously used to operate the fluting and mouth shaping mechanism. The ejecting mechanism initially operates to loosen the container body from its supporting cell, and thence pneumatically drives the container from its cell into a pneumatic conveyor chute which conveys it from the machine.

During the interval of dwell of the successive cells at the successive operating stations associated with the second conveyor, it will be noted that a series of container forming operations are performed simultaneously. When the turntable structure has made a complete revolution, each cell will have received a container body, and several completed containers will have been produced and ejected from the machine. This improved machine is constructed to permit the formation of approximately thirty containers per minute. The turntable structure has a dwell interval of approximately one and one-half seconds during which the container body forming operations are performed, and a stage-to-stage advance interval of approximately one-half second.

An object of this invention is to provide an improved machine for making paper containers automatically, economically and at high production speeds.

Another object of this invention is to provide an improved machine for making paper containers automatically having a first division in which a pair of suitably shaped blanks are processed to form a container body and a second division including a conveyor designed to successively receive the container bodies formed in the first division and to carry such bodies past successive operating stations at which the bodies are further processed to form flutes at the neck portions thereof, to shape the mouths thereof and finally to add bottoms thereto.

Another object of this invention is to provide an improved machine for making paper containers having a conveyor designed to support a series of container body receiving cells, a plurality of spaced operating stations, and driving mechanism for advancing the successive cells in coordinated stages to and from dwelling position at the successive operating stations.

Another object of this invention is to provide an improved machine for forming paper containers which includes a rotatably mounted turntable structure having container body supporting cells arranged in spaced relationship around the perimeter thereof, operating stations spaced along the path of travel of the body supporting cells, and mechanism for rotating the turntable structure to successively advance the body supporting cells to and from predetermined dwelling positions at the successive operating stations.

Another object of this invention is to provide an improved machine for making a paper container which includes a container body supporting cell, and a swedging and mouth forming station having swedging and anvil devices for fluting the neck portion and forming the mouth of the container body.

Another object of this invention is to provide an improved machine for making paper containers including a container body supporting conveyor and a glue applying station having a device operative to apply a band of adhesive to the inner surface of the container body, said glue applicator device including a resilient glue applicator member designed to reciprocate into and out of the container body, means for transferring a layer of adhesive to the perimeter of said glue applicator member, means for circumferentially expanding said glue applicator member into adhesive applying contact with the container body, and means for automatically manipulating said glue applicator device into and out of adhesive applying position during the interval of dwell of the container body at the glue applicator station.

Another object of this invention is to provide an improved machine for making paper containers including a container body supporting conveyor and a fluting and mouth forming station, driving mechanism for the conveyor operative to advance the container body to and from the fluting and mouth forming station with a predetermined time dwell of the container body at said station, said fluting mouth shaping mechanism at said station including a swedging anvil designed to be reciprocated into and out of the container body through one end thereof, anvil segments having head portions designed to be reciprocated into and out of the container body through the other end thereof, and swedging segments designed to be swung into and out of forming engagement with the outer surface of the container body, and means for manipulating said swedging anvil, anvil segments and swedging segments in synchronism during the interval of dwell of the container body at the fluting and mouth forming station.

Another object of this invention is to provide an improved container forming machine including, a bottom blanking and inserting station, a cell designed to support a container body therein, a conveyor on which the body supporting cell is supported and advanced, drive mechanism for said conveyor operative to advance the receiving cell to and from the bottom blanking and inserting station with a predetermined time dwell of the body receiving cell at said station, said bottom blanking and inserting mechanism having a device for cutting a bottom forming member from a paper strip, a device for shaping said bottom forming member into cupped form, and a device for telescoping the cup shaped bottom member into the open end of the container body during its residence at said bottom blanking and inserting station.

Another object of this invention is to provide improved mechanism for blanking and inserting a bottom forming member into the container body which includes a device for advancing successive sections of a paper strip to blanking position.

Another object of this invention is to provide an improved machine for blanking and inserting bottom forming members into container bodies which includes a conveyor having a series of spaced container body receiving cells supported thereon, drive mechanism for the conveyor operative to advance successive container body supporting cells to and from residence position at said bottom blanking and inserting station, and mechanism for blanking, cupping and inserting bottom forming members into successive container bodies during their residence at said station, said mechanism including a device for blanking bottom members from successive strip sections advanced to blanking position, a device for shaping said successive bottom forming members into cup shaped form, and a device for inserting said cup shaped bottom members successively into the successive container bodies during the interval of residence of the successive container bodies at said station.

Another object of this invention is to provide an improved machine for making containers including a bottom blanking and inserting station, a conveyor having a series of spaced container body receiving cells supported thereon, drive mechanism for the conveyor operative to advance successive container body supporting cells to and from residence position at said bottom blanking and inserting station, mechanism for blanking and inserting successive bottom forming members into successive container bodies during their residence at said station, said mechanism including a blanking device adapted to reciprocate into and out of blanking engagement with successive strip sections advanced to blanking position, a device for inserting the bottom forming members into the successive container bodies during the interval of dwell of the successive container bodies at said station, and a device for advancing successive sections of a paper strip into blanking position, said advancing device including means for continually advancing the paper strip, and means for intermittently feeding predetermined sectional lengths of said strip into blanking position when the preceding advanced section is released by said reciprocating blanking device.

Another object of this invention is to provide an improved container forming machine including, a conveyor having a plurality of container body supporting cells mounted in spaced relationship thereon, a bottom blanking and inserting station, conveyor driving mechanism operative to advance successive container body supporting cells to and from residence position at said bottom blanking and inserting station, said bottom blanking and inserting station including devices for blanking and inserting successive bottom forming members into successive container bodies during their residence at said station, an advancing device including means for continually advancing a paper strip, means for intermittently feeding predetermined sectional lengths of said strip into blanking position when the preceding advance section is released by said blanking device, and automatic control means for halting the operation of said blanking and inserting devices and said strip advancing device during the interval that an empty cell remains in residence position at said station.

Another object of this invention is to provide an improved container forming machine which includes, a conveyor having container body receiving cells mounted thereon, a spinning station, drive mechanism for said conveyor operative to advance the container body receiving cells to and from spinning position with a predetermined time dwell of the container body cell at the spinning station, a rotatively driven spinning head at the spinning station, and mechanism for automatically moving the spinning head into and out of spinning engagement with the bottom end of the container body during its dwelling interval at the spinning station.

Another object of this invention is to provide an improved container making machine including, a conveyor having a container body receiving cell mounted thereon, a spinning station, a clamping device having clamping segments associated with said receiving cell movable into and out of clamping engagement with the container body, means associated with said conveyor for manipulating said clamping segments into clamping engagement with the container body during advance movement of the container body to the spinning station and for manipulating said clamping segments out of engagement with the container body during advance movement of the container body from said spinning station, a rotatably mounted spinning head at the spinning station, and mechanism for automatically manipulating the spinning head into and out of spinning engagement with the bottom end of the container body during its dwelling interval at the spinning station.

Another object of this invention is to provide an improved container forming machine including, a conveyor designed to support a container body thereon, a container ejecting station, conveyor drive mechanism for advancing the container body to and from the ejecting station with a predetermined time dwell of the container at the ejecting station, a reciprocally mounted ejector tube at the ejecting station, pneumatic means for reciprocating said tube to inject compressed air into the container body during the interval of dwell of the container body at the ejecting station, and means for retaining said ejector tube spaced from the path of travel of the container body during advancing of the latter to and from the ejector station.

Another object of this invention is to provide an improved container forming machine including, a first conveyor having a series of container body supporting mandrels supported in spaced relationship thereon, a plurality of operating stations including a winding station, a pressing station, a mouth spinning station and a stripping station arranged in spaced relationship along the path of travel of said first conveyor, a second conveyor having a plurality of container body receiving cells supported thereon in spaced relationship, a plurality of operating stations arranged in spaced relationship along said second conveyor including a loading station positioned adjacent the stripping station of said first conveyor to successively receive container bodies from the latter, a fluting and mouth shaping station, a bottom blanking and inserting station, a bottom spinning station and a container ejecting station, means for driving said first and second conveyors in synchronism, and means associated with said conveyor driving mechanism for establishing a predetermined interval of dwell of said mandrels and said container body supporting cells at their respective operating stations.

Another object of this invention is to provide an improved container forming machine which includes, a conveyor having a series of spaced container body receiving cells mounted thereon, a series of successive operating stations arranged in spaced relationship along said conveyor including a fluting and mouth shaping station, a bottom blanking and inserting station and a container ejecting station, pneumatically operated mechanism at said fluting and mouth shaping station for fluting and mouth shaping successive container bodies during their residence at said station, pneumatically operated mechanism at said bottom blanking and inserting station for cutting, shaping and inserting bottom forming members into successive container bodies during their residence at said station, pneumatically operated mechanism at said ejecting station for ejecting the containers as they successively arrive at said station, a device for controlling the flow of compressed air to said fluting and mouth shaping mechanism and to said bottom blanking and inserting mechanism, means associated with said air control device for diverting exhaust air to said container ejecting mechanism, said air control device operating said mechanisms in synchronism during the residence interval of the container bodies at said successive operating stations.

Other objects and advantages of this invention will become apparent as the disclosure proceeds.

Although the characteristic features of the invention will be particularly pointed out in the claims, the invention itself, and the manner in which it may be carried out, may be better understood by referring to the following description taken in connection with the accompanying drawings forming a part thereof, in which Fig. 1 is a side elevational view partly broken away of the partially formed bottle body as it appears after the mouth end thereof has been spun to provide a bead formation.

Figure 5:
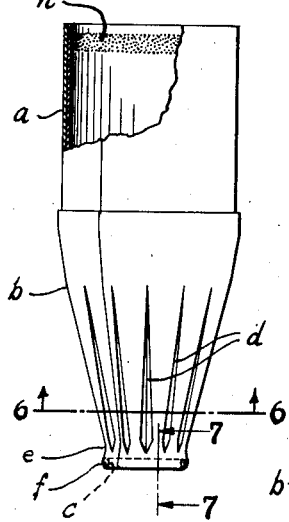

Fig. 5 is a side elevational view of the bottle body partly broken away as it appears at a further advance stage of assembly, and wherein creasing flutes have been formed in the conical part to provide a reduced diameter neck at the upper portion of the conical part at the base of the mouth defining bead, an internal cap-receiving groove formed in the inner face of the mouth defining bead, and a circumferentially extending strip of adhesive applied to the inside face of the cylindrical part adjacent the lower end thereof, the forming operations here indicated being effected at the swedging and mouth shaping station of the machine disclosed in this application.

Figure 6:
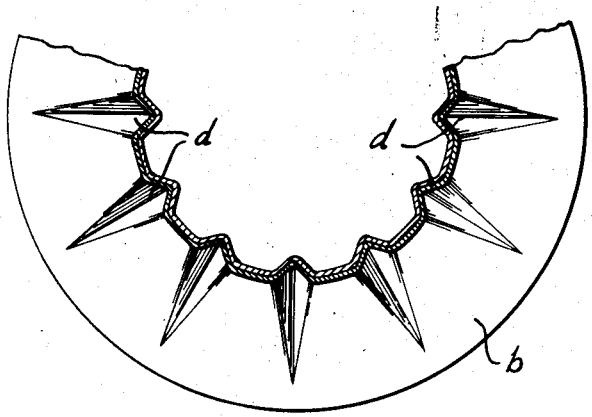

Fig. 6 is an enlarged fragmentary cross sectional view taken through the truncated conical part of the bottle body and showing particularly the cross sectional contour of the creasing flutes formed therein as the same would appear when viewed along line 6—6 of Fig. 5.

Figure 7:
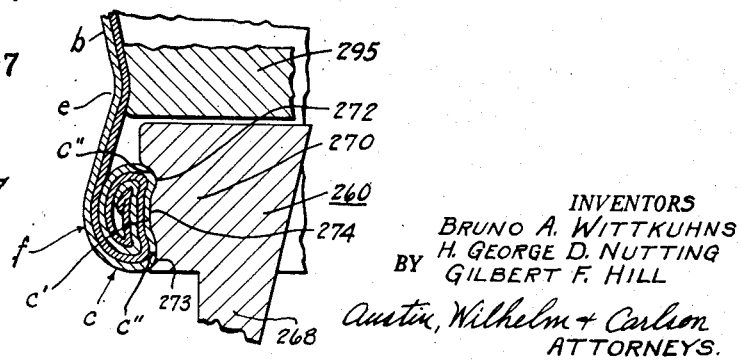

Fig. 7 is an enlarged fragmentary cross sectional view taken along line 7—7 of Fig. 5, and showing in greater detail the formation given to the mouth end of the bottle body at the swedging and mouth forming station, this view also showing a fragmentary detail of one of the mouth swedging segments located at this station.

Figure 8:
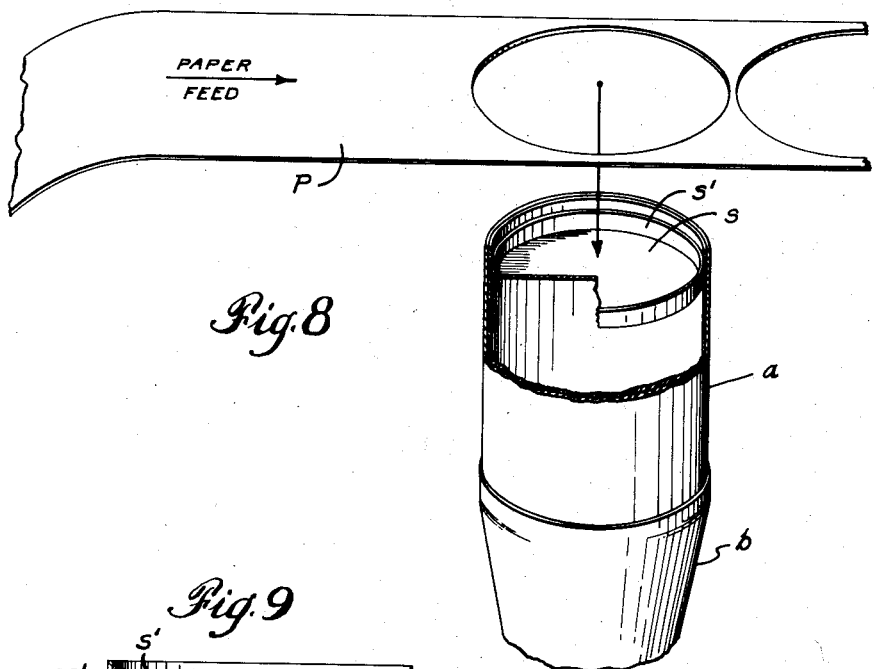

Fig. 8 is a perspective view showing a section of the paper strip from which the bottom forming disc has been punched, this view also showing a fragmentary perspective view of the bottle body partly broken away and with the bottom forming disc inserted in position therein, the forming operations indicated in Fig. 8 being effected at a bottom disc punching and inserting station incorporated as a part of the machine disclosed in this application.

Figure 9:
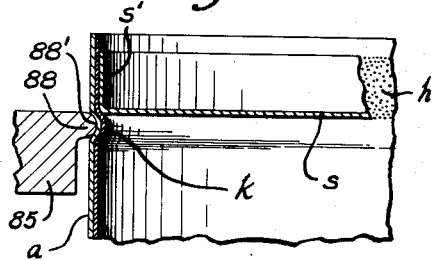

Fig. 9 is an enlarged fragmentary cross-sectional view showing a fragmentary part of one of the clamping elements associated with each of the bottle body receiving cells of the turntable carrier, this view illustrating the manner in which the clamping elements serve to form a depressed rim in the cylindrical part of the bottle body to provide support for the inserted bottom forming disc.

Figure 10:
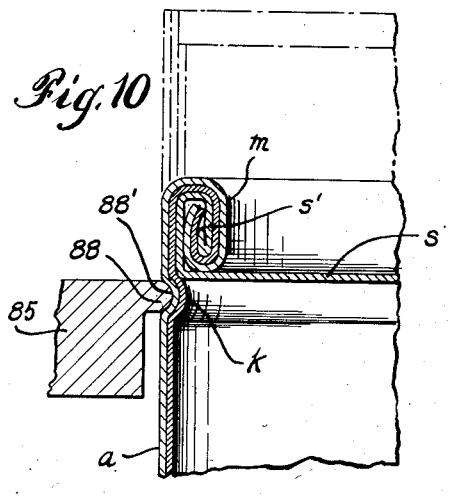

Fig. 10 is an enlarged fragmentary cross sectional view of the bottle body as it appears after the bottom end of the cylindrical body has been spun over to provide a bottom reinforcing and supporting bead, an operation performed at the spinning station of the machine disclosed in this application.

Figure 11:
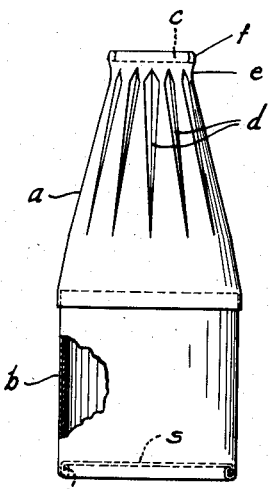

Fig. 11 is an elevational view of the completed paper bottle partly broken away and in the form as pneumatically ejected from the machine disclosed in this application.

Figure 12:
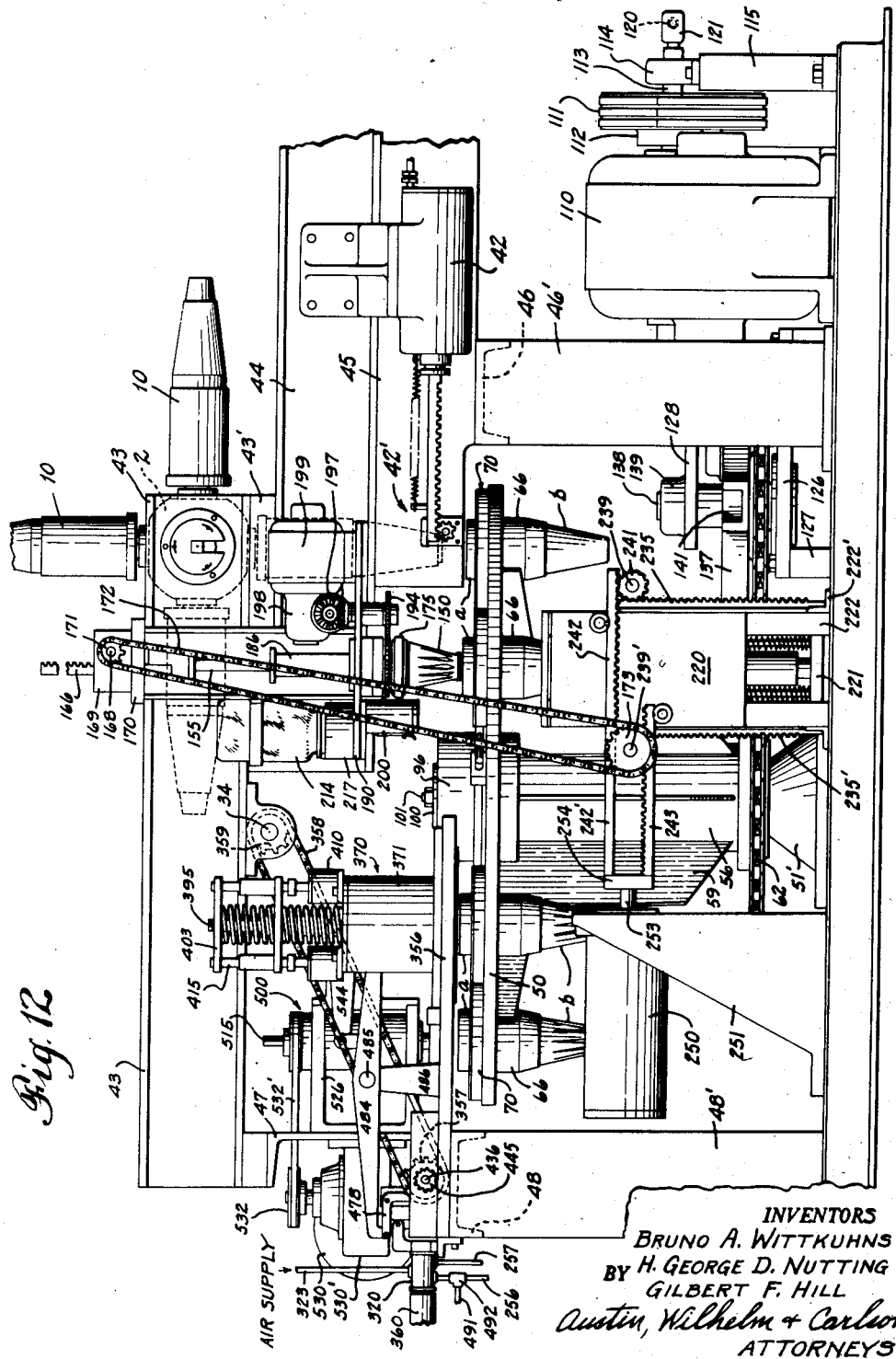

Fig. 12 is a side elevational view of the machine on a reduced scale.

Figure 13:
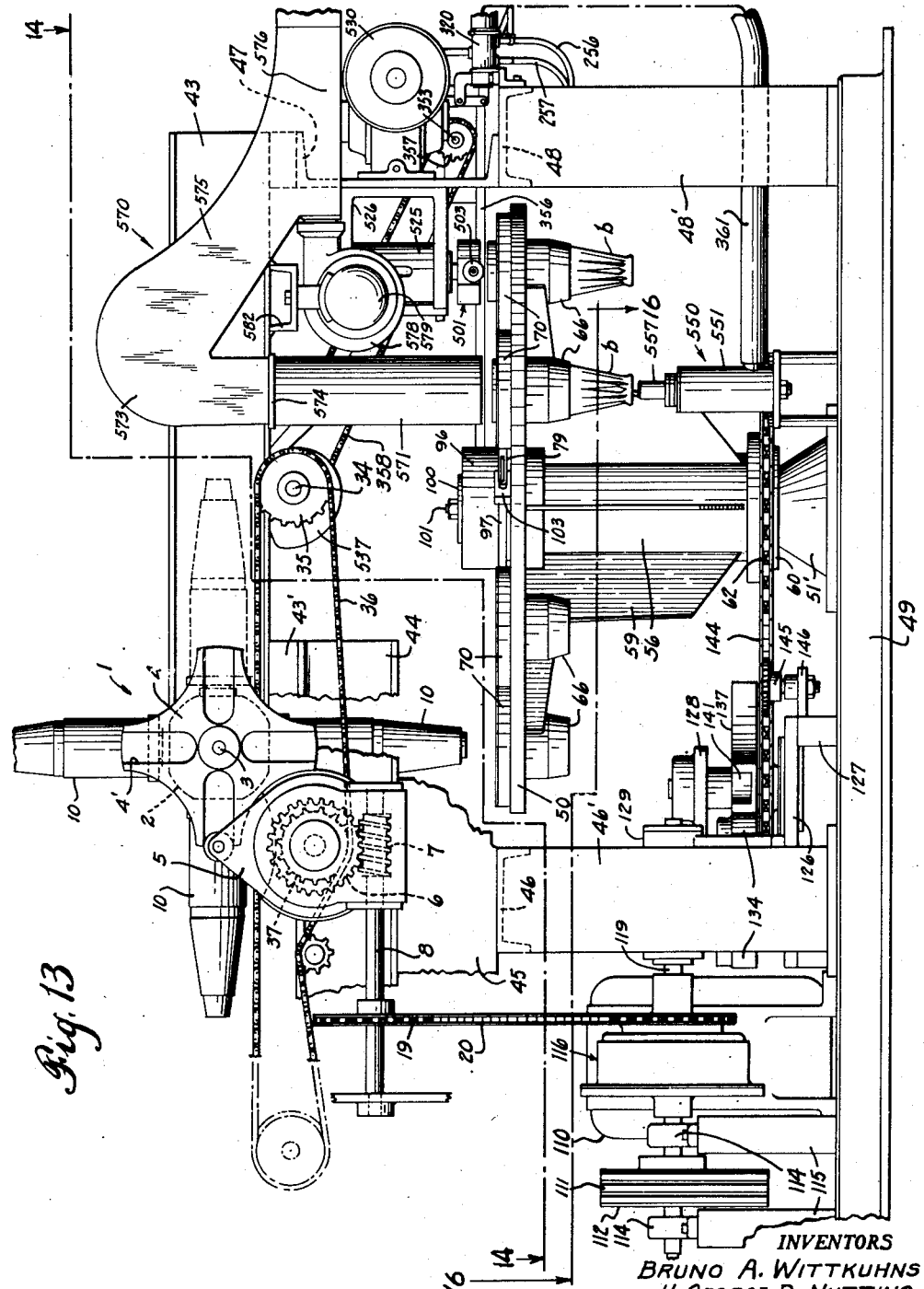

Fig. 13 is an elevational view of the machine as viewed from the side thereof opposite the side shown in Fig. 12.

Figure 14:
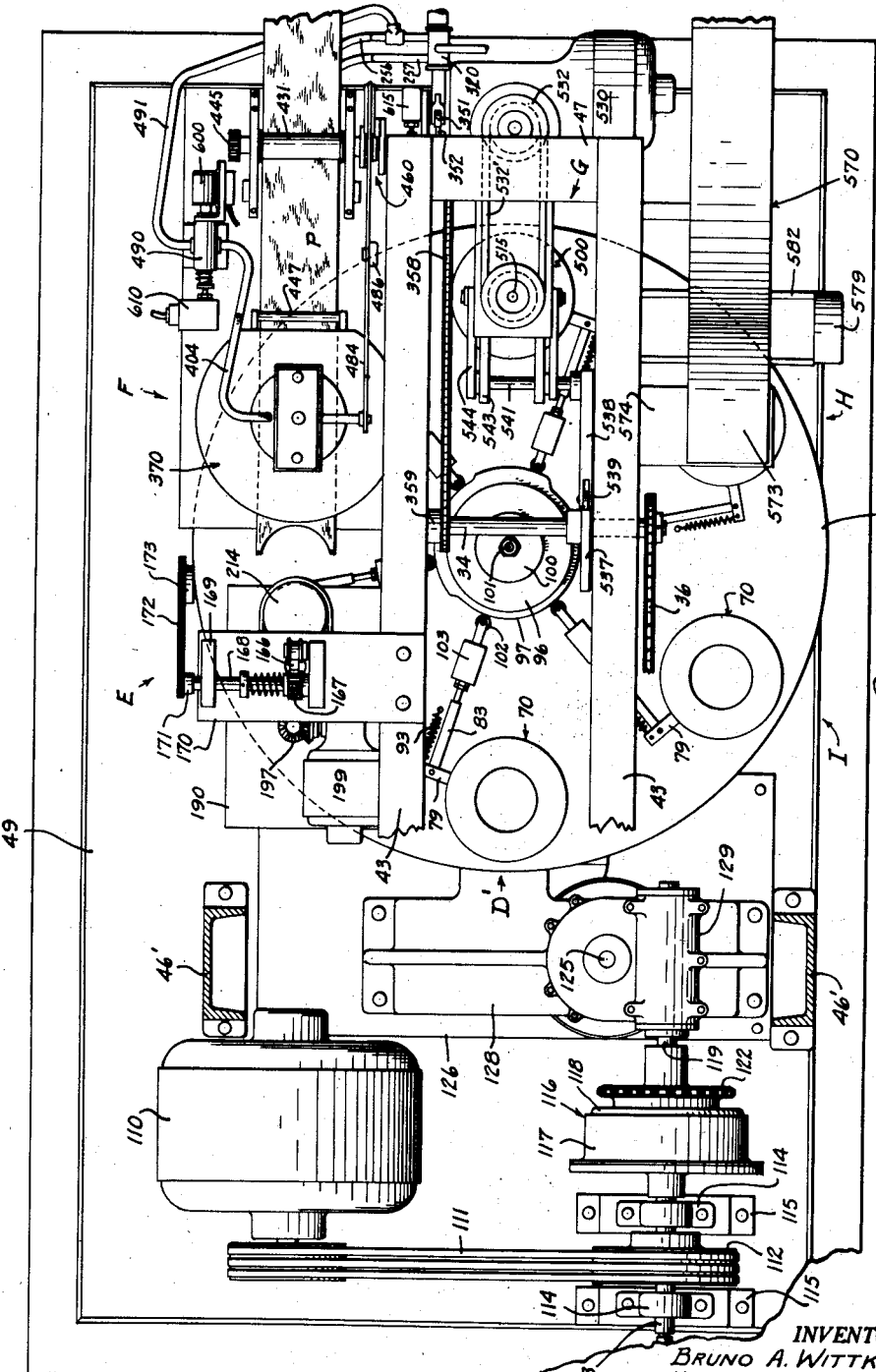

Fig. 14 is a top plan view of the machine as the same would appear when the mandrel supporting turret and its associated bottle body forming mechanism are removed, and as the machine would appear when viewed along line 14—14 of Fig. 13.

Figure 15:
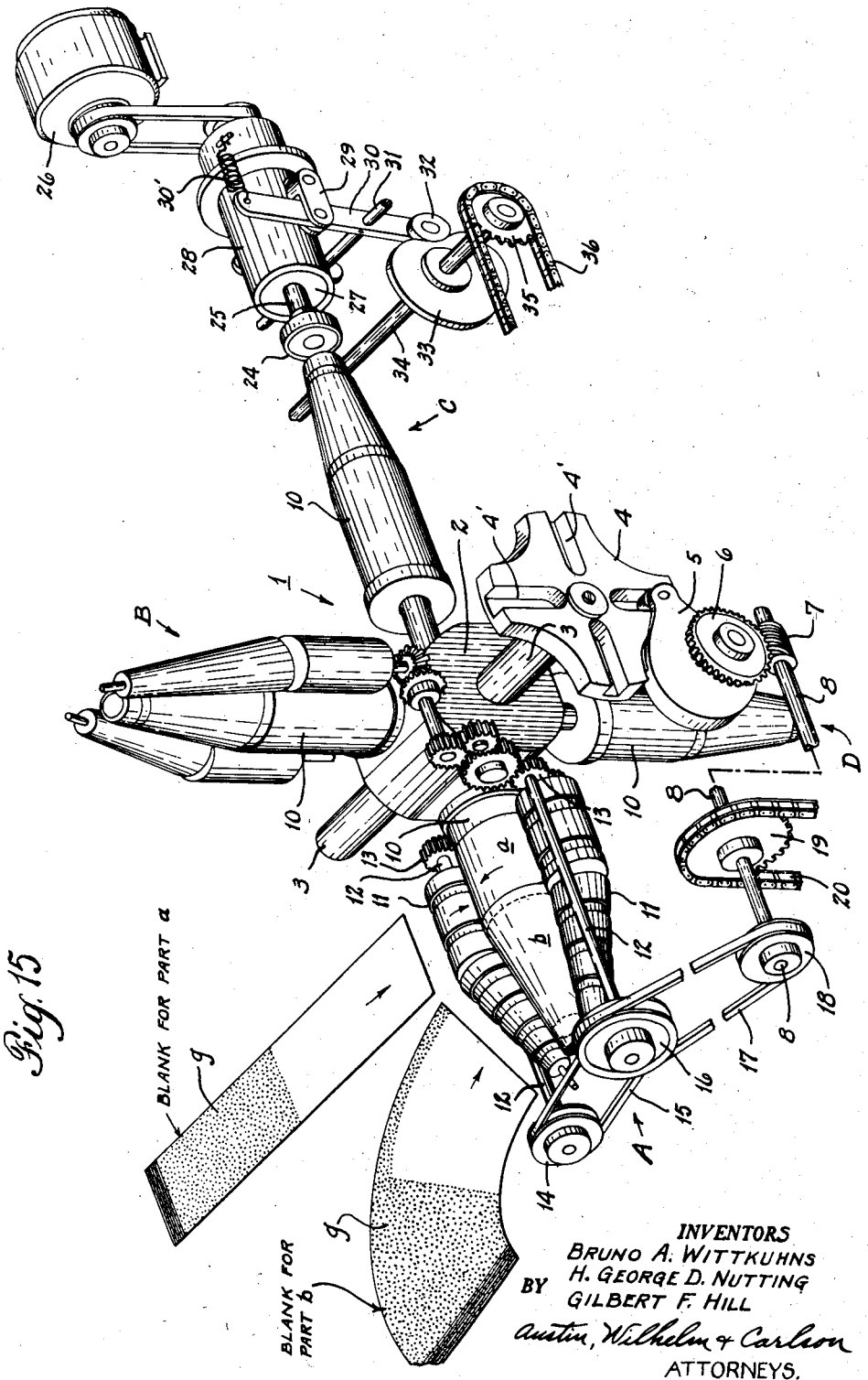

Fig. 15 is a schematic isometric view to diagrammatically illustrate the various body forming stations with reference to the mandrel supporting turret, this view showing only some of the mechanisms forming a part of the machine assembly as disclosed in detail in copending application Serial No.

Figure 16:
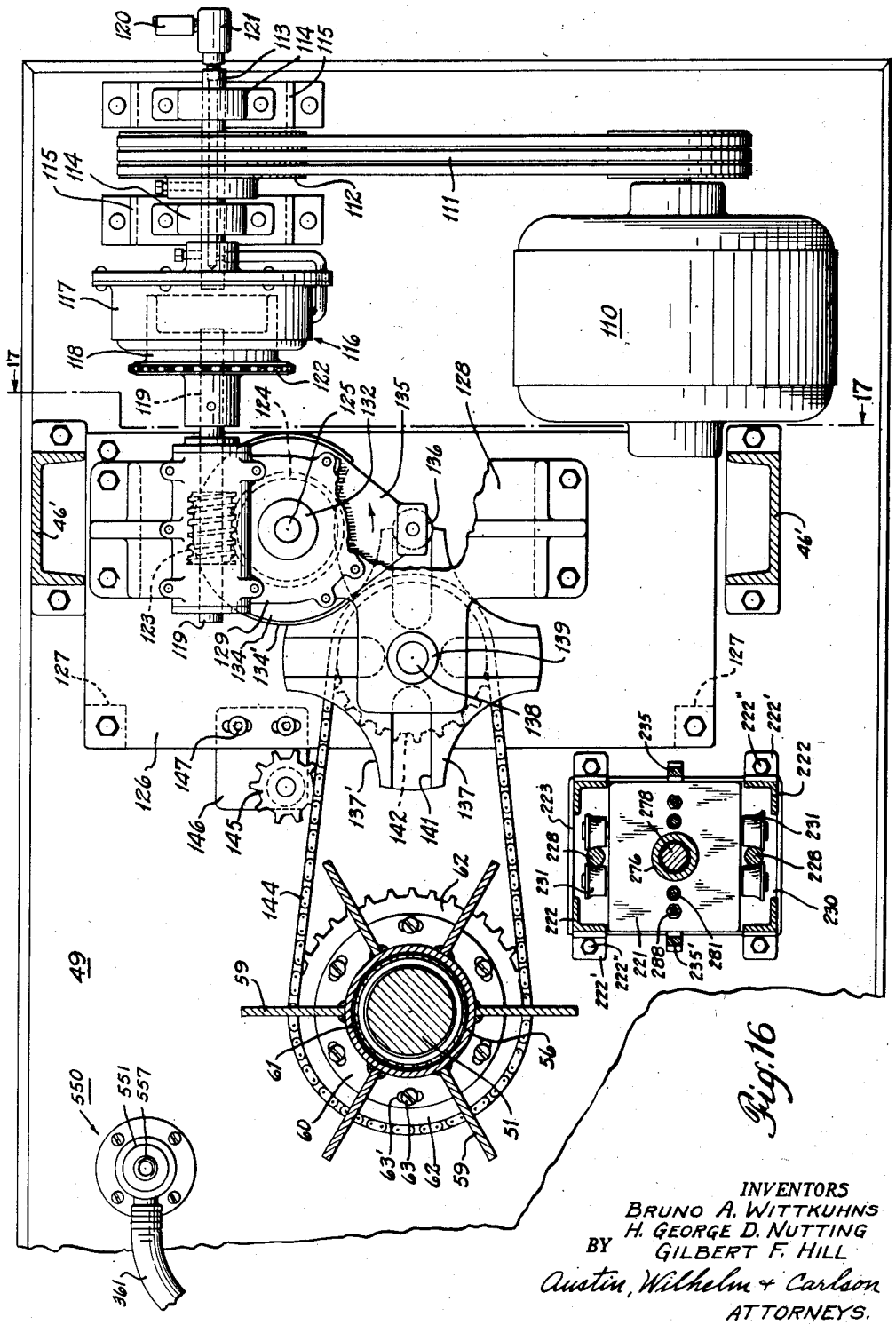

Fig. 16 is a horizontal cross sectional view particularly showing the main drive mechanism for the turntable carrier as viewed along line 16—16 of Fig. 13.

Figure 17:
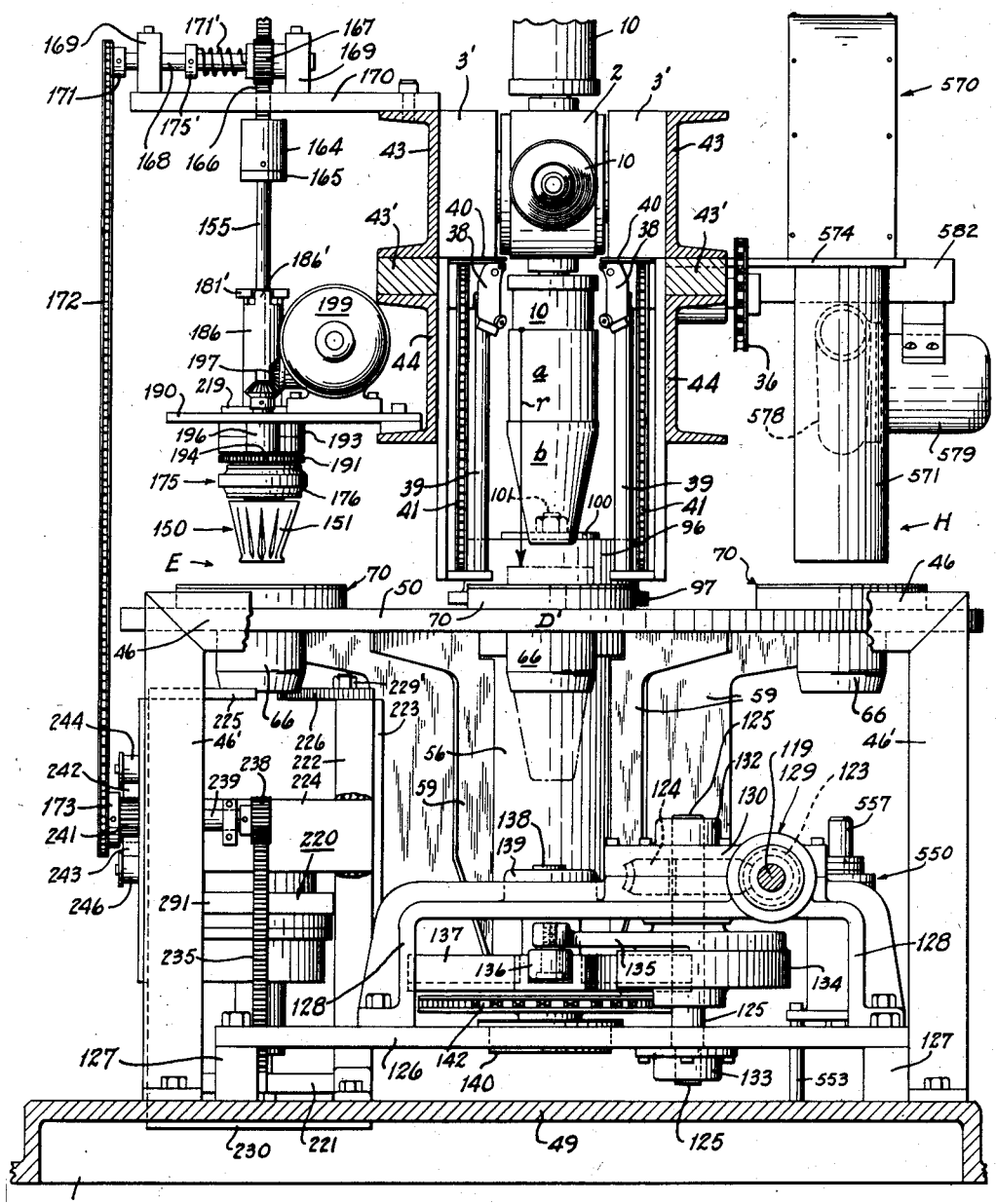

Fig. 17 is a vertical cross sectional view of the machine as viewed along line 17—17 of Fig. 16, this view showing further details of the main drive mechanism, mechanisms at the stripping station, mechanisms at the fluting and mouth shaping station, and mechanisms at the bottle blow-out station.

Figure 18:
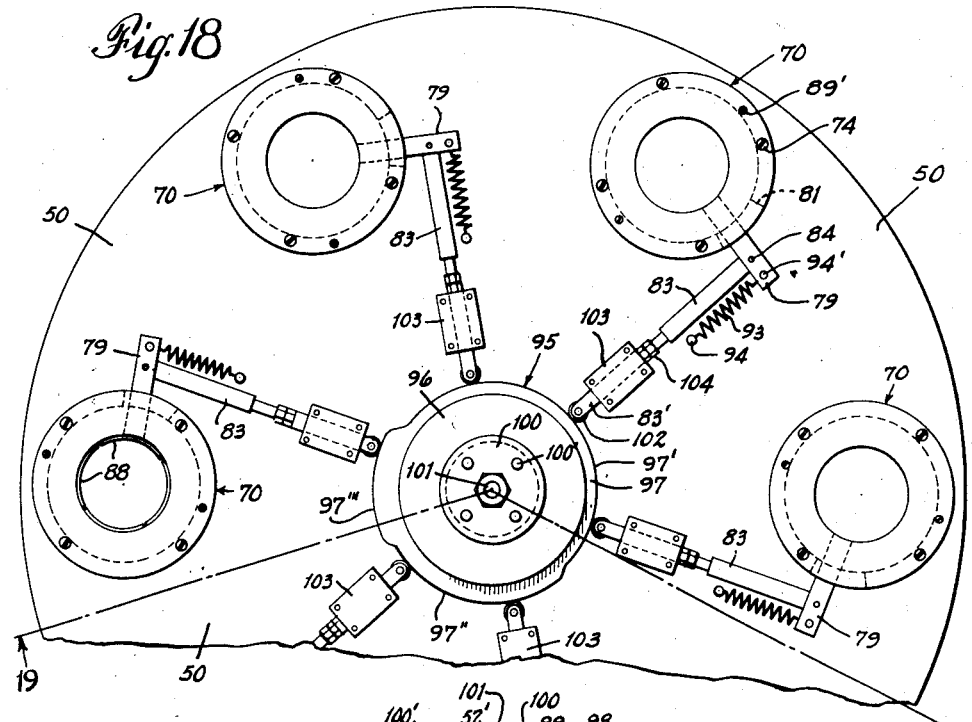

Fig. 18 is a fragmentary plan view of the turntable carrier, this view particularly showing certain parts of the bottle body clamping mechanism associated with each bottle body receiving cell.

Figure 19:
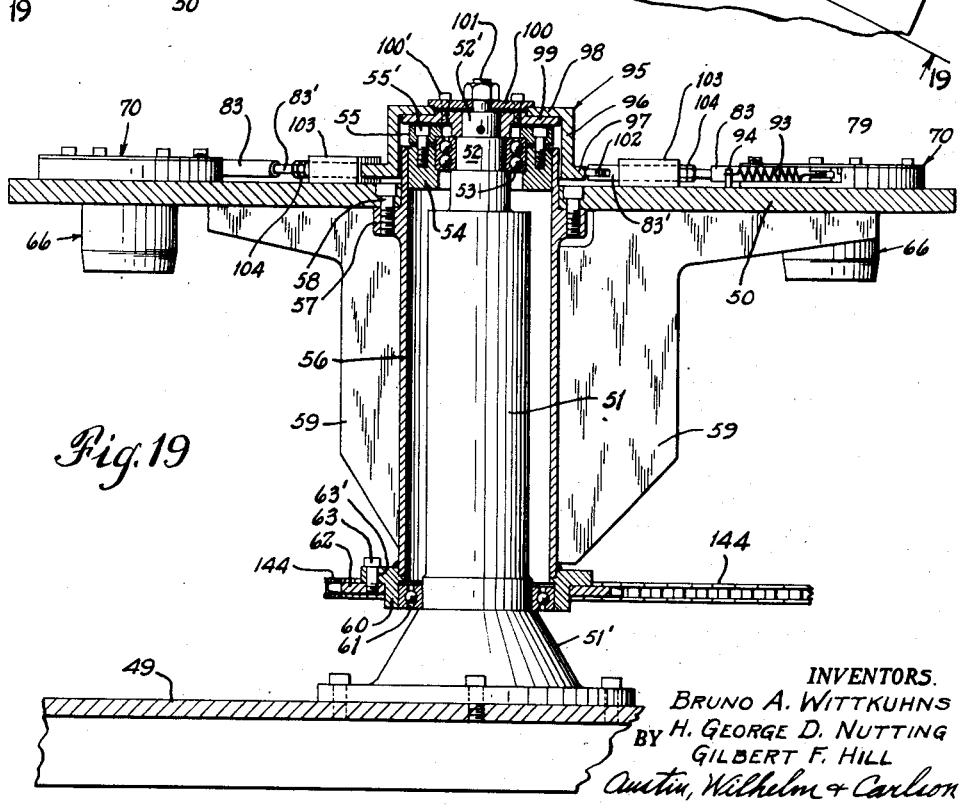

Fig. 19 is a vertical cross sectional view through the turntable and its associated supporting pedestal as the same would appear when viewed along line 19—19 of Fig. 18.

Fig. 20 is an enlarged plan view of one of the typical bottle body receiving cells and associated bottle body clamping mechanism.

Fig. 21 is a perspective view of the ring casing which forms a part of each body receiving cell.

Fig. 22 is a perspective view of the actuator ring which is associated with the ring casing shown in Fig. 21 to actuate the bottle body clamping elements.

Fig. 23 is a perspective view of one of the plurality of bottle body clamping elements associated with each bottle body receiving cell.

Figure 24:
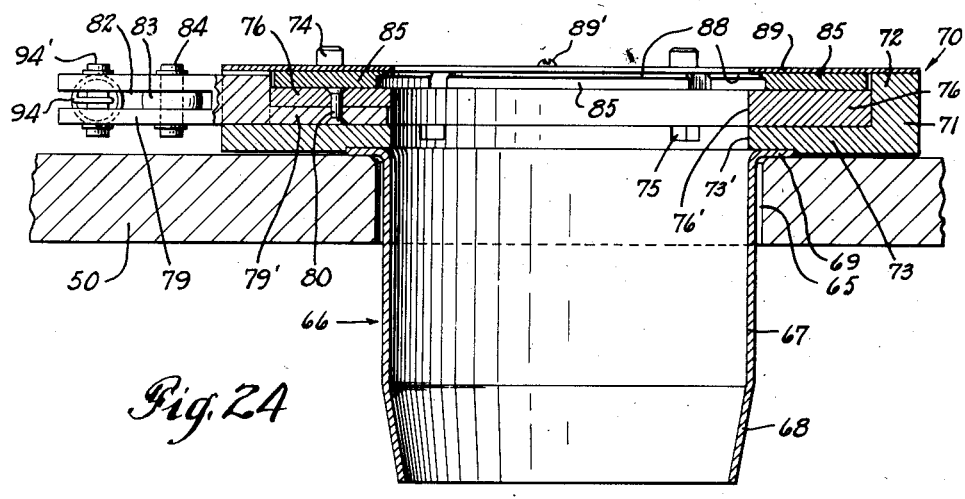

Fig. 24 is an enlarged vertical cross sectional view taken through one of the bottle body receiving cells and associated body clamping mechanism as the same would appear when viewed along line 24—24 of Fig. 20.

Figure 25:
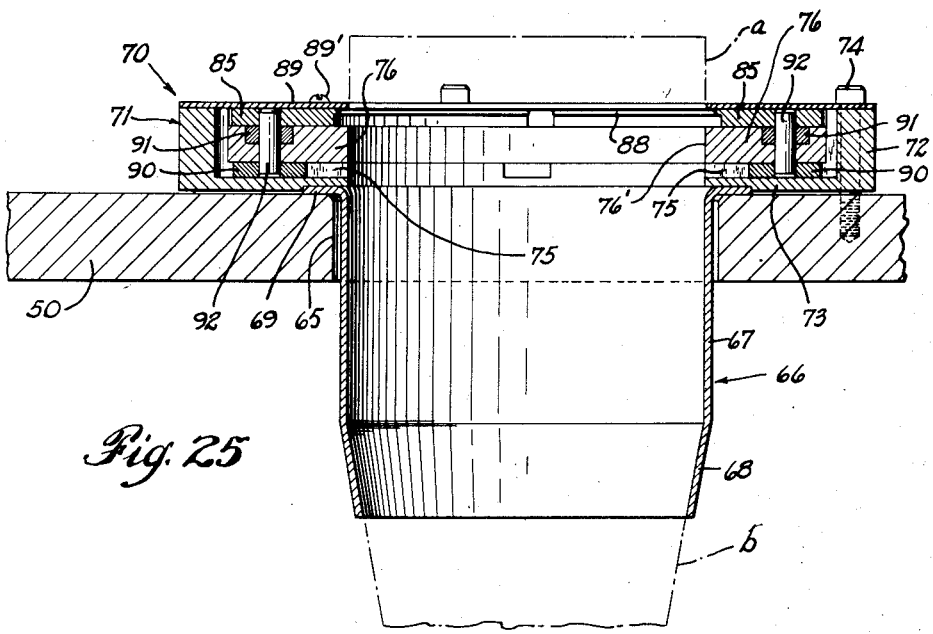

Fig. 25 is another enlarged vertical cross sectional view of the bottle body receiving cell and associated body clamping mechanism as the same would appear when viewed along line 25—25 of Fig. 20.

Fig. 26 is a fragmentary elevational view of the machine with certain parts thereof shown in cross section, this view showing more particularly certain parts of the swedging mechanism at the fluting and mouth forming station.

Fig. 27 is an elevational view, partly in section, showing particularly the swedging anvil and associated mechanisms located at the fluting and mouth forming station of the machine, as the same would appear when viewed along line 27—27 of Fig. 30.

Fig. 28 is an enlarged perspective view of a fragmentary detail of certain operating parts of the glue applicator device associated with the swedging anvil as the same would appear when viewed along line 28—28 of Fig. 27.

Fig. 29 is an enlarged vertical cross sectional view showing further details of the mechanism at the fluting and mouth forming station.

Fig. 30 is an enlarged vertical cross sectional view along line 30—30 of Fig. 27 of certain mechanisms at the fluting and mouth forming station, and particularly showing the mechanism for mounting the swedging anvil, and certain details of the glue applying device and its operating mechanism associated with the swedging anvil.

Fig. 31 is an enlarged vertical cross sectional view showing structural details of the swedging anvil and associated glue applicator device.

Fig. 32 is a plan view of the glue fountain and associated glue transfer wheel and mounting therefor, removed from its associated structure and as the same would appear when viewed from above.

Fig. 33 is an enlarged vertical cross sectional view showing further details of the swedging mechanism at the fluting and mouth forming station, as viewed along line 33—33 of Fig. 29.

Fig. 34 is a horizontal cross sectional view showing further details of the mechanism at the swedging and mouth shaping station as viewed along line 34—34 of Fig. 33.

Fig. 35 is a vertical cross sectional view of mechanism at the fluting and mouth forming station, this view more particularly showing the glue applicator device in position within the bottle body, the swedging anvil inserted in operating position within the bottle body, and the associated swedging devices and bottle mouth shaping devices in forming engagement with the bottle body.

Figure 36:
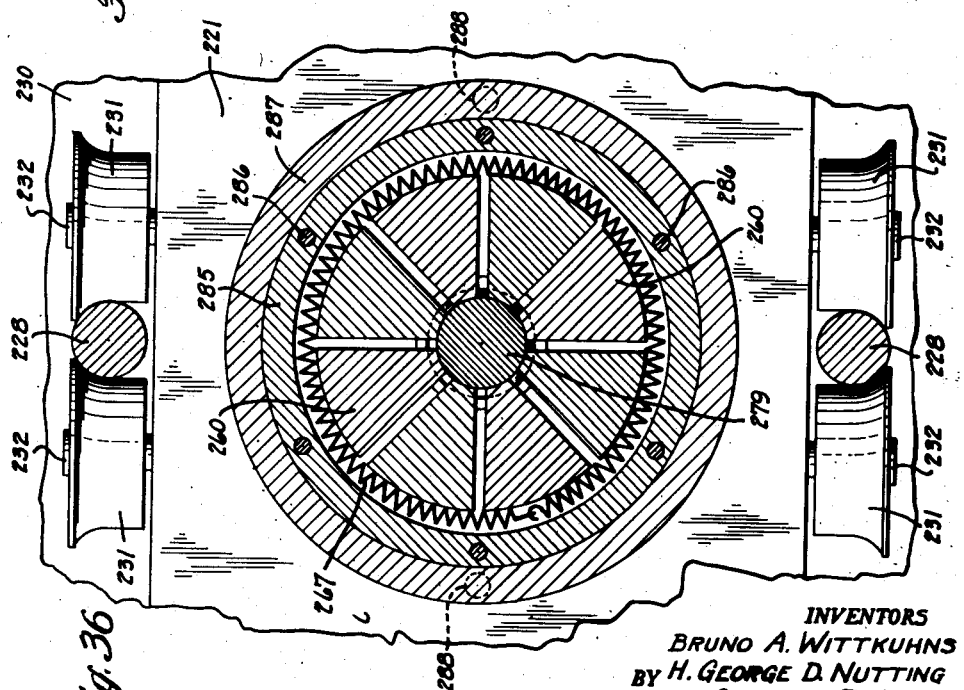

Fig. 36 is an enlarged horizontal cross sectional view showing further details of the mouth shaping devices at the fluting and mouth forming station as viewed along line 36—36 of Fig. 35.

Figure 37:
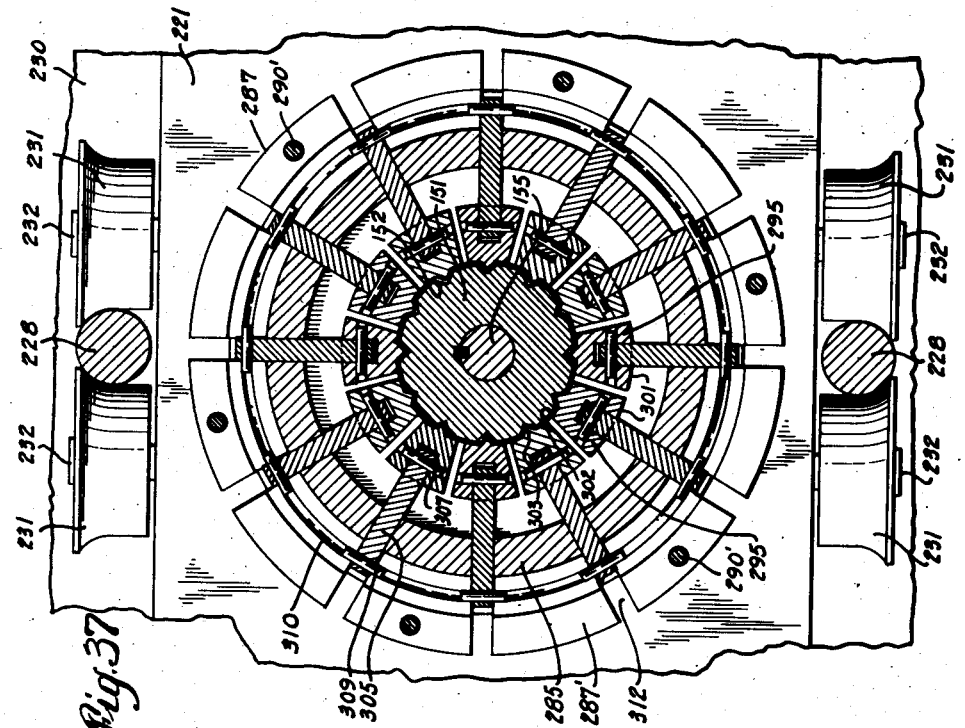

Fig. 37 is another enlarged horizontal cross sectional view of the mechanism at the fluting and mouth forming station, this view showing more particularly certain details of the swedging devices as they appear when in flute forming engagement with the bottle body as viewed along line 37—37 of Fig. 35.

Fig. 38 is a plan view of the mechanism at the bottom disc punching and disc inserting station of the machine, this view also showing certain details of the feeding mechanism for effecting controlled advance of the paper strip from which the bottom discs are punched.

Fig. 39 is an enlarged vertical cross sectional view showing further details of the bottom disc punching and inserting mechanism and the mechanism for effecting controlled advance of the paper strip, this view being taken along line 39—39 of Fig. 38.

Fig. 40 is an enlarged vertical cross sectional view of one of the stroke cushioning dash pots associated with the bottom disc punching and inserting mechanism, this view being taken along line 40—40 of Fig. 39.

Figure 41:
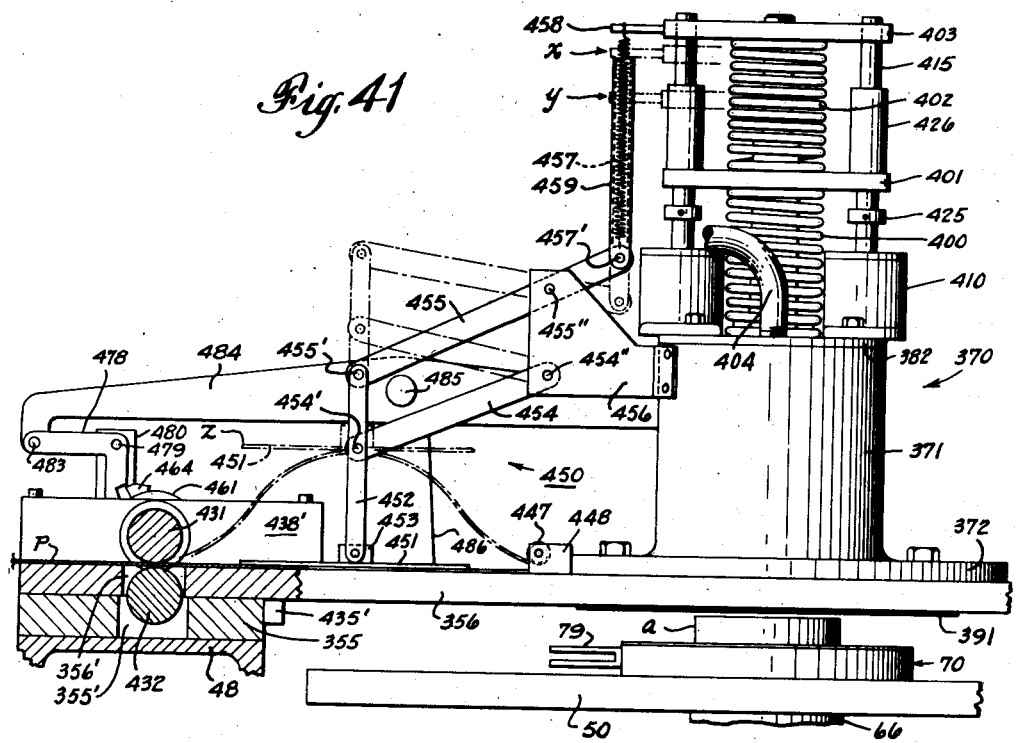

Fig. 41 is an elevational view of the bottom disc punching and inserting mechanism, this view particularly showing the rider device which may be employed to insure positive and substantially instantaneous insertion of the paper strip into the bottom disc punching mechanism in synchronized relation to the punching stroke thereof.

Figure 42:
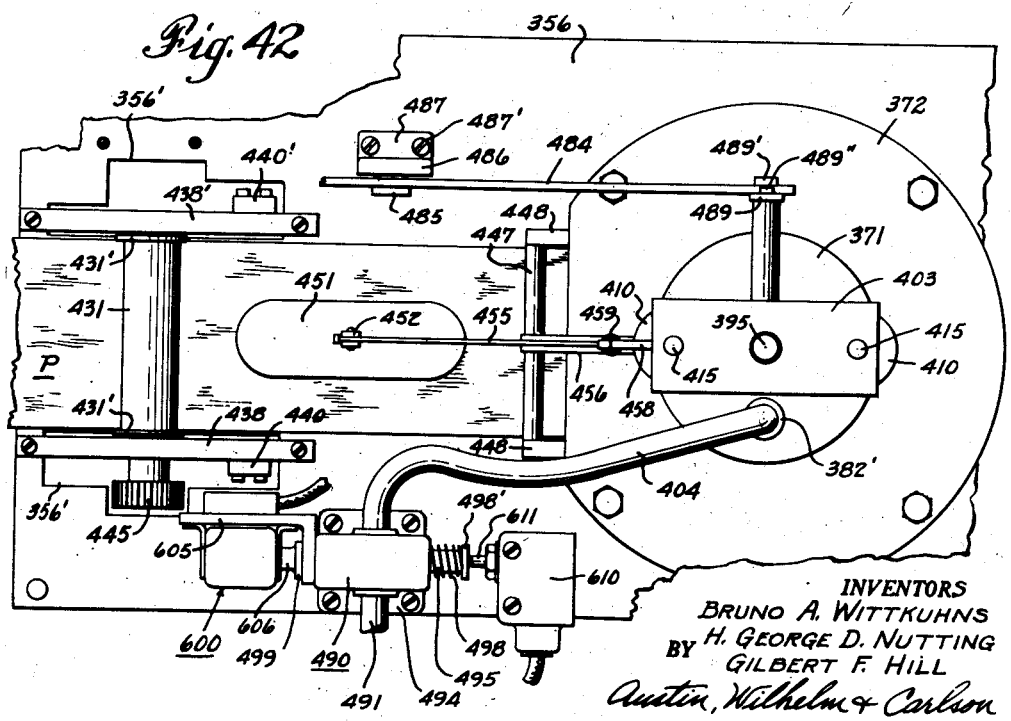

Fig. 42 is a plan view of the bottom disc punching and inserting mechanism, including the paper strip rider device as shown in Fig. 41.

Fig. 43 is a vertical cross sectional view of the bottom disc punching and inserting mechanism as the operating parts thereof would appear after the completion of the disc punching stroke, but prior to the completion of the disc inserting stroke.

Fig. 44 is a vertical cross sectional view of the bottom disc punching and inserting mechanism as the operating parts appear at the completion of the disc inserting stroke.

Fig. 45 is a transverse cross sectional view showing the clutch and drive mechanism associated with the paper strip advancing rollers as the same would appear when viewed along line 45—45 of Fig. 38.

Fig. 46 is an elevational view showing certain parts of the clutch mechanism as they appear when in roller driving relationship, as viewed along line 46—46 of Fig. 45, this view also showing certain details of the clutch manipulating device which operates to disengage the clutch in the event a bottle body has not been advanced to the bottom disc inserting station.

Fig. 47 is another elevational view of the clutch associated with the strip advancing rollers as viewed along line 46—46 of Fig. 45, this view showing the clutch parts manipulated to non-driving position by the clutch manipulating device.

Fig. 48 is an exploded view showing parts of the clutch in further detail.

Fig. 49 shows one of the compressed air control valves in enlarged cross sectional view, this view also showing diagrammatically the pneumatic bottle blow-out or ejecting mechanism, parts of the swedging station mechanism, and the pneumatically operated bottom disc punching and inserting mechanism whose operating characteristics are controlled by the compressed air control valve operatively connected thereto.

Figure 50:
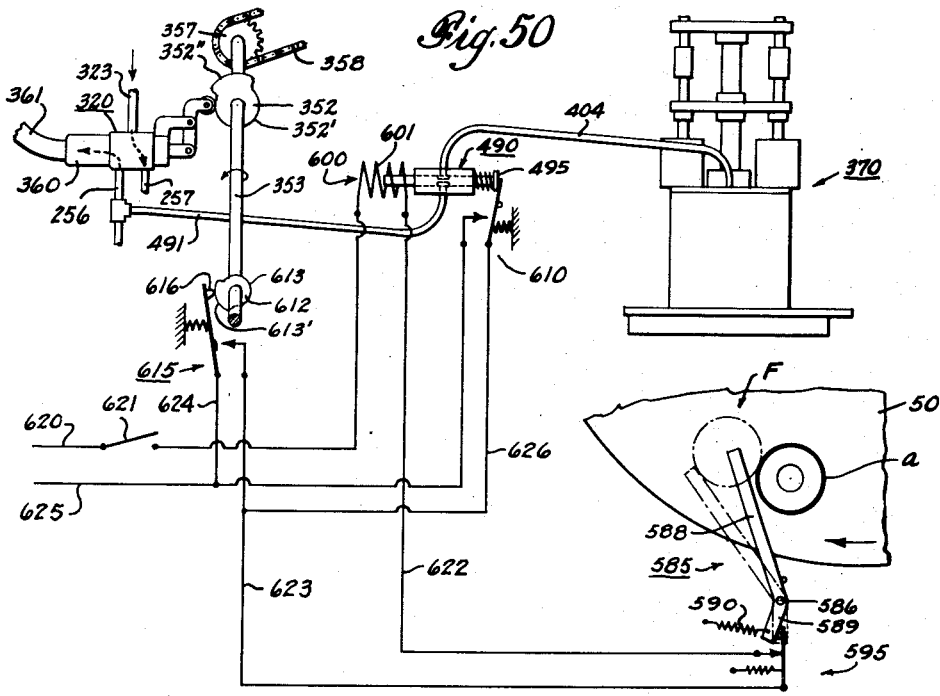

Fig. 50 is a wiring diagram for the electrical controls which further control the operation of the bottom disc punching and bottom disc inserting mechanism.

Figure 51:
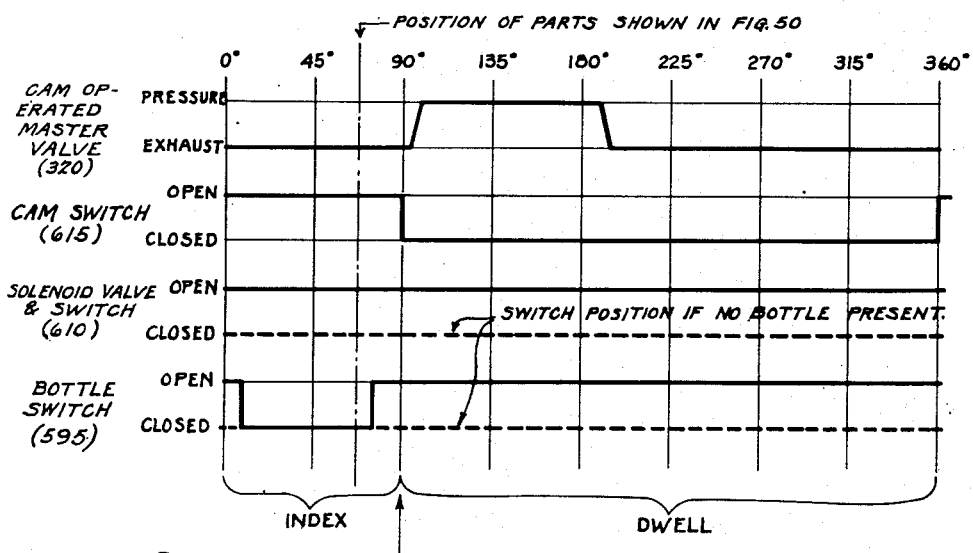

Fig. 51 is an operational diagram which illustrates the operating characteristics of the various controls associated with the bottom disc punching and bottom disc inserting mechanism.

Fig. 52 is an elevational view of the spinning mechanism located at the bottom spinning station of the machine.

Fig. 53 is a vertical cross sectional view of the bottom spinning head and associated manipulating mechanism in position prior to spinning the bottom end of the bottle body, as viewed along line 53—53 of Fig. 52.

Fig. 54 is a cross sectional detail of the spinning head as viewed along line 54—54 of Fig. 53.

Fig. 55 is an enlarged cross sectional detail of the spinning roller associated with the spinning head and the clamping mechanism associated with the bottle receiving cell as these parts appear in relation to one another when the bottle spinning operation has been substantially completed.

Figure 56:
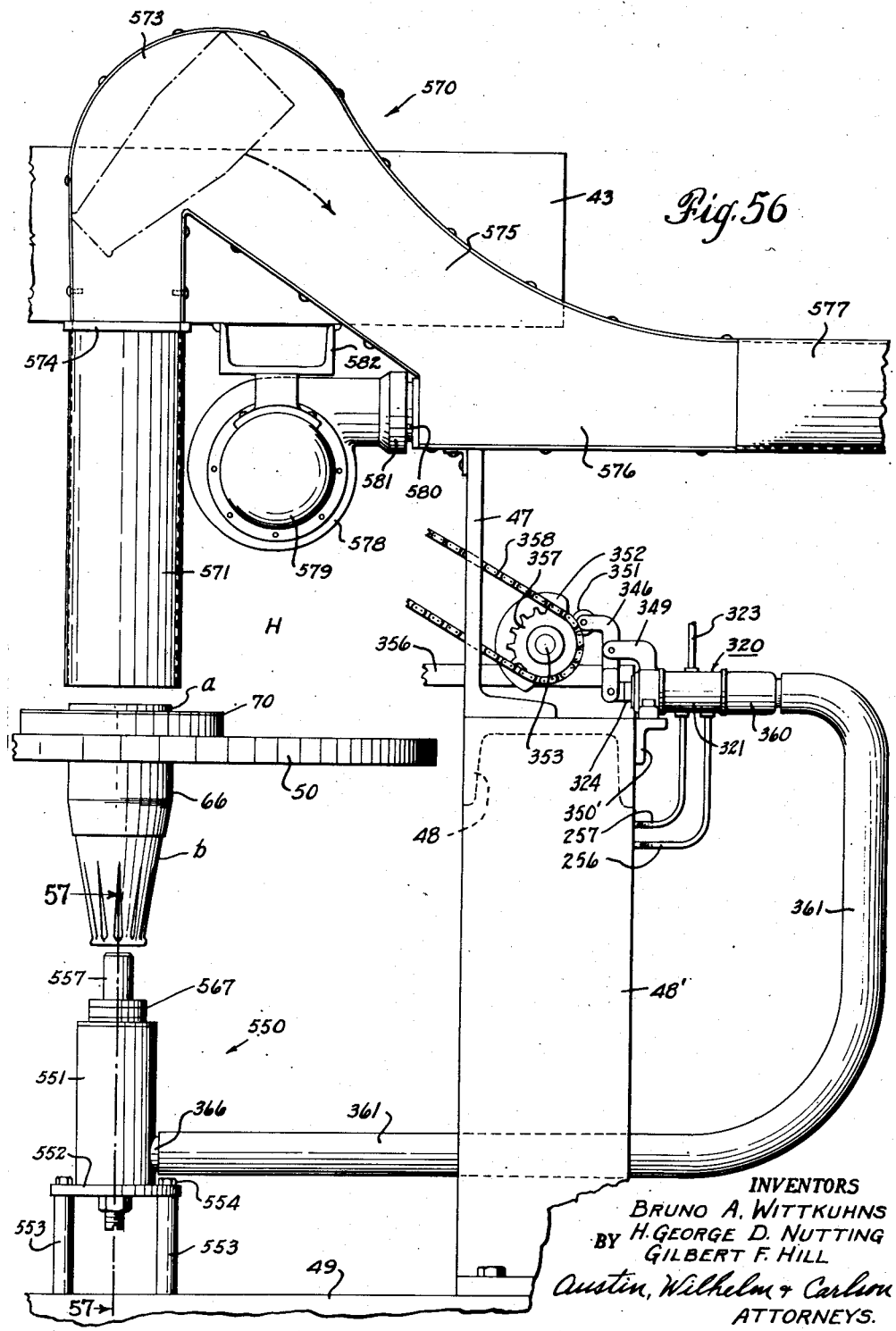

Fig. 56 is an elevational view, partly in cross section, of the pneumatic mechanism for blowing-out or ejecting the finished bottle from the machine.

Fig. 57 is a vertical cross sectional view of the pneumatic bottle ejecting gun, as viewed along line 57—57 of Fig. 56, this view also showing the bottle body in position for ejection from the machine; and Fig. 58 is another vertical cross sectional view of the pneumatic bottle body ejecting gun similar to Fig. 57, but with the parts thereof as they appear when in process of pneumatically ejecting the completed body from its supporting cell.

Similar reference characters refer to similar parts throughout the several views of the drawing and throughout the specification.

Figure 1:
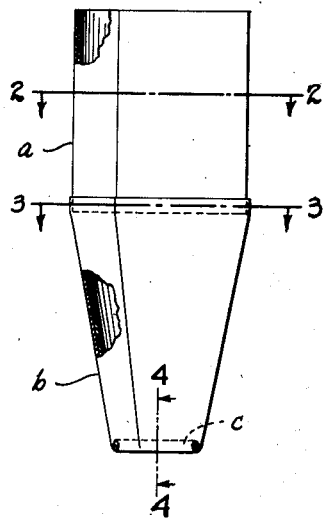
Figure 2:
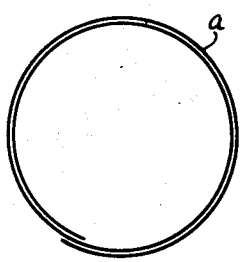
Fig. 2 is a cross sectional view through the cylindrical part of the bottle body showing the double ply construction thereof, this view being taken along line 2—2 of Fig. 1.
Figure 3:
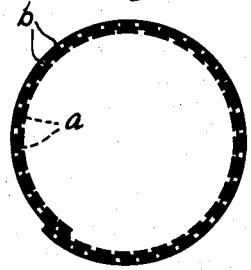
Fig. 3 is a cross sectional view of the bottle body showing the interleavened relationship of the overlapping plies forming the mid-sectional seam of the bottle body with the ply forming the cylindrical part of the bottle body being shown in dotted lines, this view being taken along line 3—3 of Fig. 1.
Figure 4:
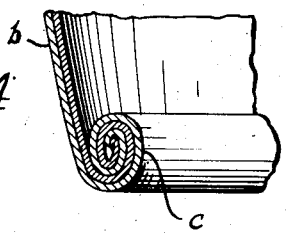
Fig. 4 is an enlarged fragmentary sectional view particularly showing the rolled bead at the mouth end of the bottle body as the same would appear when viewed along line 4—4 of Fig. 1.

The bottle body is received by the machine disclosed in this application in the form shown in Figs. 1, 2 and 3. In this form, the bottle body comprises a cylindrical part a and a truncated conical part b formed respectively from a rectangular blank and an arcuate blank of suitable paper material, the blanks being cut in the form of the blanks shown in Fig. 15, with adhesive g applied thereto as indicated. A rectangular blank and an arcuate blank are wound onto a mandrel 10 of the mandrel supporting turret 1, illustrated in Figs. 12, 13 and 15, while the mandrel is in residence at the winding station A (Fig. 15).

The mandrel supporting turret 1, as generally illustrated in Figs. 12, 13 and 15, may comprise a hollow hub section 2 upon which a plurality of radially arranged mandrels 10 are rotatably mounted, four mandrels being shown as mounted on the turret 1 as illustrated. The hollow hub section 2 is suitably supported upon a pair of horizontal axially aligned stub shafts 3, one of the stub shafts having a Geneva gear 4 fixed thereto. The Geneva gear 4 is driven by a Geneva drive member 5 which is continuously rotated by a drive gear 6 fixed thereto, gear 6 meshing with a drive worm 7 fixed to the main drive shaft 8. The Geneva gear 4, as illustrated in Fig. 15, has four cam grooves 4', so that the Geneva gear 4 and the mandrel supporting turret 1 is rotated through a quarter revolution with each full rotation of the Geneva driving member 5. The Geneva drive member 5 is rotated at a speed which will permit residence of each of the mandrels at the respective forming stations A, B, C and D, for a predetermined dwelling interval.

A pair of oppositely arranged rotatably driven pressure rollers 11 are located at the winding station A, each pressure roller being driven from a shaft 12 which carries a gear 13 in mesh with a corresponding gear connected to the base end of the pressure roller, as generally illustrated in Fig. 15. The shafts 12 are driven in unison as by a suitable drive which may comprise a pulley 14 fixed to one of the shafts and carrying a belt 15 trained around a corresponding pulley fixed to the other shaft. One of the shafts 12 carries a pulley 16 around which a drive belt 17 is trained, the drive belt 17 also being trained around a pulley 18 fixed to a main drive shaft 8. A sprocket wheel 19, fixed to the main drive shaft 8, carries a sprocket chain 20 connected to a suitable power source, thereby providing a continuous drive for the pressure rollers 11, as generally illustrated in Fig. 15.

At the winding station A, the rectangular blank is wound to provide the bottle body with a double ply cylindrical part a, the plies being adhesively bonded together, as indicated in Fig. 2. The arcuate blank is wound to form the double ply truncated conical part b of the bottle body, the plies being adhesively bonded together. The upper edge of the paper plies which form the cylindrical part are interleavened with the lower edge of the plies which form the truncated conical part, as indicated in Fig. 3, to provide a plural ply mid-sectional seam of leak-proof characteristics.

When the body forming blanks have been fully wound upon the mandrel at the winding station A, the turret 1 is rotated through a quarter revolution so as to advance the mandrel, encased by the bottle body, to a pressing station B, as diagrammatically illustrated in Fig. 15, where a second pair of pressure rollers 21 operate to firmly compress the plies of the bottle body in adhesively bonded relationship, and to iron out the surfaces thereof, during the interval that the bottle body and its supporting mandrel is at residence at the pressing station B. At least one of the pressure rollers 21 is positively driven so as to rotate the bottle body and its supporting mandrel. This driving power may be supplied through a train of gears 22 operatively connected to one of the pressure rollers 21, the gear train 22 being driven from another train of gears 23 in mesh with the gear 13 associated with one of the drive shafts 12 located at the winding station A.

After the pressing operation has been completed at the pressing station B, the mandrel supporting turret 1 rotates through a second quarter revolution to advance the mandrel and its supported bottle body to residence position at the mouth spinning station C, as generally illustrated in Fig. 15. A continuously driven spinning head 24 is located at the spinning station, the spinning head 24 being fixed to one end of a supporting shaft 25 which is continuously driven from a suitable driving motor 26. The spinning head 24 is also mounted to have axial movement, whereby the spinning head may be advanced into spinning engagement with the mouth end of the bottle body in residence at the mouth spinning station C, and then retracted from the spun mouth of the bottle body.

The mechanism for axially advancing and retracting the spinning head 24 may comprise a suitable bearing assembly 27, rotatably supporting the spinning head shaft 25, and contained within a tubular casing 28. A linkage device 29, suitably connected to the bearing member 27 contained within the cylindrical casing 28, is operably connected to a rocking lever 30 mounted for rocking movement on a pivot shaft 31. The rocking lever 30 carries a cam roller 32 which rides on a cam 33 fixed to a continuously rotating shaft 34, the shaft 34 being driven by a drive chain 36 trained over sprocket 35 fixed to the shaft 34. The cam roller 32 is maintained in rolling engagement with the cam 33 by means of a tension spring 30' secured to the casing 28 and the rocking lever 30. The drive chain 36, as shown in Fig. 13, may be driven from a suitable sprocket 37 (Fig. 13) fixed to the driven stub shaft which supports the Geneva driving member 5.

Upon completion of the mouth spinning operation at the mouth spinning station, the mandrel and the bottle body supported thereon is advanced to a stripping station D, this advance being effected by a quarter revolution of the mandrel supporting turret. Mechanism is provided at the stripping station D for stripping the then downwardly directed bottle body from its supporting mandrel during residence of the mandrel at the stripping station D.

In general, the bottle body stripping mechanism comprises a pair of vertically reciprocating stripping dogs 38 which are guided in their reciprocating movement by a pair of guide rods 39, as generally illustrated in Fig. 17. The paired stripping dogs 38 are designed to be swung into engagement with the uppermost free edge of the cylindrical part a of the bottle body, and with the downward stroke thereof, operate to forcibly strip the bottle body from its supporting mandrel. Upon completion of the stripping stroke, the stripping dogs 38 are raised into abutment against abutment plates 40 at the upper end of the guide rod 39 with an abutment pressure which swings the stripping dogs 38 away from the mandrel, to the positions down in Fig. 17.

The paired stripping dogs 38 are vertically reciprocated by means of a pair of stroking chains 41, the inner run of each chain being operably connected to the adjacent stripping dog. The stroking chains 41 are manipulated by a compressed air cylinder 42, as shown in Fig. 12, operably connected by a rack and pinion assembly 42' to the stroking chain 41.

The aligned horizontal stub shafts 3 of the mandrel supporting turret 1, as shown in Fig. 15, are rotatably mounted in bearing blocks 3' supported by the adjacent ends of a pair of parallel framing channels 43, as shown in Figs. 12, 13 and 17. The turret supporting ends of the framing channels 43 are secured to underlying spacer blocks 43' which rest on the adjacent ends of a second pair of parallel framing channels 44 extending forwardly of the machine. The forward ends of the framing channels 44 rest on a pair of parallel spacer sections 45 which in turn rest upon a cross frame 46 secured to a pair of front supporting legs 46'. The rear ends of the framing channels 43 are supported by a cross channel 47, as shown in Figs. 12 and 13, which in turn rest upon a cross frame 48 supported by rear supporting legs 48'. The front supporting legs 46' and the rear supporting legs 48' are supported by and secured to a raised foundation platform 49.

The constructional features of that section of the machine which produces the bottle body in the form illustrated in Figs. 1, 2 and 3, effected at the operating stations A, B, C and D in the manner above generally described, are fully disclosed in our copending application Serial No. 85,781, filed April 6, 1949, said machine section being operatively synchronized with the machine section disclosed and described in this application. It will accordingly be appreciated, that the machine section disclosed in our application Serial No. 85,781, filed April 6, 1949, and the machine section disclosed in this application, present mechanisms operating in synchronism to cooperatively effect the production of a finished paper bottle in the form illustrated in Fig. 11 of this application. To facilitate an understanding of the machine as a whole, Figs. 12 and 13 present opposite side elevational views of the complete machine, and in which the machine section as more fully described in our copending application Serial No. 85,781, filed April 6, 1949, is shown in structural and operating relationship with the machine section described in detail in the present application.

The machine section particularly described in the present application, incorporates a loading station D' which receives the bottle body formed as indicated in Fig. 1, and as stripped from its supporting mandrel at the stripping station D. From the receiving station D', the bottle body is progressively advanced to residence position at a fluting and mouth forming station E, thence to a bottom disc punching and inserting station F, thence to a bottom spinning station G, and thence to a bottle removing or ejecting station H, from which station the fully formed bottle as illustrated in Fig. 11 is pneumatically expelled from the machine.

*Steps in forming the completed paper bottle*

The bottle body is removed from its supporting mandrel 10 at the stripping station D in the form illustrated in Fig. 1, in which form the bottle body comprises a double ply cylindrical part $a$ connected by a mid-sectional seam to a truncated conical part $b$, formed respectively from a rectangular blank paired together with an arcuate blank in the manner above generally described. The mouth end of the truncated conical part of the bottle body has also been spun to provide an inwardly rolled bead $c$, as indicated more particularly in Fig. 4. The bottle body, in the form illustrated in Figs. 1, 2, 3 and 4 is stripped from its then downwardly directed supporting mandrel at the stripping station D and inserted downwardly in a receiving cell of a turntable carrier around which the additional operating stations, as more particularly described subsequently in this specification, are arranged in circumferentially spaced relationship.

The turntable carrier transports the bottle body in the form indicated in Fig. 1 from the receiving station D' to residence position at a fluting and mouth forming station E, where four complete forming operations are performed on the bottle body as indicated more particularly in Figs. 5, 6 and 7. These four operations comprise the formation of tapering creasing flutes $d$ in the truncated conical part $b$ of the bottle body. It will be noted by referring more particularly to Fig. 7, that the flutes begin just below the rolled bead $c$, at which area the flutes are of greatest depth and width. The flutes $d$ thence taper with decreasing width and depth to a vanishing point substantially above the mid-sectional seam of the bottle body. The creasing flutes $d$ serve to stiffen and strengthen the truncated conical part of the bottle body, provide a corrugated surface by means of which the bottle body may be more conveniently gripped, and serve to contract the truncated conical part to provide an inset neck $e$ directly below the rolled mouth forming bead $c$, thereby imparting an outwardly bulging contour to the exterior surface $f$ of the bottle mouth.

Secondly, as indicated in Fig. 7, the rolled mouth forming bead $c$ is compacted and somewhat flattened at the fluting and mouth forming station E. Thirdly, the interior surface of the compacted bead $c$ is shaped to provide an inset groove formation $c'$, defining adjacent inwardly bulging shoulders $c''$, which serve to provide receiving seats for a closure disc which may be used to cap and close the mouth end of the bottle body.

Fourthly, at the fluting and mouth forming station E of the machine, adhesive $h$ is deposited in the form of a narrow band extending circumferentially around the inside face of the cylindrical part $a$ of the bottle body adjacent the free end thereof. The band of adhesive $h$ provides means for adhesively securing the bottom disc $s$ within the cylindrical part of the bottle body.

At the bottom disc punching and inserting station F, a continuous strip P of paper material, of a type suitable for forming liquid containers, is advanced into engagement with cutting dies located at this station, which operate to cut a circular disc $s$ from the paper strip P to provide the bottom member of the paper bottle, as illustrated in Fig. 8. The circular disc $s$ is then pressed through a forming die which serves to dish the flat circular disc in a manner to provide a raised flange part $s'$ extending therefrom. This dish shaped bottom forming member is snugly fitted into the open cylindrical end of the bottle body, with the flange forming part s' thereof positioned adjacent the circumferentially extending band h of adhesive which bonds the flange s' to the inside face of the cylindrical part of the bottle body.

During the advance movement of the partially formed bottle having therefrom indicated in Fig. 8 from the bottom inserting station F, to residence position at the bottom spinning station G, clamping elements 85 associated with the turntable carrier are actuated so as to form an inwardly pressed shoulder k in the bottle body directly below the bottom forming disc s of the bottom member, as illustrated in Fig. 9. The inwardly pressed shoulder k provides a firm seat for the bottom member, the bottom member being thereby held immovable during the bottom spinning operation, performed at the bottom spinning station G.

When the thus formed paper bottle arrives in residence position at the bottom spinning station G, bottom spinning mechanism moves into engagement with the free end of the cylindrical part of the bottle body, and progressively rolls the free end section of the cylindrical part of the bottle body and the flange part s' of the bottom member together into the form of a tightly rolled bead m, as indicated in Fig. 10. The rolled bead m provides strengthening reinforcement for the bottom end of the paper bottle, provides a strong supporting seat for the bottom forming part s of the bottom member, and further provides a leakproof bottom seam for the paper bottle. It will be noted that the bottom forming part s is firmly locked in fixed position between the inwardly extending rounded shoulder k of the bottle body and the rolled bottom defining bead m, thus further assuring a formed paper bottle of accurately determined containing capacity.

The completed paper bottle is advanced from the bottom spinning station G to a removing station H, where the completed paper bottle, in the form shown in Fig. 11, is pneumatically ejected from the machine.

*The bottle body supporting turntable*

The structural details of the bottle body supporting turntable will be more clearly understood by referring to Fig. 14 and Figs. 18 to 25 inclusive. As shown in these figures, the turntable carrier comprises generally a circular turntable plate 50 of sturdy construction which is rotatably mounted on a rigid vertically extending pedestal post 51. The pedestal post 51 has a flared base section 51' which is suitably bolted to the raised foundation platform 49 of the machine.

The upper end of the pedestal post 51 has a contracted bearing neck 52 which supports the inner race of a radial and thrust bearing 53. A heavy mounting collar 54 provides a seat for the outer race of the thrust bearing 53, the mounting collar 54 being held in position by means of a clamp ring 55 secured to the mounting collar 54 as by suitable bolts 55'. A sturdy tubular casing 56 telescopes over the pedestal post 51 and its upper end is welded or otherwise firmly secured to the mounting collar 54. The turntable plate 50 has an axially extending opening through which the upper end of the tubular casing 56 extends, the turntable plate 50 being secured, as by bolts 58, to a projecting shoulder 57 extending circumferentially around the body of the tubular casing 56. A plurality of radially extending gusset plates 59, secured to the tubular casing 56 and the turntable plate 50, provide stiffening reinforcement so that the turntable plate 50 will not vibrate even though substantial pressure loads are applied to the perimeter thereof.

The lower end of the tubular casing 56 has a flanged collar 60 of generally angular cross section secured thereto. A bearing assembly 61 is mounted on and between the flanged collar 60 and the body of the pedestal post 51. Thus it will be noted that the thrust bearing 53 and the bearing assembly 61 provide a rotatable mounting for the tubular casing 56 and the turntable plate 50 supported thereon. The turntable plate is rotated by means of a sprocket wheel 62 adjustably secured to the flanged collar member 60 as by screw bolts 63 which extend through arcuate slot 63' in the projecting flange collar member 60, as shown more particularly in Figs. 16 and 19.

As shown more particularly in Figs. 18, 19, 24 and 25, a series of equally spaced cell holes 65 of generally circular shape extend through the turntable plate 50, six such cell holes being provided in the turntable plate disclosed in this application. A cell cup 66 of generally tubular form seats within each of the cell holes 65. Each cell cup 66 presents a generally tubular body section 67 whose inside diameter substantially conforms to the cylindrical part a of the bottle body, the tubular section 67 of the cup 66 terminating in a short truncated section 68 whose inside diameter substantially conforms to the tapered mid-sectional diameter of the bottle body. The cell cup 66 is provided with an outwardly flared flange 69 at the upper end thereof which snugly seats on that portion of the turntable plate 50 which surrounds the cell hole 65. Each cell cup 66 is thus suspended from the turntable plate 50 and provides a receptacle for snugly supporting a bottle body therein.

Each cell hole 65 is crowned by bottle body clamping device 70, as illustrated in Figs. 20–25, which comprises a heavy ring casing 71 presenting a vertically extending body wall 72 of generally cylindrical form, and an inwardly extending bottom wall 73 having an axially extending circular opening cut therein whose circular perimeter 73' substantially aligns with the inside face of the tubular section 67 of the cell cup 66. The ring casing 71 is firmly secured to the turntable plates 50 as by bolts 74 extending through suitable bolt holes 74' in the cylindrical wall 72 thereof. The laterally projecting flange 69 of the cell cup 66 is clamped between the bottom wall 73 of the ring body 71 and the turntable plate 50, in a manner to firmly secure the cell cup 66 in assembled position.

The upper face of the bottom wall 73 of the ring casing 71 is provided with four radially extending grooves 75 which extend from the inner perimeter 73' of the bottom wall 73 radially into the inner cylindrical face 72' of the body wall 72 of the ring casing, as shown more particularly in Figs. 20 and 21.

The pocket formed by the cylindrical wall 72 of the ring casing 71 is designed to snugly receive an actuating ring 76 formed as more particularly shown in Fig. 22. The actuating ring 76 presents a relatively heavy ring shaped body having an axial hole therein whose perimeter 76' substantially aligns with the inner perimeter 73' of the ring casing 71 when the actuating ring 76 is pocketed therein. A total of four chordal grooves 77 are cut into the upper face of the actuating ring 76 and extend from the outer perimeter of the ring inwardly for a substantial distance as indicated in Figs. 20 and 22. The bottom of each chordal groove 77 is punctured by an elongated slot 78 which extends through the actuating ring 76, and is accurately centered in the chordal groove 77. When the actuating ring 76 is properly nested within the ring casing 71, each chordal groove 77 will overlie and traverse the corresponding radial groove 75 formed in the bottom wall 73 of the ring casing 71, as shown more particularly in Fig. 20.

A manipulating stem 79 extends radially from the actuating ring 76, as shown more particularly in Figs. 20 and 22, the actuating stem 79 having an extension 79' of reduced thickness which extends into a radial receiving groove cut in the under face of the actuating ring 76, and is secured thereto by a suitable rivet 80, as shown more particularly in Fig. 24. Thus the thickness of the actuating ring 76 is maintained substantially uniform, so as to snugly nest within the pocket defined by the ring casing 71.

The manipulating stem 79 also projects through a notch 81 cut in the cylindrical wall 72 of the ring casing 71, the notch 81 being of sufficient arcuate extent to permit limited rotation of the actuating ring 76 pocketed within the ring casing 71. The outer end of the manipulating stem 79 is bifurcated to provide a slot 82 which receives the end of an actuating rod 83, the actuating rod 83 being secured to the manipulating stem 79 as by hinge pin 84 extending through a receiving hole 84' formed in the manipulating stem. Axial movement of the actuating rod 83 operates to rotate the actuating ring 76 through a predetermined limited arc.

The clamping device 70 also includes four clamping segments 85 of generally arcuate shape, as indicated in Figs. 20 and 23. One end of the arcuate clamping segment 85 is provided with a projecting head portion 86 designed to be slidably received in a receiving notch 87 cut in the adjacent end of the adjacent clamping segment. The inner arcuate periphery of each clamping segment 85 is provided with an overhanging rim 88 having a rounded clamping edge 88'.

The arcuately shaped clamping segments 85 are manipulated in unison by the actuating rod 83, in a manner to move the clamping rim 88 of each clamping segment 85 into and out of clamping engagement with the bottle body seated within the cell cup 66 of the bottle body receiving cell. This is effected by moving the four arcuate segments 85 radially inwardly to a point where the clamping rim 88 of each segment will engage the bottle body, and by moving the clamping segments 85 radially outwardly to withdraw the clamping rims 88 thereof out of contact with the bottle body.

These desired movements are effected through the action of a radial slide plate 90 which is fitted to snugly slide within the radial groove 75 formed in the bottom wall 73 of the ring casing 71, as shown more particularly in Figs. 20, 24 and 25. The lower face of the actuating ring 76 rests upon the four radially movable slide plates 90, slidably fitted within the radial grooves 75. A chordal slide plate 91 is fitted to slide within each of the chordal grooves 77 of the actuating ring 76. The head portion 86 of each arcuate clamping segment 85 rests upon the underlying chordal slide plate 91. A pivot pin 92 extends through each underlying radial slide plate 90, the overlying elongated slot 78 in the actuating ring 76, the chordal slide plate 91 sliding within the chordal groove 77 of the actuating ring, and finally into a receiving hole 92' formed in the overlying head portion 86 of the adjacent arcuate clamping segment 85. The clamping segments 85 and actuating ring 76 as thus assembled together are retained in the ring casing 71 by a cover plate 89 removably secured, as by screws 89', to the cylindrical wall 72 thereof.

When the actuating rod 83 associated with each bottle receiving cell is axially moved to the right, as indicated by the arrow placed on the actuating rod 83 as shown in Fig. 20, the actuating ring 76 is rotated counterclockwise as viewed in Fig. 20, thereby causing the radial slide plates 90 to radially slide towards the axis of the receiving cell, likewise causing each chordal slide plate 91 to slide towards the closed end of its associated chordal groove 77, and thereby causing the head portion 86 of each clamping segment 85 to move circumferentially into the receiving notch 87 in the adjacent clamping segment 85. Counterclockwise rotation of the actuating ring 75 as indicated in Fig. 20, thus causes the arcuate clamping segments 85 to contract together, to the extent permitted by the enlarged notches 87 into which the head portion 86 of adjacent segments interfit, and this contracting movement in turn positively drives the clamping segments radially inwardly to the extent necessary to bring the clamping rims 88 thereof into clamping engagement with the cell supported bottle body, as indicated in Figs. 9 and 10.

Axial movement of the actuating rod 83 to the left, as viewed in Fig. 20, causes clockwise rotation of the actuating ring 76, which ring movement causes the slide plates 90 to slide in their radial receiving grooves 75 radially outwardly, this movement also causing the chordal slide plates 91 to slide toward the open end of the chordal grooves 77 in the actuating ring 76, further causing each head portion 86 of each clamping segment 85 to partially withdraw from its receiving notch 87 in the adjacent clamping segment 85, radial outward movement of the clamping segments 85 being the final result. Thus it will be appreciated that by axially manipulating the actuating rod 83, the clamping rims 88 of the clamping segments 85 may be radially manipulated in unison into and out of clamping engagement with the bottle body seated within the bottle body supporting cell. A heavy coil spring 93, one end of which is attached to a suitable pin 94 projecting upwardly from the turntable plate 50 and the other end secured to a suitable pin 94' fixed to the manipulating stem 79, may be employed to automatically rotate the actuating ring 76 in a clockwise direction, as indicated in Fig. 24, when the axial force exerted by the actuating rod 83 is released.

A camming device 95, supported in stationary position by the pedestal post 51 of the turntable, may be employed to axially manipulate the manipulating rods 83 associated with the bottle body clamping mechanisms, the camming device 95 being so constructed as to radially manipulate the clamping segments 85 as the turntable plate 50 rotates through a predetermined arc. As shown more particularly in Figs. 18 and 19, the camming device 95 comprises an inverted cup shaped member 96 having a camming flange 97 projecting therefrom. The top wall 98 of the cup shaped cam member seats on the projecting flange of a collar member 99 which is fixed to the reduced neck 52' of the stationary pedestal post 51. The top wall 98 of the cup shaped cam member 96 is adjustably clamped to the collar member 99 as by means of a clamp plate 100 secured to the collar member 99 as by clamp screws 100'. A stud bolt 101, projecting from the reduced neck 52' of the pedestal post 51 and through the clamp plate 100, provides further means for securing the camming cup 96 in fixed position to the stationary pedestal post 51. It will be appreciated that the camming cup 96 may be adjustably oriented by a proper adjustment of the clamping screws 100' and associated clamp plate 100.

As shown more particularly in Figs. 18 and 19, each of the actuating rods 83 has an extension 83' whose free end supports a cam follower in the form of a roller 102. Each roller 102 is designed to have rolling contact with the camming perimeter of the camming flange 97 of the cup shaped cam member 96. Each actuating rod 83 is guided in its axial movement by a guide block 103 which encloses the extension section 83' of the actuating rod, each guide block 103 being suitably secured to the turntable plate 50. Adjustable nuts 104, threaded to the extension section 83' of each actuating rod 83, provide means for adjustably limiting the axial movement of the actuating rod 83, as the setting of the clamping segments 85 may require. The tension spring 93 associated with each actuating rod 83, insures rolling engagement of the roller 102 with the camming periphery of the camming flange 97 at all times.

From the above description it will be appreciated that bottle bodies, partially assembled in the form shown in Fig. 1, are successively seated at the loading station D' into successive receiving cells associated with the turntable carrier, and are thence progressively advanced to dwelling position at the respective operating stations located in spaced relationship around the periphery of the turntable carrier. The clamping device 70 associated with each bottle body receiving cell, manipulated by the camming device 95 supported from the pedestal post 51 of the turntable 50, operates to exert clamping pressure against the cylindrical part of the bottle body when the turntable plate 50 rotates through a predetermined arc, as will more particularly be described hereafter.

The turntable drive mechanism

The turntable plate 50 and its associated tubular casing 56 is rotated by driving mechanism which may be supported on the foundation platform 49 of the machine. It will be noted that the turntable plate 50, in the form illustrated in Figs. 14, 18 and 19, presents a total of six bottle body receiving cells, circumferentially arranged an equal arcuate distance apart. Thus a total of six operating stations may be circumferentially arranged around the turntable plate. However, in the machine as disclosed in this application, only five of the six operating stations have bottle manipulating mechanisms associated therewith, the sixth station remaining idle but adapted to receive such further bottle manipulating mechanisms as efficient production of paper bottles may require, or may be used as a safety station in connection with a suitable detecting device for stopping the machine in case the ejecting station has failed to remove the completed bottle. Such a detecting device may be similar in shape and function to the feeler finger device 585, Fig. 38 and Fig. 50, except that when actuated, it will cause the main drive air clutch 116 to disengage, the feeler finger device 585 and main drive air clutch 116 being hereinafter described in detail.

The turntable plate 50, as shown in this application, is rotated in successive steps through one-sixth of a revolution in approximately one-half second, with a dwelling interval of approximately one and one-half seconds between successive rotating steps. During each rotating step, the bottle body supporting cells are successively advanced in proper forming position to the successive operating stations D', E, F, G and H, and the idling station I. Thus, when the turntable plate 50 has made a complete revolution, all of the bottle forming operations, as indicated in Figs. 5 to 11 inclusive, will have been performed, the finished paper bottle ejected, and an empty receiving cell, from which a finished bottle has been previously discharged, will have been advanced to the loading station D'.

The mechanism for driving the turntable carrier as above indicated is illustrated in Fig. 16 and comprises a main driving motor 110, which is operably connected to rotate the sprocket wheel 62 attached to the tubular casing 56 of the turntable carrier, this driving connection being such as to effectuate step-by-step rotation of the turntable plate 50. The main driving motor 110 may have its V-belt drive 111 trained around a sheave 112 fixed to a hollow drive shaft 113, rotatably supported by suitable bearing blocks 114 mounted upon supporting brackets 115 fixed to the foundation platform 49. One end of the hollow shaft 113 is connected to the outer section 117 of an air clutch 116, the inner section 118 of the air clutch 116 being fixed to a drive shaft 119 in axial alignment with the hollow drive shaft 113. A compressed air line 120 is connected by a suitable coupling 121 to the projecting end of the hollow shaft 113 for the supply of compressed air to the air clutch 116.

The shaft 119, to which the inner section 118 of the air clutch 116 is connected, also has a sprocket wheel 122 fixed thereto around which the drive chain 20 is trained, the drive chain 20 also being trained around the sprocket 19 fixed to the main drive shaft 8 as shown in Figs. 13 and 15, and above described. Thus the main drive shaft 8, from which the mandrel supporting turret 1 is driven, is in turn driven from shaft 119 which is under the control of the air clutch 116.

The shaft 119 has a drive worm 123 secured thereto which meshes with a worm gear 124 secured to a vertically extending stub shaft 125, as more particularly illustrated in Figs. 16 and 17. A platform plate 126 is supported in spaced relation from the foundation platform 49 as by suitable spacer blocks 127. A sturdy U-shaped supporting bracket 128 is in turn supported by and bolted to the platform plate 126. The drive worm 123 and its associated worm gear 124 is enclosed within a gear casing 129 suitably fixed to the horizontal span of the U-shaped bracket 128. The gear casing 129 has a detachable covering section 130 which can be detached to provide repair access to the worm drive 123 and associated worm gear 124.

The gear casing 129 is provided with suitable bearing assemblies to rotatably support the shaft 119 to which the worm drive 123 is secured. The cover section 130 of the gear housing may also be provided with a suitable bearing assembly 132 which rotatably supports the upper end of the vertically extending stub shaft 125 to which the worm gear 124 is secured. The lower end of the stub shaft 125 is rotatably mounted in a bearing housing 133 secured to the platform plate 126, as indicated more particularly in Fig. 17.

A Geneva driving member 134 is fixed to the continuously rotating stub shaft 125, and may be located in housed position between the platform plate 126 and the horizontal span of the U-shaped supporting bracket 128. The Geneva driving member 134 has an arm 135 formed thereon, the projecting end of the arm 135 supporting a roller 136. The Geneva driving member 134 serves to drive a Geneva gear 137 which is fixed to a vertically extending stub shaft 138. The upper end of stub shaft 138 is rotatably mounted in an upper bearing assembly 139 fixed to the horizontal span of the U-shaped supporting bracket 128, the lower end of the stub shaft 138 being suitably journaled in a bearing assembly 140 supported by the platform plate 126.

The Geneva gear 137, as shown more particularly in Fig. 16, is provided with four equally spaced and radially extending camming grooves 141 designed to receive the roller 136 of the Geneva driving member 134. With each rotation of the Geneva driving member 134, it will be appreciated that the Geneva gear 137 is rotated through one-fourth of a revolution. Assuming that the machine is designed to produce paper bottles at the rate of thirty bottles per minute, the Geneva driving member 134 would be driven to make a complete revolution in two seconds, thereby rotating the Geneva gear 137 through one-fourth of a revolution in one-half of a second, the Geneva gear being held idle between the successive quarter revolutions for a period of approximately one and one-half seconds. The Geneva gear 137 is held in fixed stationary position during this dwelling period by the sliding contact between the rotating circular periphery 134' of the Geneva driving member 134 and one of the four arcuate concave portions 137' of the Geneva gear.

The stub shaft 138 which supports the Geneva gear 137 also has a sprocket wheel 142 secured thereto, which has the same step-by-step rotative movement as the Geneva gear 137. A sprocket chain 144, as shown more particularly in Fig. 16, is trained around sprocket wheel 142 and around sprocket wheel 62 adjustably secured to the tubular casing 56 of the turntable carrier. A predetermined tension is adjustably maintained on the drive chain 144 by means of a tensioning idler sprocket 145 in engagement with the drive chain 144. The tensioning sprocket 145 is rotatably mounted upon a suitable supporting bracket 146 adjustably secured as by bolts 147 to the platform plate 126. The sprocket wheel 62 of the turntable carrier may be adjustably oriented as operating conditions require, by manipulating the securing bolts 63 which extend through the arcuate slots 63' in the flange of collar member 60.

The sprocket wheel 142 connected to the shaft 138 of the Geneva gear 137 and the sprocket wheel 62 associated with the turntable carrier, have pitch diameters in the ratio of six to four, so that the turntable plate 50 is rotated through one-sixth of a revolution, when the Geneva gear 137 is rotated through a quarter revolution. It will be appreciated, however, that the driving relation ratio between the sprocket wheels 142 and 62 is determined by the number of container body receiving cells provided on the turntable carrier.

The bottle body loading station

The loading station D' of the machine, is located directly under the stripping station D, as is evident by referring more particularly to Figs. 12, 13 and 17. The mechanism associated with the stripping station D is operative to strip the bottle body in the form shown in Fig. 1, from its supporting mandrel 10 in residence position at the stripping station, and project the bottle body downwardly into the cell cup 66 simultaneously in residence position at the loading station D'.

It will be appreciated that the mandrel supporting turret 1 and the turntable carrier are driven in synchronism and have the same advance interval and the same residence interval. Thus the Geneva gear 4 associated with the mandrel supporting turret 1, and the Geneva gear 137 forming a part of the driving mechanism for the turntable carrier, both rotate through a quarter revolution simultaneously and in timed relation, and the sprocket wheel 62 associated with the turntable carrier is so adjusted as to advance the vertical axis of the cell cup 66, into axial residence alignment at the loading station D' with the vertical axis of the bottle body supporting mandrel 10 when the latter is in residence position at the stripping station.

As heretofore indicated, the stripping action is effected by a pair of stripping dogs 38, designed to be swung into engagement with the free edge of the cylindrical part a of the bottle body, and with the downward stroke thereof, operate to forcibly strip the bottle body from its supporting mandrel 10 and into seating position within the cell cup 66 in residence position at the loading station D'. The length of the vertical stroke of the stripping dogs 38 is indicated by the line r as shown in Fig. 17. Thus the stripping dogs 38 serve to press the bottle body into snug seating position within the cell cup 66.

The bottle body is stripped from its supporting mandrel and accurately loaded into the cell cup 66 by the stroke of the stripping dogs 38, during the residence interval of approximately one and one-half seconds. The clamping elements 85 associated with the clamping device 70 in residence at the loading station D', are fully retracted at loading station D' so as not to interfere with the effective insertion of the bottle body into seating position within the cell cup 66. When the clamping segments 85 are thus fully retracted, the cam roller 102 of the clamping device 70 will be in contact with the minimum diameter cam edge 97' of the stationary camming cup 96 (Fig. 18). When the bottle body has been thus accurately inserted into the cell cup 66 during its residence interval at the loading station D', the turntable plate 50 is rotated clockwise as indicated in Figs. 14 and 18 through one-sixth of a revolution to carry the cell cup, thus loaded with a bottle body, to residence position at the fluting and mouth forming station E. The cam roller 102 will then have moved onto an intermediate diameter cam edge 97" of the stationary camming cup 96, bringing the clamping rims 88 of the clamping segments 85 into firm gripping position against the bottle body in residence position at station E.

Mechanism at the fluting and mouth forming station

The mechanism for fluting the truncated conical part of the bottle body, for shaping the neck and mouth end of the bottle body, and for applying the band of adhesive h to the inside face of the cylindrical part of the bottle body, consists of devices mounted in axial alignment with the body supporting cell cup when the latter is in residence at station E.

This mechanism, best seen in Figs. 12, 17 and 26 to 35, generally comprises a swedging anvil 150 with which a superimposed glue applicator device 175 is associated, actuated by manipulating devices designed to project the swedging anvil 150 and the glue applicator device 175 resting thereon downwardly into the bottle body as supported by its cell cup 66 in residence position at station E, said manipulating devices also being operative to retract the swedging anvil 150 and the glue applicator device from the bottle body to a raised position, so as not to interfere with the stage rotation of the turntable plate 50, as generally indicated in Figs. 12 and 17.

The fluting and mouth forming mechanism also includes mechanism 220 mounted below the turntable plate 50 and in axial alignment with the swedging anvil 150, operative to exert fluting and neck forming pressure against the exterior of the bottle body as supported in cell cup 66, and also to exert bead compressing and groove forming pressure against the inside face of the mouth bead c.

As shown more particularly in Figs. 17, 27, 30, 31 and 35, the swedging anvil 150 comprises a truncated conical body 151 designed to fit snugly into the truncated conical part b of the bottle body, and has an overall length which is somewhat less than the truncated conical part b in which it is received. The outer surface of the truncated body 151 is provided with longitudinally extending fluting grooves 152 which commence near the enlarged base end of the truncated body 151 and continue with gradually increasing depth and width to the reduced end thereof. The reduced end of the truncated body 151 terminates in an outwardly flaring lip 153 which defines a neck portion 154 of reduced diameter. When the swedging anvil 150 is fully inserted in proper position within the bottle body as shown in Fig. 35, the reduced diameter neck 154 thereof will be positioned directly opposite the reduced neck e to be formed adjacent the mouth end of the bottle body as indicated in Figs. 5 and 7.

The swedging anvil 150 is supported by a vertically extending manipulating rod 155 whose lower end extends through an axial bore formed in the truncated body 151 thereof. The swedging anvil 150 is detachably secured to the manipulating rod 155 by means of a nut 156 inset into a conforming cavity 157 formed in the reduced end of the truncated body 151, the nut 156 being threaded to the threaded end 155' of the manipulating rod 155 (Fig. 31). A securing nut 158, inset into a conforming cavity 159 formed in the base end of the truncated body 151, is threaded to the adjacent threaded portion 155'' of the manipulating rod 155. Thus the truncated anvil body 151 may be adjustably secured in the desired vertical elevation to the manipulating rod 155 by a proper setting of the mounting nuts 156 and 158. The truncated anvil body 151 is held against rotation by a key element 159 secured in the body of the rod 155 and extending into a key slot 160 formed in the bore of the truncated anvil body 151.

The base end of the truncated anvil body 151 is also provided with an enlarged cavity 161, directly above the nut receiving cavity 159. The enlarged cavity 161 receives a rotatably mounted bumper ring 162, which may be made of a suitable rubber composition. The bumper ring 162 is rotatably mounted on a bearing assembly 163 supported by the adjacent section of the manipulating rod 155 and projects slightly above the base end of the anvil body 151.

As shown more particularly in Figs. 27 and 30, the upper end of the manipulating rod 155 is secured to a coupling block 164 which also carries a rubber bumper ring 165 on the lower end thereof. The coupling block 164 is detachably connected to a vertically extending rack member 166, as by securing bolts 166'. The rack member 166 and its associated manipulating rod 155 is vertically reciprocated by a pinion 167 which meshes with the rack member 166.

The pinion 167 is mounted upon a horizontally extending shaft 168 and resiliently connected thereto in driven relationship in such a manner that when rotation of pinion 167 is arrested by anvil 150 reaching its lowest position, the shaft 168 can still continue to rotate approximately a half revolution. Since the reciprocating means for moving the anvil 150 and the lower swedging mechanism 220, hereinafter described, are positively interconnected and driven by a common source of power, the resilient drive connection between pinion 167 and shaft 168 permits the anvil 150 to reach and stop at its proper position within the bottle body just previous to the final increment of upward movement of mechanism 220, during which incremental upward movement the mechanism 220 operates to form the flutes d and inset groove c' in the container body.

The resilient drive connection between pinion 167 and shaft 168 consists of a strong helical spring 171' surrounding shaft 168 (Fig. 27) which has one end anchored on the shaft and the other end anchored in the hub 167' of pinion 167. Spring 171' is loaded and so anchored that it urges pinion 167 in a counter-clockwise direction relative to the shaft as viewed from the left in Fig. 27. Spring 171' is maintained in its preloaded state by a pin 172' threaded into shaft 168 and having its projecting head in the path of a shoulder 173' which forms one end of a recess 174' in hub 167' provided by cutting away approximately half the hub 167' of pinion 167 (Fig. 30). Axial alignment of pinion 167 on shaft 168 is maintained by the head of pin 172' and a collar 175' fixed on the shaft adjacent the rear face of the pinion.

Thus, as shaft 168 is rotated counter-clockwise as viewed in Fig. 30, the pinion 167 rotates with it. When pinion 167 is arrested in its rotation, shaft 168 can continue to rotate approximately half a revolution, during which half revolution pin 172' moves away from shoulder 173' of recess 174' and spring 171' is put under additional tension. The shaft 168 is rotatably supported on a pair of spaced bearing blocks 169. The spaced bearing blocks 169 are secured to a horizontally extending support plate 170, as shown in Figs. 17, 27 and 30, the support plate 170 being suitably secured to the adjacent framing channel 43.

The pinion shaft 168 carries a sprocket 171 around which a drive chain 172 is trained, the lower end of the drive chain 172 being trained around a driving sprocket 173. As will presently appear, the driving sprocket 173 rotates clockwise and counter clockwise to thereby impart a reciprocating stroke to the swedging anvil 150. The rack member 166 extends through a suitable opening 170' in the support plate 170, permitting the rack member 166 to vertically reciprocate without obstruction. The rack member 166 is guided in its reciprocating movement by a guide roller 174 (Fig. 30) rotatably mounted upon a stub shaft fixed in the adjacent bearing block 169.

The rack member 166 is provided with an adjustable stop to limit its downward stroke and thus accurately position its attached anvil 150 in proper position in the container body ready for the swedging and bead groove forming operation. As shown in Fig. 27, an overhanging lug 160' is secured to the top of rack 166 and carries an adjustable stop screw 161' near its free end. Directly beneath stop screw 161' is a stop plate 162' fixed to the top of inner bearing block 169. Thus, in the downward travel of rack 166, when stop screw 161' contacts stop plate 162', the anvil 150 is in its proper operation position.

The glue applicator device 175, as shown more particularly in Figs. 30, 31 and 35, comprises a tire member 176 made of flexible rubber having flange portions 177 and 177' extending laterally from an enlarged diameter rim portion 178. The tire member 176 is so constructed and shaped that compressive force applied to the flange portion 177 and 177' of a nature which serves to compress the flanges together, will cause the outer surface of the rim portion 178 to increase in diameter. The tire member 176 is so fixed and proportioned that when no pressure is applied to the flanges 177 and 177' thereof, the rim portion 178 thereof will be loosely received into the cylindrical part of the bottle body, but when compressive force is applied to the flanges 177 and 177' thereof, the outer surface of the rim portion 178 will be sufficiently increased in circumference to press against the inside face of the cylindrical part of the bottle body.

The flange 177 of the tire member 176 seats within the peripheral cavity 180 of a collar member 179 threaded to the end of an inner tubular sleeve 181 which telescopes over the manipulating shaft 155. The inner tubular sleeve 181 is rotatably supported at its lower end by a bushing 182 designed to slide along and rotate upon the manipulating rod 155 extending therethrough, and the upper end of the tubular sleeve 181 carries a bushing 183 also designed to slide along and rotate upon the manipulating rod 155 extending therethrough.

The flange 177' of the tire member 176 nests within the peripheral groove 184 formed in an upper collar member 185. The collar member 185 forms a part of the lower end of an outer tubular sleeve 186 which in turn telescopes over the inner tubular sleeve 181. A slide ring 187, fixed within the lower end of the outer tubular sleeve 186, is designed to slide over the lower end of the inner tubular sleeve 181, and a similar slide ring 187' fixed within the upper end of the outer tubular sleeve 186 is designed to slide along the upper end of the inner tubular sleeve 181.

Thus it will be appreciated that the outer tubular sleeve 186 is designed to vertically reciprocate on the inner tubular sleeve 181 so as to vary the distance between the tire supporting collar members 179 and 185. A compression spring 188, nested between the tire supporting collars 179 and 185, serves to resiliently urge said collars apart and permit the flanges 177 and 177' of the tire member 176 to assume their normal expanded condition, so that the tire member 176 may be telescoped through the upwardly opening bottom end of the bottle body without contact with the inner surface thereof. It will be further noted that the inner tubular sleeve 181 is free to rotate and axially reciprocate on the manipulating rod 155, so that the tire member 176, the collar members 179 and 185, the outer tubular sleeve 186, and the inner tubular sleeve 181 may rotate and reciprocate as a unit, on the manipulating rod 155.

The outer tubular sleeve 186 is limited in its telescoping movement on the inner tubular sleeve 181 by spaced laterally projecting lugs 181' associated with the upper end of the inner tubular sleeve 181, as shown more particularly in Figs. 27, 28 and 30. The outer tubular sleeve 186 is provided with axial fingers 186' which interfit between the laterally projecting lugs 181'. The fingers 186' are of sufficient length so that they are at all times maintained in sliding engagement with the laterally projecting lugs 181'. The fingers 186' also serve to slidably lock the outer tubular sleeve 186 to the inner tubular sleeve 181 so that both tubular sleeves may rotate as a unit on the manipulating rod 155.

The outer tubular sleeve 186 reciprocates in a guide collar 189 fixed in a horizontally extending support plate 190 which may be suitably secured to the adjacent framing channel 44, as shown more particularly in Figs. 17, 27 and 30. The glue applicator device 175 normally rests on the resilient bumper ring 162 of the swedging anvil 150, and is thus normally raised and lowered along with the anvil 150. The laterally projecting lugs 181', however, are effective to independently suspend the glue applicator device 175, so that the anvil 150 may be advanced a distance downwardly therefrom, as indicated in Fig. 35.

Means are provided for rotating the glue applicator device 175 and its associated tubular sleeves 186 and 181 on the manipulating rod 155 and within the guide collar 189. This rotating means may comprise a gear 191 having an axial bore through which the outer tubular sleeve 186 freely telescopes, as shown more particularly in Fig. 30. The gear 191 carries a bearing assembly 192 which is rotatably supported by a heavy collar 193 embracing the guide collar 189 and secured to the under face of the support plate 190. It will be noted that the gear 191 has no rotating connection with the outer tubular sleeve 186 and may be rotated independently thereof. The gear 191 carries a rubber friction ring 191' which projects from the under surface thereof. The glue applicator device 175 is rotated when lifted by the abutting anvil 150 and its manipulating rod 155 to the point where the collar member 185 presses against the resilient friction ring 191' of the driven gear 191. This also serves to expand again the diameter of the glue tire 176 to bring same into contact with a glue transfer wheel 207.

The gear 191 is continuously driven by a driving gear 194 fixed to a vertical stub shaft 195 rotating in a bearing bracket 196 fixed to the under face of the support plate 190. The upper end of the stub shaft 195 is connected by a gear train 197 to the speed reducer 198 of a driving motor 199. The driving motor 199 operates to continuously rotate the gear 191 so that the glue applicator device 175 is automatically rotated when lifted upwardly into pressing contact with the gear 191.

A suitable adhesive is automatically applied to the outer surface of rim portion 178 of the tire member 176 when the glue applicator device 175 has been lifted into pressing engagement against the continuously rotating gear 191. The adhesive is supplied by a glue fountain 200 mounted adjacent the driven gear 191. The glue fountain 200 (Fig. 30) comprises a glue receiving cup having a cylindrical wall 201 and a removable bottom forming block 202. The bottom forming block 202 is detachably secured to the cylindrical wall 201 by one or more locking buttons 203 secured to suspension straps 203', as shown in Fig. 30, thereby facilitating working and cleaning of the fountain. The cylindrical wall 201 of the glue receiving cup is secured to a support plate 204, the plate 204 being adjustably secured to the superimposed support plate 190 as by screw bolts 205 extending through elongated slots 205' in the plate 204, as shown more particularly in Figs. 30 and 32.

The bottom forming block 202 of the glue receiving cup has a cavity 206 of adequate dimensions to contain a glue transfer wheel 207. A peripheral segment of the glue transfer wheel 207 normally extends through and completely closes a horizontal slot 208 cut in the cylindrical wall 201 of the glue receiving cup. The glue transfer wheel 207 is fixed upon a vertical pin 209 extending axially therethrough, each end of the pin 209 being rotatably supported by one end of a pair of horizontally extending springs 210. The upper and lower ends of the supporting pin 209 extend into adjacent radially extending guide slots 211 formed in the bottom block 202. Thus the glue transfer wheel 207 may be moved radially inwardly a desired distance toward the vertical axis of the glue receiving cup 200 so that upon the rotation of wheel 207 by its contact with expanded tire member 176 the gap between the perimeter of transfer wheel 207 and the slot 208 in the cup wall 201 permits a film of glue of measured thickness to pass from the cup on to the periphery of wheel 207 and thus transferred to the contacting rim portion 178 of tire member 176, the smearing application being facilitated by the curvilinear contour of the side edges defined by the glue escape slot 208.

The upper and lower springs 210 are wound around a vertically extending post 212 fixed in the bottom block 202, the ends of springs 210 bearing against a second post 213 also fixed in the bottom block 202. Thus, the springs 210 from which the axial wheel pin 209 is supported, operates to resiliently urge a segment of the glue transfer wheel 207 into the glue escape slot 208 so as to substantially seal the slot and prevent escape of glue therefrom. When the glue transfer wheel 207 is in its maximum slot closing position, it will be noted that a peripheral section of the wheel projects beyond the outer surface of the cylindrical wall 201 of the glue receiving cup.

The glue receiving cup is kept substantially filled with the selected adhesive supplied from a glue container 214 having a closure cover 215, the closure cover 215 having a glue spout 216 projecting downwardly into the glue receiving cup of the glue fountain 200, as shown more particularly in Fig. 30. The glue container 214 is supported in discharging position by a container supporting cradle 217 conveniently secured to the support plate 190. The cradle 217 has a bore 217' through which the discharge spout 216 extends. The support plate 190 also has an opening 218 through which the discharge spout 216 extends.

During the step rotation of the turntable plate 50 which advances the bottle body supporting cell to a position directly under the raised swedging anvil 150, as shown more particularly in Fig. 30, the manipulating rod will have been raised by its drive chain 172 to its maximum raised position. In this maximum raised position, the bumper ring 162 of the anvil will press against the lower collar member 179 so as to press the upper collar member 185 of the glue applicator device 175 into frictional pressing engagement with the continuously driven friction ring 191' of gear 191, to thereby rotate the glue applicator device 175.

The final increment of upward movement of the manipulating rod 155 also presses the bumper ring 162 of the anvil against the lower collar member 179 in a manner to raise the collar member 179 against the force of the compression spring 188, causing the flanges 177 and 177' of the tire member 176 to be compressed and the rim portion 178 thereof to expand outwardly, so that the rim surface thereof presses against the projecting perimeter of the glue transfer wheel 207, causing the glue transfer wheel to recede inwardly against the resilient action of the supporting springs 210. The expanded tire member 176, rotated by the continuously rotating gear 191, then has rolling contact with the projecting periphery of the glue transfer wheel 207, so that the viscous glue which covers the periphery of the inwardly pressed glue transfer wheel 207, is transferred to the surface of rim 178 of the rotating tire member 176. By the time the bottle body supporting cell cup has arrived in residence position at the swedging and mouth shaping station E, a layer of adhesive will have been applied to the outer circumference of the rim portion 178 of the tire member 176.

The instant that the bottle body, supported in its cell cup 66, has assumed residence position at the swedging and mouth shaping station E, the manipulating chain 172 is driven in a manner to give the manipulating rod 155 a rapid downward stroke, which downward stroke drives the swedging anvil 150 into operating position within the truncated conical part b of the bottle body stationed therebelow, as illustrated in Fig. 35. The glue applicator device 175, resting on the bumper ring 162 of the anvil, moves downward with the anvil 150.

During the initial increment of downward movement of the anvil body, the anvil pressure against the collar member 179 is released, permitting the compression spring 188 to separate the tire supporting collars 179 and 185 thereof, thereby permitting contraction of the rim portion 178 of the tire member 176 to normal position. When the tire member 176 is thus permitted to return to its normal position, it has sufficiently contracted to move out of contact with the glue transfer wheel 207, permitting the glue transfer wheel 207 to spring outwardly a sufficient distance to close the glue slot 208 and prevent leakage of glue therefrom. The glue applicator device 175 also ceases to rotate as it moves away from driving engagement with the gear 191.

The glue applicator device 175 is carried downward with the anvil 150 on which it rests, until the contracted tire member 176 thereof has been inserted through the open bottom end of the bottle body therebelow. The glue applicator device 175 will then have reached the end of its full downward stroke, since the laterally projecting lugs 181' associated with the upper end of the inner tubular sleeve 181 will then rest against a resilient mat 219, the mat 219 embracing the outer tubular sleeve 186 and secured upon the support plate 190, as shown more particularly in Fig. 30. The normally contracted tire member 176 will then present its glue carrying surface in the desired axial position within the bottle body, ready to transfer its adhesive in the form of a band $h$ to the inner surface of the bottle body, as indicated in Fig. 5. The inner sleeve 181 and associated glue applicator device 175 are thus suspended from the mat 219 as the anvil 150 continues its downward movement into pocketed position within the truncated conical part of the bottle body.

When the glue carrying tire member 176 has thus been accurately located within the bottle body, the transfer of adhesive from the tire member 176 to the bottle body is effected by compressing the flanges 177 and 177' thereof so as to bulge the rim portion 178 into glue applying contact with the inner surface of the bottle body in a manner to deposit the glue thereon in a precisely defined band $h$, as shown in Fig. 5. Compression of the flanges 177 and 177' of the tire member 176, to obtain the desired glue application, is effected by resilient pressure exerted by the bumper pad 165, which forms the lower surface of the coupling block 164 associated with the manipulating rod 155, during the final increment of downward stroke of the manipulating rod 155.

More particularly, downward pressure is exerted by the resilient pad 165 against the upper edge of the projecting fingers 186', as shown in Fig. 28, to thereby press the upper edge of the fingers 186' to the plane level of the upper face of the laterally projecting lugs 181'. This increment of downward movement, drives the outer tubular sleeve 186 downwardly over the inner tubular sleeve 181, and drives its associated collar member 185 towards the lower collar member 179 fixed to the inner tubular sleeve 181, thereby compressing the compression spring 188 and the flanges 177 and 177' of the tire member 176 in a manner to outwardly bulge the rim portion 178 thereof into glue applying contact with the inner surface of the bottle body.

When the fluting and mouth forming operation and the glue applying operation have been completed, the manipulating rod 155 is given a quick upward stroke by its manipulating chain 172 so as to vertically remove the swedging anvil 150 from the bottle body, lifting the glue applying device 175 with it to the position shown in Fig. 30. This removing operation is performed while the bottle body is still in residence position at the fluting and mouth forming station E. When the swedging anvil 150 has been fully lifted and removed from the bottle body, the turntable plate 50 is rotated one-sixth of a revolution so as to carry the fluted and mouth shaped bottle body to the next succeeding bottom applying station F.

Mechanism 220 is located at the fluting and mouth forming station E, directly below the residence position of the bottle body supporting cell cup 66 at this station, which mechanism cooperates with the swedging anvil 150, when fully inserted into the bottle body, to effect the desired fluting and mouth forming operation on the bottle body. The mechanism 220 is illustrated generally in Figs. 12 and 26, and in more detail in Fig. 29 and Figs. 33 to 37 inclusive.

The lower fluting and mouth forming mechanism 220 is supported by a vertically reciprocating platform 221 positioned directly below the swedging anvil 150, as shown more particularly in Figs. 12, 17, 26, 29, 33 and 35. The reciprocating platform 221 is encased within a framework comprising four vertically extending corner posts 222 whose lower ends are secured to a false bottom plate 230 extending into a conforming opening cut in the foundation platform 49. Each corner post 222 has an angular foot bracket 222' attached thereto adjacent the lower end thereof, each foot bracket being secured as by bolts 222'' to the foundation platform 49. The posts 222 are also rigidly connected by a pair of opposite side wall plates 223 and a pair of opposite side wall plates 224. A pair of spaced top wall plates 225 and 226 are each secured to the upper ends of the adjacent supporting posts 222 and the upper edge of the adjacent side wall plates 223, as shown more particularly in Figs. 29 and 34.

It will be noted that the inner edges 225' and 226' of the respective top plates 225 and 226 are so formed as to define an arcuate passage therebetween (Fig. 34), which passage permits movement of the turntable supported bottle bodies to and from centering position between the plate edges 225' and 226'. The upper end of one of the corner posts 222 may be partially cut away, as indicated at 222a in Figs. 33 and 34 to insure unobstructed movement of the turntable supported bottle body to fluting position between the spaced top plates 225 and 226. The lower fluting and mouth forming mechanism, contained within the framework above described, can be removed as a unit from the foundation platform 49 for repair and adjustment, by removing the foot attaching bolts 222''.

The reciprocating platform 221 is guided in its vertically reciprocating movement by a pair of spaced guide rods 228, as shown in Figs. 29 and 34. The upper end of one of the guide rods 228 is attached, as by means of a securing nut 229, to the fixed top plate 225 and the upper end of the other guide rod 228 is secured at the upper end thereof by a nut 229' to the fixed top plate 226. The lower ends of the guide rods 228 are secured to the false bottom plate 230. A pair of guide rollers 231 are designed to roll along the opposite sides of each guide rod 228, each guide roller 231 being rotatably mounted on a stub pin 232 extending from the adjacent edge of the reciprocating platform 221, as shown in Figs. 29 and 34.

The reciprocating platform 221, guided by its guide rollers 231 and associated guide rods 228, is vertically reciprocated by rack and pinion assemblies. As shown more particularly in Figs. 26, 33, 34 and 35, a pair of vertically extending rack members 235 and 235' are secured at the lower end thereof as by bolts 236, to the opposite side edges of the reciprocating platform 221. The inside face of each rack member is designed to slide along the outside face of the adjacent side wall plate 224. The lower edge 224' of each side wall plate 224, as shown in Fig. 35, is spaced a distance above the maximum raised position of the platform 221, so as not to interfere with the reciprocating movement thereof.

The rack member 235 meshes with a pinion 238 fixed to a shaft 239 rotatably mounted in bearing blocks 240 secured to the outside face of the adjacent side wall plate 224, as shown in Figs. 34 and 35. The pinion shaft 239 has a second pinion 241 secured to the outer end thereof which meshes with the teeth of a horizontally extending rack member 242, as shown more particularly in Figs. 26 and 34. The rack member 235', attached to the opposite edge of the reciprocating platform 221, meshes with a pinion 238' fixed to pinion shaft 239' rotatably supported in bearing blocks 240' secured to the adjacent side wall plate 224. The pinion shaft 239' has a second pinion 241' secured to the projecting end thereof which has a driving connection with a horizontally extending rack member 243. The rack member 242 is guided in its reciprocating movement by means of a guide roller 244 rotatably mounted on stub pin 245 fixed to and extending from the adjacent side wall plate 223. The rack member 243 is also guided in its horizontal reciprocating movement by a guide roller 246 rotatably mounted on stub pin 247 secured to and projecting from the adjacent side wall plate 223.

The rack members 242 and 243 are horizontally reciprocated by a compressed air cylinder 250, as shown more particularly in Fig. 26. The compressed air cylinder 250 is secured to a sturdy supporting bracket 251 as by bolts, the foot portion of the bracket 251 being bolted to the foundation platform 49 by suitable bolts 251'. The air cylinder 250 contains a piston head 252 whose piston shaft 253 has a coupling block 254 secured to the projecting end thereof. The rack member 242 has an extension 242' which is suitably secured to the coupling block 254 as by bolt 255, the end of the adjacent rack member 243 also being secured to the coupling block 254 as by means of a suitable bolt 255'.

A compressed air line 256 connected to the head end of the air cylinder 250, provides the compressed air power to drive the piston head 252 to the right as shown in Fig. 26, driving the pinion 241 clockwise and the pinion 241' counterclockwise, thereby effecting a raising movement of the reciprocating platform 221. A second air line 257 is connected to the base end of the air cylinder 250, supplying compressed air which drives the piston head 252 to the left as shown in Fig. 26, thereby rotating the pinion 241 counterclockwise and the pinion 241' clockwise, effecting thereby a lowering movement of the reciprocating platform 221. The flow of compressed air through airlines 256 and 257 is controlled by a compressed air valve 320 which operates in a manner which will be more fully described hereafter. It will be noted that the projecting end of the pinion shaft 239' also has the manipulating sprocket 173 secured thereto, around which sprocket the manipulating chain 172 is trained, the manipulating chain 172 operating to reciprocate the swedging anvil 150 in the manner previously described.

The reciprocating platform 221 supports a plurality of expansible bottle mouth shaping anvil segments 260, as shown more particularly in Figs. 35 and 36. The eight anvil segments 260, as shown in Fig. 36, interfit together to form an anvil ring with an open center. Each segment 260 presents radially extending side faces, and an arcuate inner end which tapers with gradually decreasing diameter from the lower to the upper surface thereof. The lower half of each segment 260 presents a laterally extending leg 265 terminating in an arcuate outer edge. A continuous coil spring 267 resiliently embraces the arcuate ends of the legs 265 of the assembled segments, the coil spring 267 operating to resiliently contract the segments 260 inwardly toward the vertical central axis of the segmental anvil ring so as to bring the adjacent side faces of adjacent segments into abutting contact.

A contracted neck portion 268 projects upwardly from the leg portion 265 of each segment, as shown more particularly in Fig. 35, each neck portion 268 presenting an arcuate periphery. Each neck portion 268 is crowned by an outwardly overhanging head portion 270 which presents an arcuate periphery shaped in conformity with the shape to be given to the inner face of the mouth bead c of the bottle body. As shown more particularly in Fig. 7, the outer perimeter of the overhanging head portion 270 presents spaced shaping grooves 272 and 273 formed to shape the inwardly projecting spaced shoulders c'' on the inside face of the mouth forming bead c, and an outwardly bulging rim portion 274 extending between the grooves 272 and 273 shaped to form the corresponding inset groove c' in the inside face of the mouth bead c, as indicated in Fig. 7.

The underfaces of the interfitting anvil segments 260 seat on the upper face of a sturdy supporting flange 275 which has a downwardly projecting tubular casing extension 276. The assembled segments 260 are held in sliding engagement with the flange 275 by a retaining plate 280 which overlies the segment legs 265 and projects inwardly towards the segment necks 268 and beneath the segment heads 270. The inner bore of the tubular casing 276 supports a pair of spaced bushings 277 through which a fixed cylindrical arbor 278 extends. The lower end of the arbor 278 is provided with a threaded neck portion 278' which extends through the reciprocating platform 221 and is removably fixed in axial alignment with the vertical axis of the swedging anvil 150 by a nut 278''. The upper end of the arbor 278 presents a truncated conical extension 279 designed to extend a variable distance into the central bore defined by the inner arcuate ends of the assembled anvil segments 260.

The supporting flange 275 of tubular casing 276 also supports an upper tubular casing 285 of enlarged inside diameter, designed to be telescoped upwardly over the truncated conical part b of the bottle body when the reciprocating platform 221 is raised, as indicated in Fig. 35. The lower end of the tubular casing 285 is secured to the peripheral edge of the supporting flange 275 as by suitable bolts 286. The tubular casing 285 may be provided with an inturned shoulder 285' which retains the ring plate 280 in fixed position.

The reciprocating movement of the tubular casing 285 is guided by an outer guide casing 287 which is supported in fixed position from the reciprocating platform 221 by a plurality of supporting rods 288. The upper end of each rod 288 is threaded into a threaded hole provided in the lower edge of the fixed casing 287. The lower end of each rod 288 is threaded and extends through a clearance hole in the reciprocating platform 221 to which it is secured by nuts 288'.

The upper end of the outer stationary casing 287 has a laterally extending flange 287' which provides a seat for a sturdy boss ring 290, the ring 290 being secured to the flange 287' as by bolts 290'. Boss ring 290 is secured as by welding in a conforming hole in a guide plate 291 generally rectangular in outline. The guide plate 291 supports two pairs of guide rollers 292 on diametrically opposite sides thereof, each pair of guide rollers 292 having rolling engagement with the adjacent guide rod 228 extending therebetween, as shown more particularly in Fig. 29. Each guide roller 292 is journaled on a suitable pin 293 extending from the heavy guide plate 291. Thus the guide rollers 292 are free to roll vertically along the track forming rods 228 when the reciprocating platform 221 is manipulated, thereby insuring true axial movement of the outer guide casing 287 and boss ring 290 thereby further insuring accurate axial alignment of the inner tubular casing 285 with the vertical axis of the swedging anvil 150.

A plurality of swedging segments 295 are pivotally supported within the tubular casing 285, twelve swedging segments being illustrated in the form of the invention in Figs. 35 and 37. The swedging segments 295 are designed to cooperate with the swedging anvil 150 inserted into the truncated conical part of the bottle body to form the flutes $b$ therein, and also to cooperate with the anvil segments 260 to shape the mouth end of the bottle body. The swedging segments 295 are swingably supported between a hinge plate 296 and the upper end of the inner tubular casing 285, the hinge plate 296 being properly secured to casing 285 and centered by a circular lip extension 297 projecting upwardly from the upper end of the inner tubular casing 285.

The hinge plate 296 has an axially extending circular opening designed to be telescoped over the bottle body, the opening being defined by a shaped circular edge 298 which serves to support the bottle body against lateral movement when the platform 221 has been raised to its maximum raised position. A hinge knuckle 299 is formed on the upper end of each swedging segment 295 which is received within a conforming socket formed in the under face of the hinge plate 296 and the adjacent lip extension 297 of the casing 285. As thus suspended, the lower ends of the swedging segments 295 may be swung radially inwardly and radially outwardly.

Each swedging segment 295 presents radially extending side faces, and an arcuate outer face 301 which generally conforms to the inside cylindrical surface of the tubular casing 285 in which the segments are mounted, as shown more particularly in Fig. 37. The inside face 302 of each swedging segment 295 also has a generally arcuate contour which conforms to the shape of the truncated conical part of the bottle body as finally formed. Each inside face 302 also presents an inwardly extending fluting rib 303, shaped to interfit with the adjacent fluting groove 152 in the swedging anvil 150 to form the flutes $d$ in the truncated conical part $b$ of the bottle body. Thus when the suspended swedging segments 295 are swung inwardly as shown in Figs. 35 and 37, the truncated conical part of the bottle body is compressed between the inner arcuate face 302 of the swedging segments 295 and the exterior fluted surface of the mandrel body 151 in a manner to form the longitudinally extending flutes $d$ in the bottle body.

The arcuate inside faces 302 of each swedging segment 295 also presents a neck shaping surface 304 formed to shape the contracted neck $e$ and the bulging exterior face $f$ at the mouth end of the bottle body. The mouth end of the bottle body is thus compressed between the neck shaping surfaces 304 of the swedging segments 295 on the outside of the bottle body, and the contracted neck portion 154 and the flared lip portion 153 of the swedging anvil 150 positioned internally of the bottle body, and also the shaped outer surfaces of the head portions 270 of the expanded anvil segments 260 positioned within the mouth of the bottle body. The arcuate inner faces of the swedging segments 295 are swung inwardly with sufficient pressure to effectively compress the truncated conical part of the bottle body against the forming surfaces of the swedging anvil 150 and the forming surfaces of the anvil segments 260, to effectively flute the truncated conical part of the bottle body, and effectively compress and shape the mouth end thereof into the form shown in Figs. 5, 6 and 7.

Knee action devices are provided for automatically swinging the swedging segments 295 inwardly into swedging engagement with the truncated conical part $b$ of the bottle body, when the platform 221, in the last portion of its upward movement, has been lifted to its maximum raised position. The knee action devices also operate to swing the swedging segments 295 outwardly away from the truncated conical part of the bottle body, during the initial downward movement of the platform 221 from its maximum raised position.

The knee action devices comprise a plurality of radially extending links 305. The inner end of each link 305 extends into an arcuate cavity slot 306 formed in the outside face of the adjacent swedging segment 295 and is pivotally connected thereto by a pin 307 extending transversely through the swedging segment and link, as shown more particularly in Figs. 35 and 37. Each link extends through a vertical guide slot 308 formed in the tubular casing 285, which contains the swedging segments 295, as shown more particularly in Figs. 29 and 33. The outer end of each link 305 is pivotally connected by a hinge pin 309 to the unitary guide member formed by guide ring 287 and boss ring 290.

Each hinge pin 309 may be snugly nested in a circumferentially extending groove 310 formed half in the upper face of the outwardly extending flange 287' provided on the upper end of the fixed guide casing 287 and half in the lower surface of boss ring 290. The setting of the hinge pins 309 in the appropriate location within the circumferentially extending groove 310 may be effected by detaching the bolts 293' which secure the boss ring 290 to the flange 287' of the fixed guide casing 287. The flange portion 287' of the tubular casing 287, and the lower end of the heavy ring collar 290, may be provided with vertically aligned radially extending slots 312. Thus the outer ends of the links 305 are free to hinge on their outer hinge pins 309.

It will be noted that when the platform 221 is in its lowermost position, the links 305 incline upwardly, as shown more particularly in Fig. 33, in which position the swedging segments 295 are swung outwardly adjacent the inside face of containing casing 285. The links 305 remain in their outswung position during the first stage of upward movement of the platform 221.

Means are provided to resiliently support the tubular casing 276, flange 275, anvil segments 260, upper tubular casing 285 and swedging segments 295 above the platform 221, so that when the platform 221 moves upwardly, the final increment of movement is independent of movement of the tubular casing 276 and upper tubular casing 285 and thereby causes the truncated end 279 of the arbor 278 to be projected into camming engagement with the segments 260, thereby forcing expansion of the anvil segments 260, against the tension of spring 267, to the point where the head portions 270 thereof will move into engagement with the inside face of the mouth end of the bottle body and, at the same time, forcing swedging segments 295 into engagement with the outer surface of the conical end of the bottle body.

The resilient means for supporting the tubular casing 276, flange 275, and associated parts comprises a plurality of vertically extending rods 281, each having a threaded upper end which is threaded into the supporting flange 275. The lower threaded end of each rod 281 extends through a clearance hole 221' in the reciprocating platform 221, and carries an abutment nut 282. A relatively heavy compression spring 283 embraces each of the rods 281, the lower end of each compression spring 283 seating against the reciprocating platform 221 and the upper end thereof seating against the supporting flange 275. The compression springs 283 operate to normally support the supporting flange 275 in the raised position indicated in Fig. 33, which raised position is defined by the adjustable nuts 282 abutting against the under face of the reciprocating platform 221.

It will thus be appreciated that the compression springs 283 normally support the flange 275, and the anvil segments 260 resting thereon, in raised position, so that the anvil segments 260 are normally raised above the truncated conical end 279 of the arbor 278, and contracted by the surrounding tension spring 267 to the point where the head portions 270 of the anvil segments 260 will telescope into the mouth end of the bottle body when the platform 221 has been raised to the required degree. However, when the downwardly moving swedging anvil 150 reaches its final pocketed position within the truncated conical part b of the bottle body, the upwardly moving platform 221 causes a bumper pad 315 mounted on flange 316 of upper casing 285 to contact the under surface of frame plates 225 and 226, and the anvil segments 260, flange 275, upper casing 285 and swedging segments 295 can rise no further and are now in operating position. The final increment of upward movement of the platform 221 operates to compress the compression springs 283 and permits the platform 221 to move away from nuts 282 and drives the tapered end 279 of arbor 279 further into the central tapered aperture of the assembled anvil segments 260 and thus expands them to meet the bottle body bead c and re-form the inside face of the mouth portion of the bottle body.

Also, during this final increment of raising movement of the platform 221, it will be noted that the swedging segment supporting casing 285 remains substantially stationary, but the outer guide casing 287, rises with the final increment upward movement of the platform 221 to which it is sturdily fixed. Thus, the guide casing 287 is forced to telescope upwardly over the tubular casing 285, causing the links 305 to swing to a substantially horizontal position, as shown in Fig. 35, thereby pushing with increasing force, the lower end of the swedging segments 295 into fluting engagement with the truncated conical part of the bottle body.

During the initial stage of its downward movement, the platform 221 will be moved from its maximum raised position as shown in Fig. 35, down to the location of the nuts 282 secured to the ends of the rods 281. During this initial downward movement the guide collar 287, rigidly fixed to the platform 221, will be carried downwardly a sufficient distance to cause the links 305 to move from horizontal swedging position, as shown in Fig. 35, to a sharply inclined position. This knee action of the links 305 causes the swedging segments 295 to which they are hingedly attached to swing outwardly away from the bottle body. During this initial downward movement of the platform 221, and until the platform 221 has moved into abutment against the abutment nuts 282 of the rods 281, the heavy coil springs 283 will maintain the supporting flange 275 and the anvil segments 260 supported thereon in raised position.

However, during this initial downward movement of the platform 221 to the location of the abutment nuts 282, the arbor 278 attached to the platform 221 will move downwardly, withdrawing the tapered camming end 279 of the arbor 278 from the axial hole defined by the inner arcuate faces of the camming segments 260. Withdrawal of the tapered camming end 279 from the conical bore defined by the assembled anvil segments 260, permits the continuous tension spring 267 to inwardly contract the anvil segments 260, so that the forming peripheries thereof are moved away from the inside face of the formed mouth end of the bottle body, which contracting movement takes place before the head portions 270 of the anvil segments 260 are downwardly withdrawn from the mouth end of the bottle body.

During that stage of downward movement of the platform 221 from the elevation where the platform first moves into contact with the abutment nuts 282 to the lowermost rest position of the platform, the rods 281 and the supporting flange 275 are moved downwardly with the platform, causing downward withdrawal of the contracted head portions 270 of the contracted anvil segments 260 from the mouth end of the bottle body. When the platform 221 will have reached the end of its maximum downward travel, as shown in Fig. 29, the tubular casing 285 will have been carried below the mouth end of the bottle body, so that the fluted and mouth shaped bottle body may be freely transported without interference, by the step rotation of the turntable plate 50, to the next succeeding bottom disc blanking and inserting station F.

The swedging anvil 150 and its associated glue applicator device 175 is reciprocated in synchronism with the vertically reciprocating movement of the platform 221 and its associated bottle body forming devices. Thus the swedging anvil 150 and its associated glue applicator device 175 makes a complete downstroke and a complete upstroke, simultaneously with the complete upstroke and downstroke of the platform 221, all of which strokes are performed and executed during the residence interval of the bottle body at the fluting and mouth forming station E.

The downstroke of the swedging anvil 150 and its associated glue applicator device 175, along with the simultaneous upstroke of the platform 221 and its associated bottle body forming devices, is effected by the stroke of the piston head 252 contained in the air cylinder 250 as it moves to the right, from the head end to the base end of the air cylinder 250, as shown in Fig. 26. The upstroke of the swedging anvil 150 and its associated glue applicator device 175, simultaneously with the downstroke of the platform 221 and its associated forming devices, is effected by the power movement of the piston head 252 to the left, from the base end to the head end of the air cylinder 250, as indicated in Fig. 26. The reciprocating movement of the piston head 252 as above indicated, is controlled by a master control valve 320 which controls the flow of compressed air alternately through the air supply lines 256 and 257, connected to opposite ends of the driving cylinder 250.

The compressed air control valve 320, as shown more particularly in Figs. 26 and 49, comprises a valve casing 321 having an inlet coupling 322 centrally of the body thereof, connected to the compressed air supply line 323. A valve stem 324 extends axially through the casing 321. The casing 321 presents a pair of spaced partitions 325 and 326 positioned in the mid-section thereof. The partition 325 has an axial bore 325', and the partition 326 has an axial bore 326'; through which the valve stem 324 extends, the bores 325' and 326' being in axial alignment. A sealing gasket 327 seats within each of the partitions 325 and 326. The partitions 325 and 326 define therebetween an air receiving cavity 328 which is continuously supplied with compressed air from the compressed air supply line 323.

The valve casing 321 is also provided with an end partition 329 which is spaced from the adjacent intermediate partition 326, defining an air receiving cavity 330 therebetween. The air cavity 330 opens into an air chamber 331, connected to the air line 257 which is joined to the base end of the air cylinder 250. The valve casing 321 also contains a second end partition 332 adjacent the intermediate partition 325, so as to define an air receiving cavity therebetween. The cavity 333 opens into an air chamber 334 connected to the air line 256 which is joined to the head end of the air cylinder 250.

The end partition 329 is provided with a central bore through which the valve stem 324 extends. The partition 329 supports a sealing gasket 335 held in sealing position against the partition 329 by a gland nut 336 threaded into the adjacent end of the valve casing 321. The gland nut 336 has an axial hole through which the valve stem 324 projects. The end partition 332 at the other end of the valve casing 321, also has an axial bore through which the other end of the valve stem 324 extends. The end partition 332 supports a gasket ring 337 held in position by a gland nut 338 threaded into the adjacent end of the valve casing 321. The gland nut 338 also has an axial bore through which the adjacent end of the valve stem 324 extends.

The valve stem 324 is designed to axially reciprocate in the aligned bores of the intermediate partitions 325 and 326 and the end portions 329 and 332. The valve stem 324 has an enlarged diameter section 340 at the head end thereof, an enlarged diameter section 341 at the tail end thereof, and an an enlarged diameter section 342 at the mid-section thereof. A reduced diameter section 343 extends between the enlarged head section 340 and the enlarged intermediate section 342, and another reduced diameter section 344 extends between the enlarged intermediate section 342 and the enlarged tail section 341.

The head end of the valve stem 324 has a coupling link 345 secured thereto. A rocking lever 346 is pivotally connected to the coupling link 345 as by hinge pin 347. The mid-section of the rocking lever 346 is journaled to pivot on a hinge pin 348 fixed in an arm 349 forming part of a stationary bracket 350 which is secured to the valve casing 321, as a flange of gland nut 336, bracket 350 being secured to the adjacent frame member 48, as by a bracket 350', as shown in Figs. 12 and 38.

The rocking lever 346 carries a cam roller 351 on the free end thereof designed to have rolling engagement with a cam member 352 fixed to a shaft 353 rotatably mounted in suitable bearing blocks 354, as shown more particularly in Figs. 12, 26, 38, 45, 49 and 56. The bearing blocks 354 are secured to a horizontal platform plate 356. The platform plate 356 is attached to a spacer block 355, the spacer block being fixed to the adjacent horizontal frame member 48. The fixed platform plate 356 extends horizontally inwardly over a section of the turntable plate 50 at a slight elevation above the bottle clamping mechanism 70 so as not to interfere with movement of the turntable plate 50.

The shaft 353, which supports the cam member 352, has a sprocket wheel 357 secured thereto, the sprocket wheel 357 supporting a drive chain 358 which may be trained around a corresponding sprocket wheel 359 (Fig. 12) fixed to the continuously rotating shaft 34 driven by a sprocket chain 35 as previously described. The cam member 352 is so driven as to make a complete revolution during one residence interval and one stage advance interval of the machine. The cam member presents a depressed cam edge 352' which extends approximately five-eighths of the distance around the periphery of the camming member 352, and a raised camming edge 352'' which extends around approximately three-eighths of the periphery of the cam member.

When the cam roller 351 is in riding engagement with the depressed camming edge 352' of the continuously rotating cam member 352, the valve stem 324 will occupy the position approximately as shown in Fig. 49. In this position compressed air will flow from the receiving cavity 328, through the bore 326' of the partition 326 and around the reduced section 343 of the valve stem, into cavity 330, into chamber 331, and thence through tubing 257 into the base end of the air cylinder 250 so as to drive the piston head 352 therein to the left, as shown in Figs. 26 and 49. As heretofore explained, driving movement of the piston head 352 from the base end to the head end of the air cylinder 250, as shown in Figs. 26 and 49, will upstroke the swedging anvil 150 and downstroke the platform 221.

With this left-wise stroking movement of the cylinder head 352, as viewed in Figs. 26 and 49, compressed air is free to escape from the head end of the air cylinder through line 256 into valve chamber 334 and valve cavity 333, and thence escape through the axial bore of the end partition 332 around the reduced section 344 of the valve stem 324, the discharged compressed air being captured in a receiving cup 360 attached as by screws to the tail end of the valve casing 321. The compressed air thus discharged into cup 360 flows into a flexible tubing 361 connected thereto, the compressed air discharged through tubing 361 being used to operate a pneumatic bottle blow up mechanism 550, as will be more fully described hereafter.

The cam roller 351 is resiliently retained in rolling engagement with the periphery of the cam member 352 by a compression spring 362 telescoped over the enlarged tail section 341 of the valve stem 324. One end of the compression spring 362 seats against the adjacent gland nut 338, and the other end thereof seats against a plate 363 secured to the adjacent end of the valve stem 324 as by a suitable screw 364.

When the cam member 352 has been rotated to the point where the cam roller 351 rolls onto the raised section 352" of the cam member 352, the rocking lever 346 to which the cam roller 351 is attached, will be rocked to forcibly draw the valve stem 354 to the right as viewed in Fig. 49, against the resilient action of the compression spring 362. When the valve stem 324 has been thus drawn out to the extent required by the raised section 352" of the cam member 352, the reduced section 344 of the valve stem will have been drawn into the bore 325' of the intermediate partition 325 thereof, and the enlarged intermediate section 342 will have been drawn into the bore 326' of the adjacent intermediate partition 326. As thus positioned, the enlarged intermediate section 342 of the valve stem will seal off further flow of compressed air through the bore 326' of the partition 326, but will permit compressed air to flow from the receiving cavity 328, through the bore 325' of the partition 325, and into cavity 333. The enlarged end section 341 of the valve stem will then have been drawn into the bore of the end partition 332, thereby sealing off the flow of compressed air to the receiving cup 360.

The compressed air, thus admitted to cavity 333, is free to flow into chamber 334 and through line 256 into the head end of the cylinder 250, thereby driving the piston head 352 to the right, as indicated in Figs. 26 and 49. The piston head 352 is thereby driven from the head end to the base end of the air cylinder 250, and downstroke movement is given to the swedging anvil 150 and its associated glue applicator device 175, and upstroke movement is simultaneously given to the platform 221, as in the manner previously described. When the valve stem 324 has thus been drawn out, it will be noted that the reduced section 343 of the valve stem will be positioned in the bore of the end partition 329, thus permitting compressed air in the base end of the cylinder to escape through line 257 into chamber 331, into cavity 330 and out through the bore of the partition 329 around the reduced section 343 of the valve stem, which compressed air may be permitted to escape to the atmosphere, or otherwise utilized.

It will now be appreciated that the continuously driven cam member 352 is continuously rotated at a speed which corresponds to one complete revolution for each residence interval plus one advance interval, and that cam member 352 operates to manipulate the master control valve 320 in a manner to permit repose of the piston head 252 at the head end of the air cylinder 250 during the interval of stage advance of the turntable plate 50 to residence position, and that during this stage advance interval, the valve stem 324 will be in the position indicated in Fig. 49. When the bottle bodies, as suported by the turntable plate, have arrived at residence position at the respective operating stations, the valve stem 324 is drawn outwardly, driving the piston head 252 from the head end to the base end of the air cylinder 250, thereby downstroking the swedging anvil 150 and upstroking the platform 221 to bottle body operating position at the fluting and mouth forming station E. It will be appreciated that the forming operations performed on the bottle body at the fluting and mouth forming station is completed shortly after the swedging anvil 150 has completed its final increment of downstroke, and the platform 221 has simultaneously completed its final increment of upstroke.

Thereupon, the cam member 352 has rotated to the point where the cam roller 351 rolls onto the depressed edge 352' of cam member, permitting the valve stem 324 to return to the position shown in Fig. 49, under the influence of the compression spring 362. When this occurs, compressed air flowing into the base end of the air cylinder 250 through the air line 257, drives the piston head 252 towards the head end of the air cylinder 250, upstroking the swedging anvil 150 to its maximum raised position and downstroking platform 221 to its lowermost position. The piston head 252 is then permitted to remain in residence at the head end of the air cylinder 250 for the interval required to effectuate stage advance of the turntable plate 50.

It will be noted that when the bottle body is in residence position at the fluting and mouth forming station E, the clamping rims 88 of the clamping segments 85 are maintained in frictional contact with the outer surface of the cylindrical part b of the bottle body, the cam roller 102 then being in contact with the intermediately raised edge 97" of the cam cup 96, as shown in Figs. 18 and 19. As thus positioned, the clamping elements 85 will frictionally engage the cylindrical part of the bottle body, thus serving to firmly hold the bottle body in true axial alignment with the swedging anvil 150 located at the fluting and mouth shaping station, and additionally serving to hold the bottle body securely pocketed in the cell cup 66 at this station so that the bottle body is not disturbed from its fitted position within the cell cup 66, by the upstroke movement of the swedging anvil 150.

*Mechanism at the bottom disc blanking and inserting station*

As the turntable plate 50, with the fluted and mouth shaped bottle body supported in one of the cell cups 66 thereof, advances from the fluting and mouth forming station E to the bottom disc blanking and inserting station F, it will be noted that the cam roller 102 continues to roll on the medium raised cam section 97" of the cam cup 96, thereby retaining the clamping rims 88 of the clamping segments 85 in light but firm abutment against the outer surface of the cylindrical part a of the bottle body, as the bottle body assumes residence position at the disc blanking and inserting station F.

At the disc blanking and inserting station F, mechanism 370 is provided, which is supported on the platform plate 356 previously described. The mechanism 370 operates to cut a circular disc s from an advanced section of the continuous paper strip P supplied thereto, operates to cup the flat disc to provide the bottom forming part and a surrounding flange part s' and operates to push the cupped blank to proper seating position into the open bottom end of the bottle body, in residence position at station F.

As generally illustrated in Figs. 12, 14 and 38, and as more particularly illustrated in Figs. 39, 40, 43 and 44, the disc cutting and inserting mechanism 370 comprises a heavy tubular guide casing 371 having a laterally extending flange 372 which is secured as by bolts to the upper face of the platform plate 356. The platform plate 356 has a circular hole 373 cut therein, whose axis is in vertical alignment with the vertical axis of the guide casing 371, and also with the vertical axis of the cell cup 66 when in residence position at the disc blanking and inserting station F. A false bottom plate 391 rests within the circular hole 373 in the platform plate 356, and is bolted to the flange 372 of the tubular guide casing 371 with the flat upper face of the plate 391 at the precise elevation of the flat upper face of the platform plate 356.

The lower face of the flange 372 presents a diametrically extending depression 374, having a depth which is slightly greater than the thickness of the paper strip P to be advanced therethrough, and having a width which snugly conforms to the width of the paper strip P to be diametrically advanced through the slot forming depression between the flange 372, and the upper faces of the platform plate 356 and the false bottom plate 391, as indicated more particularly in Figs. 38, 43 and 44.

The guide casing 371 contains an outer piston head 375 designed to reciprocate within the guide casing 371. A reciprocating shaft 395 projects through an enlarged axial bore 376 formed in the outer piston head 375. A tubular sleeve 377 telescopes over the shaft 395, the tubular sleeve 377 having an enlarged bore 378 providing an air passage between the axial shaft 395 and the inner surface of the tubular sleeve 377. A bushing 379, fixed within the upper end of the sleeve 377, provides an air seal for the upper end of the air passage defined between the axial shaft 395 and the enlarged bore 378 of the tubular sleeve 377. The bushing 379 also serves as a bearing ring through which the axial shaft 395 may reciprocate.

The lower end of the tubular sleeve 377 is threaded into a threaded cavity formed in the upper end of the outer piston head 375, providing a secure attachment whereby the tubular sleeve 377 will reciprocate with the outer piston head 375. The upper face of the outer piston head 375 supports a sealing gasket 380 which is clamped thereto as by a clamp ring 381, the clamp ring 381 being secured to the piston head 375 as by removable clamp bolts. The upper end of the tubular guide casing 371 is capped by a head plate 382, threaded to the upper end of the guide casing 371. The head plate 382 has an upwardly projecting collar portion 383, in whose bore a bearing sleeve 384 is seated. The tubular sleeve 377 has a sliding fit within the bearing sleeve 384. The space defined between the head plate 382 and the clamp ring 381 associated with the upper end of the outer piston head 375, provides an air chamber 385 into which compressed air is admitted.

The lower end of the outer piston head 375 is provided with a relatively large counterbore 386 which defines an air chamber 387 therein. An inner cutting ring 388, formed of suitable cutlery steel, is inset and secured within a peripheral cavity 389 formed in the lower edge of the outer piston head 375. An outer cutting ring 390, formed of suitable cutlery steel, is sized to permit the inner cutting ring 388 to snugly telescope therein, the upper and inner corner edge of the outer cutting ring 390 and the lower and outer corner edge of the inner cutting ring 388 being sufficiently sharp so as to precisely shear the circular bottom forming disc s from an advanced section of the paper strip P inserted through the slot forming depression 374, said shearing action being effected when the inner cutting ring 388 is telescoped into the outer cutting ring 390 during the downward movement of the outer piston head 375.

The outer cutting ring 390 is snugly seated within a circular cavity 392 provided in the false bottom plate 391, the outer cutting ring 390 being suitably secured to the false bottom plate 391. The false bottom plate 391 also presents an inwardly extending ledge 393 whose inner edge defines a circular hole 394 axially aligned with the axis of the reciprocating shaft 395, the inner circular perimeter of the ledge portion 393 being in accurate alignment with the counterbore 386 associated with the outer piston head 375. It will be noted that of necessity the upper face of the false bottom plate 391 should be bolted to the flange 372 of the tubular guide casing 371 at locations which do not interfere with the advance movement of the paper strip P through the slot forming depression 374 extending diametrically across the underface of the flange 372.

An inner plunger block 396 is designed to reciprocate in the air chamber 387 defined by the counterbore 386 of the outer piston head 375. The plunger block 396 is firmly secured to the lower end of the reciprocating shaft 395 as by an attaching bolt 397. The upper face of the plunger block 396 supports a sealing gasket 398, attached by means of a clamp ring 399 and screws to the upper face of the plunger block. The outside diameter of the plunger block 396 accurately conforms to the inside diameter of the circular flange s' of the cup shaped bottom member to be formed from the disc s, and the diameter of the circular hole 394 in the false bottom plate 391 snugly conforms to the outside diameter of the cricular flange s' of the formed cup shaped bottom member.

The outer plunger head 375 is normally maintained in its maximum raised position, fully housed within the guide casing 371, by means of a heavy coil spring 400 whose lower end surrounds the collar portion 383 of the head plate 382 and seats against the upper face of the head plate 382. The upper end of the heavy compression spring 400 abuts against a horizontally extending yoke plate 401 having an axial bore through which the upper end of the tubular sleeve 377 projects. The elevation of the yoke plate 401 may be adjusted as desired by means of the external threads associated with the upper end of the tubular sleeve 377 which engages the threads in the bore of the yoke plate 401.

The inner plunger block 396 is normally supported in housed position within the air chamber 387, by means of a heavy compression spring 402 whose lower end seats upon the upper face of the yoke plate 401. A second yoke plate 403, having an axially extending threaded bore, is adjustably secured to the threaded top end of the reciprocating shaft 395 whose lower end is attached to the plunger block 396.

Compressed air is admitted to the air chamber 385, defined between the upper face of the outer piston head 375 and the head plate 382, by means of a coupling element 382' set within an air hole provided at a convenient location in the head plate 382, as shown more particularly in Fig. 38. A compressed air line 404 has one end thereof connected to the coupling 382' and the other end thereof connected to a control valve 490 which is normally open to admit compressed air into the chamber 385 when the fluted and mouth formed bottle body has assumed residence position at the disc blanking and inserting station F. The compressed air valve 490 is connected to branch air line 491, which is in turn connected as by coupling 492 to air line 256, as will be described more fully hereafter. During the interval of advance movement of the fluted and mouth shaped bottle body from the fluting and mouth shaping station E to the disc blanking and inserting station F, the paper strip P will have been advanced by advancing mechanism 430, more fully described hereinafter, so that an uncut section of the paper strip will be positioned directly below the raised piston head 375, as shown more particularly in Fig. 39.

When compressed air is admitted to the air chamber 385, the piston head 375 is driven downwardly in a manner so that the inner shearing ring 388 will cooperate with the stationary outer shearing ring 390 to accurately punch out a circular bottom forming disc s from the paper strip P, as shown more particularly in Fig. 43. The perimeter of the punched out disc s will be brought to seating position on the upper face of the inwardly extending ledge 393 of the false bottom plate 391, during the final increment of downward movement of the outer piston head 375, so that when the final increment of downward advance of the piston head 375 is completed, the lower edge of the inner cutting ring 388 will lightly press against the perimeter of the flat disc s as seated on the inwardly extending ledge 393, as shown in Fig. 43.

When the outer piston head 375 has thus completed its full downward stroke, an air admission hole 406 extending through the wall of the tubular sleeve 377 will have been brought from its sealed position within the bearing sleeve 384, as shown in Fig. 39, to a position adjacent the air chamber 385 as shown in Fig. 43. The compressed air, which continues to be admitted into the air chamber 385 by the control valve 490, then escapes through hole 406 and into the enlarged bore 378 of the sleeve 377, thence into the enlarged bore 376 of the outer piston 375, and thence into the air chamber 387 directly above the plunger block 396. The compressed air thus admitted into the air chamber 387, drives the plunger block 396 downwardly, against the force of the compression spring 402 so as to telescope the flat disc s, through the forming opening 394 in false bottom plate 391, as shown in Fig. 44.

The forming opening 394 in the false bottom plate 391 presents a forming perimeter shaped to fold the perimeter section of the flat disc s upwardly around the circumference of the plunger block 396, converting the flat disc into a cup shaped bottom forming member having a raised skirt or flange s' which surrounds the bottom forming part of the disc, as shown in Fig. 44. During the final increment of downward movement of the plunger block 396, the thus formed bottom member is precisely telescoped into the open bottom end of the bottle body to a point where the bottom forming part of the bottom member is accurately located in final position, with the flange s' thereof overlying the adhesive band h previously deposited on the inner face of the bottle body at the preceding fluting and mouth forming station E.

Means are provided to slow down the final increment of downward advance of the outer piston head 375 and the plunger block 396, so that the inner shearing ring 388 will gently seat the perimeter of the flat disc s on the upper face of the ledge 393, and so that the plunger block 396 will gently insert the cup shaped bottom member into its final position within the bottle body. The means for dampening the final increment of downward advance of the outer piston head 375 and the inner plunger block 396, comprises a pair of dash pots 410 as shown more particularly in Figs. 39 and 40. Each dash pot 410 comprises a cup shaped member having a cylindrical wall 411, a bottom wall 412, and a laterally flared flange 413 which is secured by bolts to the upper face of the head plate 382. The two dash pots 410 are arranged on diametrically opposite sides of the collar portion 383 of the head plate 382, as shown more particularly in Figs. 38 and 39. The cylindrical wall 411 and the bottom wall 412 of the dash pot is designed to contain a hydraulic liquid, such as oil L.

A piston 414 is designed to loosely reciprocate within the cylindrical wall 411 of the dash pot, the piston 414 being attached to the lower end of a rod 415 as by means of a securing bolt 416. The cylindrical wall 411 is capped by a cover plate 417 which is secured to the cylindrical wall 411 as by means of cap screws 418. The cover plate 417 has a downwardly extending collar portion 419, the collar portion 419 having a bore within which the lower end of the rod 415 may reciprocate.

A baffle ring 420 is formed on the lower end of cover plate collar 419 and fitted within the cylindrical wall 411 of the dash pot directly above the maximum raised position of the piston 414. The baffle ring 420 divides the interior of the dash pot into a lower chamber 421 and an upper chamber 422, the baffle plate 420 having a series of oil passage holes 420' extending therethrough. The piston 414 also has a series of oil passage holes 414' extending therethrough, in general alignment with the oil passage holes 420' in the baffle ring 420. A flexible sealing gasket 424 is clamped to the underface of the piston 414 by the screw bolt 416.

Downward movement of the piston plate 414, effected by downward pressure exerted on the piston rod 415, is resisted by the oil L contained in the lower chamber 421. However, the small annular space provided between the periphery of piston 414 and cylinder wall 411 permits a limited amount of oil to leak past the piston and through the holes 420' in baffle ring 420 and escape into the upper chamber 422. The function of baffle ring 420 and holes 420' therein is to eliminate foaming of the oil L as it surges past the piston 414 on the downstroke of the piston. It is to this end that the baffle ring 420 is placed an appreciable distance below the oil level L' in the dash pot 410.

Thus the piston 414 can be driven downwardly towards the bottom wall 412 of the dash pot 410, but at a relatively slow rate, and only when sufficient downward pressure is exerted thereon by the piston rod 415. The return upward movement of the piston plate 415 into abutting position against the baffle ring 420, may be more rapidly effected, since the pressure of the overlying body of oil L will flare the perimeter of the flexible gasket 424 away from the oil passages 414' in the piston 414, thereby permitting oil to rapidly escape from the upper chamber 422 into the lower oil chamber 421.

The piston rod 415 of each dash pot 410 has an abutment collar 425 secured thereto and located between the cover plate 417 and the yoke plate 401. Each piston rod 415 extends through an enlarged bore in the adjacent end of the yoke plate 401 and through an enlarged bore in the upper yoke plate 403. Each piston rod 415 also has an elongated abutment collar 426 positioned between the lower yoke plate 401 and the upper yoke plate 403, as shown more particularly in Figs. 39, 43 and 44.

When the outer piston head 375 is in its maximum raised position as shown in Fig. 39, and retained in that position by the expansion spring 400, the piston 414 of each dash pot 410 will be in abutment against the baffle ring 420, as shown in Fig. 40, and the lower yoke plate 401 will abut against the lower edge of the elongated collars 426 associated with the piston rods 415 of the dash pots.

When compressed air is admitted to the air chamber 385, the outer piston head 375 will initially make a rapid downward stroke, sufficient to bring the first yoke plate 401 fixed to the sleeve 377 down to the location of the rod collars 425 as shown in Fig. 43. During this movement shear ring 388 on outer piston 375 will cut the disc s out of paper strip P and move the disc part way towards ledge 393 on false bottom plate 391. During the slower and final increment of downstroke of the piston head 375, the inner shearing ring 388 will gently carry the cut paper disc s into seating position on the inwardly extending ledge 393 of the false bottom plate 391. This final increment of downward movement of the piston head 375 at reduced speed is assured by the dampening action of the dash pots 410, since during this final increment of downward movement, the yoke plate 401 must press the rod collars 425 downwardly from the collar position shown in Fig. 39 to the position shown in Fig. 43, to thereby forcibly drive the pistons 414 of the dash pots 410 downwardly against the partially trapped oil in the lower chamber 421 thereof.

When the piston head 375 has completed its downward stroke as shown in Fig. 43, compressed air is permitted to flow from air chamber 385 through the air port 406 in sleeve 377 and into the air chamber 387, initially imparting to the pressure block 396 a rapid downward movement which serves to cup the flat disc s into an appropriately shaped bottom forming member. During this initial downstroke movement of the pressure block 396, the upper yoke plate 403 will have been carried downward by the reciprocating rod 395 to abutting position against the upper edge of the elongated cylindrical sections 426 at the dash pots piston rods 415. The final increment of downward advance of the plunger block 396 is more slowly executed in a manner to gently push the dish shaped bottom member into seating position within the open bottom end of the bottle body, as shown more particularly in Fig. 44. This final increment of downward movement of the plunger block 396 is slowed down, by reason of the fact that the upper yoke plate 403 associated with the plunger block 396, must push the elongated collar section 426 downwardly until the rod collars 425 have been moved downwardly from the location shown in Fig. 43 to the location shown in Fig. 44, to thereby move the pistons 414 a further distance toward the bottom of the dash pots against the pressure of the oil contained in the lower dash pot chamber 421.

When the plunger block 396 has reached the end of its downward stroke, thereby accurately seating the bottom forming member within the tubular body, the master control valve 320 is actuated so that the piston head 252 in the air cylinder 250 starts to move toward the head end thereof, permitting the compressed air to exhaust from the head end of the cylinder 250 through line 256 and back through the master control valve 320. Since control valve 490 normally remains open, compressed air may flow from the air chamber 385 back into air line 256. With the pressure in chamber 385 thus reduced, the coil spring 402 is free to expand from the position shown in Fig. 44 to the position shown in Fig. 43, raising the plunger block 396 into the air chamber 387, thereby forcing the compressed air contained therein back into air chamber 385. Air escape from the chambers 387 and 385 quickly reduces the pressure therein to a point where the compression spring 400 will also expand to lift yoke plate 401, the tubular sleeve 377 and the piston head 375, thereby moving the air bleeder hole 407 in the tubular sleeve 377 from its shut off position within the bearing sleeve 384, to exposed position above the bearing sleeve 384, as shown in Fig. 39, so that any remaining compressed air in the chamber 367 quickly escapes from the bore 378 of the tubular sleeve 377, through the discharge port 407 and to the atmosphere.

Thus it will be appreciated that the compressed air power supplied to air chamber 385 operates to initially drive the piston head 375 in a rapid downward movement to move the inner cutting ring 388 through the blank cutting position, and thence to more slowly drive the piston head 375 through its final increment of downstroke, as regulated by the speed reducing action of the dash pots 410. The continuously supplied air pressure, escaping from air chamber 385 into air chamber 387 through the inlet port 406, serves to initially drive the plunger block 396 downwardly with rapid movement to cup the bottom forming member, and thereafter to more slowly move the plunger block 396 through its final increment of downward movement, as controlled by the action of the dash pots 410. The master air control valve 320 thereupon operates to shut off the flow of compressed air to the air chamber 385, and to receive the outflowing air from the air chamber 385, permitting compressed coil springs 400 and 402 to quickly upstroke the plunger block 396 and piston head 375 to their maximum raised position.

It will be appreciated that the piston head 375 and plunger block 396 both execute a complete downstroke and a complete upstroke in timed relation, and during the dwelling interval of the bottle body at the disc blanking and inserting station F. No compressed air enters the air chamber 385 during the interval of step rotation of the turntable plate 50, since the compressed air is then discharging from air line 256, as indicated in Fig. 49. The piston head 375 and the plunger block 396 are retained in their maximum raised position by the resilient force exerted by the coil springs 400 and 402 respectively.

Paper strip advancing mechanism 430 is provided at the disc blanking and inserting station F to progressively feed the paper strip P into the disc blanking and inserting mechanism 370. The advancing mechanism 430 operates to quickly insert a predetermined sectional length of the paper strip into blanking position under the raised piston head 375 during each advance interval, the inserted section being held stationary during the interval that the upstroking and downstroking piston head 375 is in engagement therewith. Although the strip section from which the bottom forming disc s is cut, remains stationary within the tubular guide casing 371 while in contact with the downstroking and upstroking piston head 375, the strip advancing mechanism 430 nevertheless operates to feed, hump and prepare the following sectional length for almost instantaneous insertion to blanking position the moment the plunger head cutting ring 388 has been lifted out of contact with the immediately preceding blanked section.

The strip advancing mechanism 430, is generally illustrated in Figs. 12, 14, 38 and 39, and is more specifically illustrated in Figs. 41, 42, 45, 46, 47 and 48 of the drawings. The continuous strip of selected paper material from which the bottom discs are to be blanked, is supplied from a paper roll (not shown) positioned adjacent the horizontal frame member 48 of the machine. The advancing end of the paper strip is carried onto the upper flat face of the platform plate 356 by the pulling action of a pair of upper and lower cooperating pressure rollers 431 and 432 between which the strip P is drawn. The lower feed roller 432 is set in aligned recesses 356' and 355' cut in the platform plate 356, and spacer block 255 respectively, as shown in Fig. 45, so that the paper gripping line of the cooperating feed rollers 431 and 432 will be substantially in the same plane as the upper surface of the platform plate 356 over which the paper strip P is advanced.

The cooperating feed rollers 431 and 432 have an axial length which approximates the width of the paper strip advanced therebetween, the upper roller 431 having guide flanges 431' at the ends thereof which overlap the ends of the lower feed roller 432. The guide flanges 431' serve to retain and guide the paper strip in proper traveling position between the feed rollers.

The lower feed roller 432 has a stub axle 433 extending from one end thereof rotating in a sleeve bearing 434 set into a horizontally extending support plate 435 as shown in Fig. 45. The upper feed roller 431 also has a stub axle 436 extending from the adjacent end thereof supported by a suitable bearing 437 mounted in a horizontal support plate 438 positioned directly above the support plate 435. The opposite end of the lower feed roller 432 also has a stub axle 433' rotatably mounted in a bearing 434' mounted in a horizontally extending support plate 435'. The adjacent end of the upper roller 431 has a stub axle 436' projecting from the end thereof supported by a bearing 437' mounted in a horizontally extending support plate 438' positioned directly above the support plate 435'.

The ends of each of the upper support plates 438 and 438' seat against the top face of the platform plate 356 and are secured thereto by suitable bolts as shown more particularly in Figs. 38 and 39. A bracket plate 440 and a bracket plate 440' are bolted to and extend downwardly from one end of the horizontal support plates 438 and 438' respectively. The lower support plate 435' is pivoted as by hinge pin 441 to the bracket plate 440', and the lower support plate 435 is likewise pivoted by a similar hinge pin to the adjacent bracket plate 440. The opposite end of the lower support plate 435 is secured to the threaded end of a pin bolt 442 extending through a vertical bore formed in the upper support plate 438. The projecting end of the pin bolt 442 has a compression spring 443 telescoped thereover, the pin bolt 442 being capped by an adjustable nut 444. A similar pin bolt 442' extends down through a vertical bore hole in the top support plate 438', and supports a compression spring 443' which is capped by an adjustable nut 444', as shown in Figs. 39 and 45. By a proper adjustment of the capping nuts 444 and 444', the lower supporting plates 435 and 435' may be respectively raised and lowered as desired so that the lower pressure roller 432 may be thereby vertically adjusted to effect the desired pinching pressure on the paper strip P passing between the pinching feed rollers 431 and 432.

As shown more particularly in Figs. 38 and 45, the stub axle 436 of the upper pinch roller 431 has a driving gear 445 attached thereto which meshes with a driven gear 446 attached to the adjacent stub axle 433 of the lower pinch roller 432. The stub axle 436' at the other end of the upper pinch roller 431 has one section 461 of a clutch device 460 attached thereto, the other section 462 of the clutch device being attached to the adjacent end of the continuously driven shaft 353, which has been previously described. The shaft 353, as shown in Fig. 45, is in axial alignment with the axis of rotation of the upper pinch roller 431, so that when sections 461 and 462 of the clutch device 460 are in driving engagement, the upper pinch roller 431 is rotated; the lower pinch roller 432 being rotated with the pinch roller 431 by the intermeshing gears 445 and 446.

Under normal conditions of operation the clutch sections 461 and 462 of the clutch device 460, as will be described more particularly hereafter, are in driving engagement, so that the cooperating feed rollers 431 and 432 continue to be driven from the continuously driven shaft 353. Thus, under normal conditions of operation, the paper strip P is continuously advanced by the cooperating feed rollers 431 and 432. The paper strip would normally continue its uninterrupted advance through the receiving passage formed by the depression 374 in the flange 372 of the guide casing 371. However, when the shearing ring 388 associated with the piston head 375 of the disc blanking and inserting mechanism 370 is in contact with the advanced section of the blank contained within the guide casing 371, that section can no longer advance and is held stationary until the piston head 375 has completed its full downward stroke and has executed a sufficient part of its upstroke to withdraw its cutting ring 388 from the circular hole cut in the advanced strip section by the cooperating cutting rings 388 and 390.

During the interval in which the advanced strip section within the guide casing 371 is blocked against further advance by the piston head 375, the cooperating feed rollers 431 and 432 nevertheless continue to feed and advance the next succeeding strip section, causing this section to hump upwardly in an arcuate curve and with a rising crest, in the manner indicated in Figs. 39 and 41. A freely rotating guide roller 447, rotatably mounted on suitable bearing plates 448 fixed to the platform plate 356 and positioned directly adjacent the flange 372 of the guide casing 371, serves to facilitate the entry of the paper strip into blanking position under the guide casing 371. The guide roller 447 rotates substantially without friction, so that the gravity weight and inherent spring tension of that section of the paper strip which has been humped immediately ahead of the guide roller 447, will tend to flatten out and shoot under the roller 447 and under the flange 372 of the guide casing 371, the moment the piston head 375 has been lifted to the point where it does not interfere with the further advance of the advanced blanked section from its blanking position to discharge position.

Should the weight and flexing characteristics of the paper strip be such as not to assure reliable advance of the hump section of the paper strip, with speedy entry into blanking position as permitted by the raised position of the piston head 375, it may be desirable to provide a rider device 450, as shown more particularly in Figs. 41 and 42, to insure snap entry of the hump section into punching position below the raised piston head 375.

The rider device 450 may comprise a light foot plate 451 designed to rest on the crest of the humped section of the paper strip. A vertically extending stem 452 has the lower end thereof hingedly connected to an attaching bracket 453 attached to the mid-section of the upper face of the foot plate. A pair of parallel extending arms 454 and 455 have the adjacent ends thereof pivotally connected in spaced relationship to the upper section of the stem 452 as by hinge pins 454' and 455' respectively. The opposite end of the lower arm 454 is hinged as by hinge pin 454" to a bracket plate 456 suitably secured to the outer surface of the guide casing 371. The upper arm 455 is likewise hinged, but intermediate its ends, to the fixed bracket 456 as by hinge pin 455". The projecting end of the upper arm 455 has secured thereto the lower end of a tension spring 457, the upper end of the tension spring 457 being secured to a suitable pin 458 projecting laterally from the upper yoke plate 403. A strut tube 459 embraces a substantial length of the tension spring 457 and is pivotally connected to the end of arm 455 by a pin 457', thereby limiting the contracted length of the tension spring 457.

It will be appreciated that the hump section of the paper strip gradually increases in height and arcuate extent during the interval that the advanced section of the blank within the guide casing 371 is blocked from advancing to discharge position by the reciprocating piston head 375. During this rising formation of the hump section, the foot plate 451 is moved upwardly ahead of the rising crest of the hump by the action of the upper yoke plate 403 as the yoke is moved downwardly by the disc cutting and bottom forming stroke of the piston 375 and plunger block 396.

Yoke plate 403 first moves downwardly to position x, as indicated in broken lines in Fig. 41, where it strikes the top of strut tube 459. Tension of spring 457 is thus reduced to a desired minimum. Continued downward movement of yoke 403 to position y depresses strut tube 459 and quickly and positively raises foot plate 451 to a predetermined height z, shown in broken lines in Fig. 41. The gradually rising hump of paper strip P is unresisted in its rise until it meets foot plate 451 at position z, when a slight further rise of the hump takes place to raise foot plate 451 slightly above position z. This action stretches tension spring 457 and consequently puts a potential downward push against the paper hump preparatory to giving the paper strip a snap entry into position beneath the piston head 375.

The moment the piston head 375 has been upwardly withdrawn from the hole cut in the advanced strip section contained within the guide casing 371, and the upper yoke 403 concurrently moved up, the built up pressure load exerted by the spring 457 through the foot plate 451 against the hump section, almost instantaneously flattens the hump section and deliberately shoots a section thereof into a blanking position within the guide casing 371, ready to be blanked by the next downward stroke of the piston head 375.

The clutch device 460 is provided as a safety device to halt the rotation of the pinch rollers 431 and 432, and hence the advance of paper strip P, in the event that a cell cup 66 should arrive at the disc blanking and inserting station F with no bottle body therein, due to the possible operating failure of mechanism at preceding operating stations. Thus, in the event an unoccupied cell cup 66 should arrive at the disc blanking and inserting station F, the disengagement of clutch device 460, operating in conjunction with safety control mechanism to be described hereafter, prevents the advance of the paper strip P into the guide casing 371 and consequently the exit of an unblanked section of the paper strip which was already in the guide casing 371 waiting to be blanked.

The clutch device 460, as generally illustrated in Figs. 12, 14 and 39, and more particularly illustrated in Figs. 45, 46, 47 and 48, generally comprises a clutch section 461 attached to the stub axle 436' of the upper feed roller 431, and a clutch section 462 attached to the end of the continuously driven shaft 353. The clutch section 461 comprises a relatively heavy disc 463 presenting a flat outside face. A latching dog 464 is pivotally connected thereto as by pin 465 projecting from the flat face of the clutch disc 463, as shown more particularly in Figs. 46, 47 and 48. The latching dog 464 thus rotates with the clutch section 461. The lower end of the latching dog 464 has an inwardly extending lip portion 466 defining a saddle cavity 467 thereabove. The free end of the lip portion 466 is normally urged into resilient abutment against a stop pin 468, projecting from the flat face of the clutch disc 463, by a leaf spring 469 having one end attached to a stud 470 secured to and projecting from the flat face of the clutch disc 463 adjacent the periphery thereof. The free end of the leaf spring 469 seats against the lower outside edge of the lip 466 of the latching dog 464, spring tension being applied to the leaf spring 469 by an offset pin 472 extending from the flat face of the clutch disc 463.

The upper end of the latching dog 464 presents a projecting lug 473 having an inclined cam face 473'. A stop pin 474, projecting from the flat face of the clutch disc 463, serves to limit the swing of the latching dog 464, as shown in Fig. 47. The lip portion 466 is normally retained in abutting contact with the stop pin 468 by the leaf spring 469, as shown more particularly in Figs. 46 and 48.

The clutch section 462 attached to the continuously driven shaft 353 presents a clutch disc 475 of somewhat smaller diameter than the clutch disc 463, the outside face of the clutch disc 475 being flat and mounted to rotate directly adjacent the outside face of the latching dog 464. A driving pin 476 projects from the flat face of the clutch disc 475. When the clutch sections 461 and 462 are assembled in operating position, the driving pin 476 associated with the clutch disc 475 will rotate into pocketed position within the saddle cavity 467 of the latching dog 464 associated with clutch section 461, thus providing a driving connection between the continuously rotating clutch section 462 and the clutch section 461, which driving connection continues as long as the projecting lip section 466 of the latching dog 474 remains inswung and in abutment against the stop pin 468, as urged by the leaf spring 469.

However, when inward pressure is exerted against the projecting lug 473 so as to drive the upper end of the latch dog 464 into abutment with the stop pin 474, as shown in Fig. 47, the lower end of the latching dog will be swung outwardly to unseat the driving pin 476 of the clutch section 462 from the saddle cavity 467 of the latch dog, thereby breaking the driving connection so that clutch section 462 will rotate free of driving engagement with the clutch section 461.

Under normal conditions of continuous operation, the clutch device 460 and its associated latching dog 464 makes a complete revolution during the time interval embraced by a single advance interval plus a single residence interval, and the paper strip rider device 459 operates to automatically project a paper strip section into blanking position within the guide casing 371 when the piston head 375 and the plunger block 396 are in maximum raised position. Should a cell cup arrive at the disc blanking and inserting station F containing no bottle body, safety control mechanism is provided to maintain the air control valve 490 in closed position, so that no compressed air will enter the air chamber 385 to downstroke the piston head 375 and the plunger block 396, thereby avoiding the blanking and insertion of a bottom disc into the empty cell cup. The construction and operation of the safety control mechanism and the air control valve 490 will be described more fully hereafter.

Mechanical means, which will now be described, are provided for halting the rotation of the strip feeding rollers 431 and 432 by manipulating the latching dog 464 to unlatched position in the event the piston head 375 and its associated plunger block 396 should fail to make its timely downward blank punching and disc inserting stroke. As generally illustrated in Figs. 12 and 14, and more particularly illustrated in Figs. 38, 39, 45, 46 and 47, an angle shaped rocking lever 478 is pivotally mounted on hinge pin 479 fixed in a suitable bracket 480 attached to the adjacent bearing block 354. The downwardly extending leg 481 of the rocking lever 478 is provided with a cam edge 481' designed to engage the cam edge 473' associated with the lug portion 473 of the latching dog 464. The other and horizontal leg 482 of the rocking lever 478 carries a hinge pin 483 which is connected to one end of a yoke lever 484.

The yoke lever 484 is pivoted at its mid-section on a hinge pin 485 fixed to the upper end of a sturdy support bracket 486 having a foot portion 487 which is secured as by screws 487' to the platform plate 356. One end of the yoke lever 484 is provided with a downwardly extending leg portion 488 which has an elongated slot 488' through which the hinge pin 483 extends. The other end of the yoke lever 484 is pivotally connected to the lower yoke plate 401 of the disc blanking and inserting mechanism 370 by means of a connecting link 489, the lower end thereof being connected as by hinge pin 489' to the adjacent end of the yoke lever 484 and the other end being pivotally connected to yoke plate 401 as by a stud pin 489" projecting from the yoke plate 401 as shown more particularly in Figs. 39 and 42.

Through the instrumentality of the yoke lever 484, it will be noted that the cam edge 481' of the rocking lever 482 is maintained in a position where it will be engaged by the cam edge 473' of the latching dog 464 when the yoke plate 401 is in its maximum raised position, as indicated in Figs. 39 and 47. However, when the yoke plate 401 moves downward along with the downward punching stroke of the piston head 375, the yoke lever 484 is rocked in a manner to raise the horizontal leg 482 of the rocking lever 478, as shown in dotted lines in Fig. 46, so that the cam edge 481' of the rocking lever 478 will not interfere with the continued rotation of the latching dog 464. It will be appreciated that the clutch section 461 of the clutch device 460 is so mounted on its stub axle 436' that the lug portion 473 of the latching dog 464 will have approximately assumed the rotated position shown in full lines in Fig. 46 when the instant arrives for the plunger head 375 to make its downward stroke.

When the plunger head 375 makes its normally intended downward stroke, the yoke lever 484 will quickly swing the rocking lever 478 to the position indicated in dotted lines in Fig. 46, in which position the continued rotation of the latching dog 464 is not interfered with. However, should the plunger head 375 fail to timely proceed with its disc punching downward stroke, the yoke lever 484 will maintain the rocking lever 478 in the position shown in Fig. 47, in which position the cam edge 473 of the latching dog 464 will rotate into abutment with the cam edge 481' of the fixedly held rocking lever 478 so as to pivot the latching dog 464 into the position shown in Fig. 47, thereby disconnecting the driving clutch section 462 from the driven clutch section 461, and accordingly halting further advance movement of the paper strip P.

Thus it will be understood that in the event the plunger head 375 should fail to make its timely downward disc punching stroke, the latching dog 464 of the clutch device 460 will automatically be manipulated to disconnect the clutch sections 461 and 462 of the clutch device 460, thereby automatically halting further strip advancing rotation of the feed rollers 431 and 432 and avoiding undesirable waste of paper strip. However, as soon as air power to the air chamber 385 is restored, impelling the piston head 375 in its downward stroke, the angle shaped rocking lever 478 is automatically rocked to the dotted line position shown in Fig. 46, so that the latching dog 464 is restored by its associated leaf spring 469 to a position where the continuously driven clutch section 462 will be in driving engagement with the feed roller driving clutch section 461.

The air valve 490, which is open under normal conditions of operation, is supplied with compressed air by a compressed air line 491 which is connected by coupling 492 to the compressed air line 256, as heretofore noted and shown in Figs. 38 and 49. The air control valve 490 comprises a valve casing 493 supported by feet 494 which are secured at a convenient location as by screws to the platform plate 356. The valve casing 493 has an axially extending bore through which a valve stem 495 is designed to reciprocate. The valve casing 493 has a port 496 to which the air supply line 494 is connected and a port 497 to which the air supply line 491 is connected. The valve stem 495 has a reduced diameter mid-section 495' around which compressed air may flow between the ports 497 and 496 when the reduced section 495' is positioned therebetween.

A coil spring 498 surrounds one of the projecting ends of the valve piston 495, one end of the coil spring 498 seating against the adjacent end of the valve casing 493 and the other end abutting against the enlarged head portion 498' associated with the valve stem 495. An abutment collar 499 fixed to the other end of the valve stem 495 limits the extent to which the coil spring 498 may project the valve stem. It will be noted by referring more particularly to Fig. 38, that the coil spring 498 normally retains the valve stem in open position so that compressed air may flow through the air ports 496 and 497 thereof.

By referring to Fig. 49, it will be noted that the flow of compressed air through air supply line 491, control valve 490, air line 404 and thence to the disc punching and inserting mechanism 370, is under the control of the master control valve 320. The master air valve 320 controls the flow of air to the air piston 250 which operates the fluting and mouth forming mechanism 230 as previously described. Thus, when compressed air is admitted by the master control valve 320 to air line 256, there is simultaneously effected, a downstroking movement of the swedging anvil 150, an upstroking movement of the fluting and mouth forming mechanism 230, and a downstroking movement of the piston head 375 and plunger block 396 of the disc blanking and inserting mechanism 370.

Also, when compressed air flows through from the master control valve 320 through air line 257 to the base end of the air cylinder 250 so as to upstroke the swedging anvil 150 and downstroke the fluting and mouth forming mechanism 220, compressed air is ejected from the head end of compressed air cylinder 250 through air line 256 and into the discharge cup 360 of the master control valve 320. Compressed air then is also free to exhaust from the air chamber 385 in the disc blanking and inserting mechanism 370 through the air line 404, through the open control valve 490 through line 491, into line 256 and thence into the receiving cup 360 of the master control valve, thereby insuring quick upstroke movement of the piston head 375 and plunger block 396 associated with the disc blanking and inserting mechanism 370. Thus it will be noted that the stroking movements of the piston head 375 and plunger block 396 of the disc blanking and inserting mechanism 370 operate in synchronism and in timed relation with the stroking movement of the swedging anvil 150 and the swedging and mouth shaping mechanism 220.

The bottom spinning mechanism

As the turntable plate 50 rotates during the advance interval so as to carry a bottle loaded cell cup 66 from the disc blanking and inserting station F to the bottom spinning station G, it will be noted by referring more particularly to Fig. 18, that the cam roller 102 associated with the bottom clamping mechanism 70 of that cell cup, must roll from the intermediate track section 97'' of the stationary cam cup 96 onto the highest track section 97''' thereof, and remains in contact with the highest track section 97''' during the dwelling interval of that cell cup at the bottom spinning station G. Thus the rims 88 of the clamping segments 85 are moved radially inwardly during this advance interval to form the inwardly extending shoulder $k$ in the cylindrical part of the bottle body, as indicated in Figs. 53 and 55. The rims 88 of the clamping segments 85 retain their pinching and shoulder forming engagement with the bottle body during the spinning operation, thereby preventing inward displacement of the bottom forming members during the spinning operation, and insuring uniform containing capacity for the bottle production output.

The bottom spinning mechanism 500 is generally illustrated in Fig. 13 and is more particularly illustrated in Figs. 52, 53, 54 and 55 of the drawings. The bottom spinning mechanism comprises a spinning head 501 comprising a head block 502 which rotatably supports a pair of diametrically arranged spinning rollers 503. Each spinning roller 503 is set within an open cavity 504 formed in the head block 502, and is mounted on a stud pin 505 set at an inclined angle, as shown in Fig. 53, each stud pin 505 being held in fixed position by a suitable set screw 505'.

Each spinning roller 503 is mounted on a bearing sleeve 506 designed to freely rotate on its stud pin 505. A suitable bearing collar 507 is telescoped onto the stud pin 505 and is adjustably held in fixed position as by a suitable set screw 507' in a manner to permit free rotation of the spinning roller 503. A suitable lock nut 508 is threaded onto the threaded projecting end of the stud pin 505 to detachably retain the spinning roller 503 in properly mounted position.

It will be noted that each of the spinning rollers 503 has a bead forming groove 509 which is accurately machined to the contour of the rolled bead $m$ to be formed in the bottom end of the bottle body, as shown more particularly in Fig. 55. The bead forming groove 509 is defined by an inner vertical face 510, a rounded semi-circular bottom face 511, and an outwardly inclined exterior face 512 which terminates in an outwardly flared and rounded edge 512'. The spinning groove 509 is shaped to insure the formation of a somewhat elongated bottom bead $m$ of compacted form. The under face of the head block 502 also has a circular bead receiving groove 513 therein which conforms substantially in cross sectional shape to the cross sectional shape of the roller grooves 509.

The spinning head 501 is attached to a vertically extending shaft 515, the lower end of the shaft having a reduced neck portion 516 which extends through an axially extending bore formed in the head block 502, as shown in Fig. 53. A lock nut 517 is secured to the threaded end of the shaft 515, the lock nut 517 seating within a suitable cavity 514 formed in the bottom face of the head block 502. The shaft 515 has an enlarged collar portion 518 which abuts against the top face of the head block 502 when the lock nut 517 is tightened. A suitable key element 518' set in the bore of the head block 502 and the end portion 516 of the shaft fixes the spinning head 501 to rotate with the shaft 515.

The shaft 515 extends through the enlarged bore 521 of a tubular bearing sleeve 520. The sleeve 520 has a thrust bearing assembly 522 set in a conforming cavity 523 provided in the lower end thereof. The bearing assembly 522 receives the neck portion 519 of shaft 515 to provide a bearing support therefor. The bearing assembly 522 is retained in assembled position by a retaining ring 524 attached to the adjacent end of the bearing sleeve 520 as by means of suitable screws.

The bearing sleeve 520 is designed to snugly reciprocate within an outer tubular casing 525. The tubular casing 525 is rigidly attached to the frame member 47 of the machine by means of a suitable bracket 526 whose base portion 527 is secured as by bolts 527' to the frame member 47. A pair of upper and lower arms 528 and 529 project from the base portion 527 of the bracket and receive the ends of tubular casing 525 therein in conforming holes in the arms, as shown in Figs. 52 and 53. The arms 528 and 529 are suitably directly secured to the fixed tubular casing 525, as by welding or otherwise.

The spinning head 501 is continuously rotated by means of an electric motor 530 and speed reducer unit 530' secured as by suitable feet 531 to the adjacent frame member 47 of the machine, as shown in Fig. 52. The motor pulley 532 is connected as by suitable belting 532' to a pulley wheel 533 fixed to a sleeve member 534 which projects from the adjacent end of the fixed tubular casing 525. The sleeve member 534 is rotatably mounted upon a pair of bearing assemblies 535 set within the fixed tubular casing 525 in a manner so that the sleeve member 534 rotates with the shaft 515 extending therethrough. The shaft 515 has a longitudinally extending keyway 536 which slidably receives a key element 536', fixed within the bore of the sleeve member 534. Thus it will be appreciated that the sleeve member 534, to which the pulley wheel 533 is secured, rotates with the shaft 515 as driven by the motor 530, the shaft 515 being nevertheless free to reciprocate axially within the sleeve member 534.

Means are provided to advance the spinning head 501 into spinning engagement with the bottom end of the paper bottle in residence at the bottom spinning station G, and to retract the spinning head from the spun bottom end of the paper bottle so as not to interfere with the stage advance of the bottle supporting turntable plate 50. The spinning head 501 is reciprocated by means of a cam member 537 (Fig. 52) fixed to the continuously rotating shaft 34. The shaft 34 makes a complete revolution during the interval embraced by a single advance interval and a single residence interval as heretofore explained. A cam riding lever 538 has a cam roller 539 designed to ride on the cam member 537, as shown in Fig. 52. The other end of the cam lever 538 is fixed to a pivot rod 541. The outer ends of the arms 528 and 529 of the bracket 526 have a secondary bracket 542 secured thereto. The secondary bracket 542 has a pair of spaced lug portions 543 projecting therefrom in which the pivot rod 541 is journaled.

A pair of rocker arms 544 have one end thereof secured to the pivot rod 541. The other end of each arm 544 is connected to a link element 545 as by hinge pin 546. Each link element 545 is also provided with a bearing sleeve 545' which receives a stud pin 547. One end of the stud pin 547 projects through an elongated slot 548 cut through the tubular wall of the fixed tubular casing 525 and the reduced end portion of the stud pin 547 projects into and is fixed in the bearing sleeve 520. The stud pins 547 are diametrically arranged and are free to move the length of the slots 548 through which they project, the slots 548 extending axially in parallelism with the axis of the spinning head shaft 515.

The cam roller 539 is resiliently maintained in rolling engagement with the cam member 537 by means of a pair of tension springs 549. One end of each tension spring 549 is suitably secured to the hinge pin 546 of the adjacent link element 545 and its other end is secured as to a fixed pin 549' projecting from the adjacent upper arm 528 of the bracket 526.

The cam track of the cam member 537 is so shaped as to rather slowly advance the spinning head 501 into progressive spinning engagement with the bottom end of the paper bottle so as to insure a tightly rolled bead formation $m$. The cam member 537 presents a spiraling track section 540 of gradually increasing diameter, as shown in Fig. 52. The spiraling track section 540 is so contoured that the spinning head 501 is in progressive spinning engagement with the bottom end of the paper bottle during substantially the entire interval during which the paper bottle is in dwelling position at the bottom spinning station. The cam track also presents a depressed, substantially circular, track section 540' disposed between the ends of the spiral track section 540 and connected to the end of the latter of greatest radius by a substantially flat, tangential transition section, so that the spinning head 501 makes a quick return stroke and remains in elevated non-interfering position during the advance interval of the turntable plate 50. The desired stroke action of the spinning head is thus effected by the contour of the cam track of the cam member 537, as generally illustrated in Fig. 52.

It will be appreciated that the spinning head 501 is continuously rotated by the driving motor 530 and its speed reducer unit 530'. The spinning rollers 503 associated with the spinning head 501 insure formation of the bottom bead $m$ of the desired shape and also avoid serious frictional heating of the paper material during the spinning operation. When the bead spinning operation has been substantially completed, it will be noted by referring to Fig. 55, that the periphery of the spinning rollers 503 are close to but do not touch the top surface of the adjacent clamping mechanism 70. The rims 88 of the clamping segments 85 firmly grip the cylindrical part of the bottle body and prevent deformation thereof during the bead spinning operation. Since the bottle body rests against the inturned rim portion 68 of the cell cup 66, the bottle body is also held rigid and immovable during the bottom spinning operation.

The bottom forming part $s$ of the bottom forming member is held rigidly in position during the spinning operation by the inwardly pressed rim forming shoulder $k$ of the bottle body, so that the skirt or flange $s'$ of the bottom forming member is tightly rolled within the rolled end section of the bottle body, insuring the production of a leak-proof bottom construction and a paper bottle of precise containing capacity. The bottom end of the paper bottle is also greatly strengthened and reinforced by the plural ply rolled bead formation $m$. The tightly wound bead $m$ also provides a firm support for the bottom forming part $s$ in raised elevation from the surface upon which the upright bottle body is placed.

The bottle ejecting mechanism

Upon completion of the bottom spinning operation at the bottom spinning station G, the turntable plate 50 quickly rotates through one-sixth of a revolution to advance the bottom spun paper bottle from the bottom spinning station G to residence position at the bottle ejecting station H. During this advance movement of the turntable plate 50, the cam roller 102, associated with the clamping mechanism 70 moving from station G to station H, rolls from the highest track section 97''' onto the lower track section 97' of the cam cup 96, as shown in Fig. 18. Thus, during this movement, the clamping segments 85 of the clamping mechanism 70 leaving the bottom spinning station G, are retracted outwardly so as to completely disengage the paper bottle. When the paper bottle has assumed residence position at the bottle ejecting station H, the paper bottle can be lifted upwardly and removed from its supporting cell cup 66.

Bottle ejecting mechanism 550 is positioned at the bottle ejecting station H to automatically expel the paper bottle from its supporting cell when in residence position at the ejecting station. As generally illustrated in Fig. 13, and more particularly illustrated in Figs. 56, 57 and 58, the bottle ejecting mechanism 550 comprises an upwardly projecting air cylinder 551 having a bottom forming plate 552 hermetically secured to the lower end thereof. A plurality of leg pins 553 support the bottom plate 552 at a convenient elevation from the foundation platform 49. The leg pins 553 may be provided with threaded lower end portions which are threaded into the foundation platform 49, the upper threaded ends of the leg pins 553 projecting through suitable holes formed in the laterally projecting flange portion of the bottom plate 552. Suitable nuts 554 may be used to fixedly secure the bottom plate 552 to the leg pins 553.

The upper end of the tubular air cylinder 551 is closed by a cover plate 555 suitably secured to the upper end of the cylinder 551 as by securing screws. The cover plate 555 has a series of breather holes 556 therein through which air may escape from the upper end of the cylinder. The cover plate 555 also has an axially extending bore which receives an air tube 557. The air tube 557 is designed to vertically reciprocate in the axial bore of the cover plate 555. A ring shaped piston head 558 is contained within the air cylinder 551 and has a sliding fit therewith. The piston head 558 is secured to the lower end of the air tube 557. Both the upper and lower ends of the air tube 557 are open to permit the passage of compressed air therethrough.

A fixed rod 560 presents a threaded lower end portion 560' which is threaded into the threaded axial bore of the bottom plate 552. An adjusting nut 561 is threaded onto the end portion 560' of the fixed rod 560 so that the rod may be fixed in the desired vertically adjusted position. A substantial upper section of the fixed rod 560 is so shaped that the lower end of the air tube 557 may snugly telescope thereover and seal the bore of air tube 557 against escape of air from beneath the piston 558 during the major portion of its stroke, as shown in Fig. 57. A coil spring 562 is contained within the air cylinder 551, embraces the contained section of the air tube 557, and is positioned between the upper face of the piston head 558 and the lower face of the cover plate 555. The coil spring 562 operates to dampen the end of the upward stroke of piston head 558 and insure the start of the downward stroke which is completed by gravity.

The piston head 558 divides the interior of the air cylinder 551 into a lower compressed air chamber 564 and an upper chamber 565 which contains the coil spring 562. The compressed air tube 361 which leads from air cup 360 of the master control valve 320, as shown in Figs. 13, 49 and 56, is connected to a suitable coupling 566 leading into the lower compressed air chamber 564 of the air cylinder 551. When compressed air, as controlled by the master air control valve 320, is admitted to the lower air chamber 564, an upward driving force is applied to the piston head 558 which raises the air tube 557 against gravity and the downward force exerted by the coil spring 562.

It is to be noted that the compressed air supply for operation of the bottle ejecting mechanism 550 is supplied to master control valve 320 from the exhaust air from the swedging operation cylinder 250 and the bottom disc blanking and inserting mechanism 370, as these devices make their return strokes. The use of this secondary air supply for bottle ejection thus makes use of otherwise wasted energy and hence contributes to the general economy of machine operation.

An abutment collar 567 is secured to the upper end of the air tube 557 and is positioned exterior of the cover plate 555 of the air cylinder 551. The abutment collar 567 comprises a metal collar member 568 which may be adjustably secured to the air tube 557 as by means of a set screw 568'. The lower face of the metal collar member 568 has a resilient bumper pad 569 secured thereto designed to seat against the cover plate 555 when the air tube 557 is in its retracted position as shown in Fig. 57. The upper face of the metal collar member 568 is provided with a resilient cushioning pad 569' designed to be moved into resilient pressing abutment against the mouth of the paper bottle when located in residence position thereover at the bottle ejecting station H.

During the initial stage of upward movement of the air tube 557, as driven by compressed air admitted into the air chamber 564 of air cylinder 551, the upper bumper pad 569' is moved into lifting abutment against the mouth end of the paper bottle so as to loosen it from its snug seating position within its cell supporting cup 66. During this initial upward movement of the air tube 557, it will be noted that the upper end of the fixed rod 560 still extends into the lower end of the air tube 557, so that substantially no compressed air escapes from the upper end of the air tube 557. However, the upper end of the air tube 557 will have been projected into the mouth end of the paper bottle.

During the second stage of continuous upward movement of the air tube 557, the compressed air contained within the air chamber 564 lifts the piston head 558 above the upper end of the fixed rod 560, as shown in Fig. 58, permitting compressed air under substantial pressure to escape from air chamber 364 through the upper end of the air tube 557 and into the bottle body so as to exert upward driving pressure against the interior face of the bottom forming member of the paper bottle. This compressed air force is sufficient to blow the paper bottle upwardly and out of its cell cup 66.

A bottle receiving chute 570 is positioned directly above the turntable plate 50 and the bottle blow-out mechanism 550, as shown in Figs 13 and 56. The air chute 570 comprises a vertically extending tubular section 571 into which the inverted paper bottle ejected from its cell cup is upwardly blown by the compressed air discharging from the air tube 557. The lower end of the vertical section 571 of the air chute 570 is positioned directly above the clamping mechanism 70 of the cell cup 66 as located in residence position at the bottle ejecting station H, thereby insuring positive upward flight of the paper bottle through the chute secion 571.

An enlarged elbow shaped chute section 573 is connected to the upper end of the vertical section 571, the adjacent ends of the vertical section 571 and the elbow shaped section 573 being suitably secured as by means of a mounting bracket 574 to the adjacent frame member 43 of the machine. The interior of the elbow section 573 of the air chute is so shaped as to permit the paper bottle to turn therein, and then slide downwardly within the inclined portion 575 of the elbow section 573, as shown in Fig. 56.

The inclined portion 575 of the elbow section 573 leads into a pocket section 576, which is connected to a conveyor tube 577 through which the paper bottles are successively transported to a suitable location for storage, or to a waxing machine which operates to apply a coating of molten wax to the paper bottles, or to a filling machine for filling the paper bottles with the desired liquid contents. An auxiliary blower 578, continuously driven as by a suitable driving motor 579, is connected to the adjacent base end of the pocket section 576 of the air chute 570, as by means of a suitable coupling 580 connected to the discharge outlet 581 of the blower 578. The auxiliary blower 578 and its associated driving motor 579 may be suitably supported by means of a channel bracket 582 secured to the adjacent frame member 43 of the machine. The auxiliary blower 578 provides the air power to pneumatically advance the successive paper bottles from the pocket section 576, through the conveyor tube 577, and to the desired location in the plant. The compressed air supplied to the air chamber 564 and projected through the air tube 557 of the bottle ejecting mechanism 550, is relied on to carry the finished paper bottle from its cell cup 66, through the vertical tube section 571, through the elbow section 573, and into the pocket section 576 of the air chute 570.

It will now be appreciated that the paper bottle is ejected from its cell cup 66 and sent on its way through the conveyor system during the interval of residence of the paper bottle at the bottle ejecting station H. The master air control valve 320 operates to cut off the flow of compressed air through the supply tube 361 when the bottle has been ejected from its cell cup. Since the compressed air supplied to the lower air chamber 564 of the air cylinder 551 escapes through the air tube 557, the air pressure within the chamber 564 is almost immediately reduced to normal as soon as the air supply thereto is cut off by the master control valve 320. Thus the compressed coil spring 562 will assist to return the piston head 559 and its associated air tube 557 to the retracted position shown in Fig. 57 as soon as the compressed air supply to the air chamber 564 is cut off. The upward and downward stroking movement of the air tube 557 is effected during the interval of residence of the paper bottle at the bottle ejecting station H, so that the turntable plate 50 is thereafter free to make its step advance to carry the empty cell cup, removed of its paper bottle at the bottle ejecting station H, to the idling station I.

There is no operating mechanism located at the idling station I of the machine disclosed in this application. The cell cup 66 should have no paper bottle or parts thereof when in residence position at the idling station I. The clean and empty condition of the cell cup when in residence position at the idling station I can be visibly observed, making sure that the clean and empty cell cup 66 is advanced to the bottle loading station D' in satisfactory condition to be loaded with a fresh bottle body.

*Safety control mechanism*

No operating difficulties would normally be encountered in event no bottle body was received by the cell cup while in residence at the loading station D', nor would any operating problems be created in event an empty cell cup should arrive in residence position at the swedging and mouth shaping station E. The stripping mechanism at the stripping station D would continue its stroking cycle without having a bottle body to operate upon, and without damage to the mechanism. Similarly, the swedging anvil 150 and associated glue applicator device 175 can continue to perform their operating strokes in synchronism with the stroking movements of the lower fluting and mouth forming mechanism 220, without damage or harm to the operating parts thereof, in the event no bottle body was contained in the cell cup in residence at the fluting and mouth forming station E.

Likewise, the bottom spinning mechanism 500 and the bottle blow-out mechanism 550 may continue to be driven through their operating cycles without harm or damage to these mechanisms, and without causing any operating difficulties, in event an empty cell cup should arrive at residence position at either the bottom spinning station G or the bottle ejecting station H.

However, if no bottle body were advanced by a cell cup to residence position at the disc blanking and inserting station F, and the disc blanking and inserting mechanism 370 as well as the paper strip advancing mechanism 430 were then permitted to continue their cycle of operations, it will be appreciated that a paper disc would be punched and inserted into the empty cell cup in residence position at this station and a strip section would be advanced to punching position within the fixed casing 371 of the punching inserting mechanism 370. Such a condition would require removal of the bottom forming disc from the otherwise empty cell cup, before a bottle body could be loaded therein at the loading station D'.

To avoid the possibility of a cell clean-out problem, in the event an empty cell cup should arrive in residence position at the disc blanking and inserting station F, and to further assure continuous and uninterrupted operation of the machine, it may be desirable to provide safety control mechanism which will operate to automatically halt the downward punching and inserting movement of the piston head 375 and plunger block 396 of the disc blanking and inserting mechanism 370, and also halt the feeding advance of the paper strip into punching position within the fixed casing 371 of the mechanism 370, in the event an empty cell cup should arrive at residence position at the disc blanking and inserting station F.

Accordingly, this invention contemplates the provision of safety control mechanism to temporarily halt the punching and inserting operation of the disc punching and inserting mechanism 370, and to halt the paper strip advancing mechanism 430, only upon the failure of a bottle body to arrive in residence position at the disc punching and inserting station F, and in a manner so that when the next loaded bottle body cell cup arrives at residence position at the station F, the bottom disc punching and inserting mechanism 370 and the paper strip advancing mechanism 430 will resume operation and perform the desired functions without attention from the operator.

This safety control mechanism may comprise a bottle feeler device 585 (Fig. 50) located at the bottom disc blanking and inserting station F which is designed to manipulate an adjacent electric control switch 595 connected in circuit with the series of switches and electric control devices through which the above desired results are obtained. The feeler finger device 585 comprises a shaft pin 586 which extends downwardly through the platform plate 356 adjacent the outer rim of the turntable plate 58 and adjacent the disc blanking and inserting station F in a manner which does not interfere with the free rotation of the turntable plate 59, as shown in Figs. 12 and 38. The shaft pin 586 is journaled in the platform plate 356, the lower end of the shaft pin 586 extending downwardly slightly below the plane of movement of the lower edge of the cell cups 66.

An inwardly extending feeler finger 588 has one end thereof fixed to the lower end of the shaft pin and the other end thereof projects inwardly so as to be engaged by the bottle body if it is present as it moves into residence position at the disc blanking and inserting station F. An outwardly extending arm 589 has one end thereof fixed to the upper end of shaft pin 586 and is thus positioned above the platform plate 356. The other end of the arm 589 is connected to one end of a tension spring 590. The other end of the tension spring 590 is fixed to a pin 591 projecting upwardly from the fixed platform plate 356.

The arm 589 and the feeler finger 588 are thus fixedly connected to the journaled shaft pin 586 and together form an angular member which is fulcrumed in its bearing in the platform plate 356. As the bottle body moves into residence position at station F, the feeler finger 588 is engaged by the bottle body and swung to the left, as indicated in Fig. 38, against the action of the resilient tension spring 590. When an empty cell cup arrives at station F, the feeler finger 588, as influenced by the tension spring 590, will occupy the solid line position as shown in diagrammatic Fig. 50.

An electric switch 595, as shown in Fig. 38, is secured to the platform plate 356 directly adjacent the arm 589. The switch 595 has a contact element 596 designed to be engaged by an adjustable contact screw 593 associated with the arm 589, in a manner to open the switch 595 when a bottle body, engaged by the feeler finger 588, is in residence position, or is moving adjacently into or adjacently from the residence position, at the disc blanking and inserting station F. When there is no bottle body in or immediately adjacent residence position at the station F, which would occur either during the main advance movement of the cell cup to the station F, or when an empty cell cup arrives at residence position F, the feeler finger 588 remains normally position to the right as urged by the tension spring 590, as indicated in solid lines in Fig. 50, whereby the contact screw 593 associated with the arm 589 maintains the contact element 596 of switch 595, in such position that the switch 595 remains closed and electric curent may flow therethrough. The make and break action of the contact switch 595 is employed to directly control the compressed air control valve 490 and thereby the operation of the disc punching and inserting mechanism 370 and indirectly control the operation of the paper strip advancing device 430 through the operation of mechanism 370 in the manner heretofore described.

As shown in Figs. 38, 49 and 50, the compressed air control valve 490, has a solenoid 600 associated therewith. The solenoid 600 has the usual winding 601 presenting an internal bore 602, the winding 601 being contained in a suitable casing. The solenoid 600 may be secured in fixed axial alignment with the valve stem 495 of the control valve 490 and adjacent one end thereof as by means of a suitable bracket 605 which is suitably attached to the adjacent end of the valve casing 493. The solenoid winding 601 is connected in circuit with the make and break switch 595 associated with the feeler finger device 585. The valve stem 495 of the control valve 490 has a core extension 606 projecting therefrom designed to be drawn into the bore 602 of the solenoid winding 601.

When the solenoid 600 is not energized by the flow of curent to its winding 601, the solenoid core extension 606 remains in neutral position and the control valve 490 remains open so that compressed air may flow between the ports 496 and 497 thereof. However, when the solenoid winding 601 is energized, the core extension 606 thereof will be drawn into the energized winding 601 in a manner so as to manipulate the valve stem 495 into closed position against the force of the coil spring 498 associated with the valve stem.

The compressed air control valve 490 also has a make and break switch 610 associated therewith, as shown in Figs. 38, 49 and 50. The switch 610 has a contact element 611 normally in contact with the head portion 498' of the valve stem 495 when the control valve 490 is in open position. When the contact element 611 of the switch 610 is engaged by the head portion 498' of the valve stem 495, the switch 610 is open and no current flows therethrough. However, when the valve stem 495 is drawn into valve closing position by the energized solenoid 600, the switch 610 moves to closed circuit position. The switch 610 is also connected in circuit with the solenoid 600 and the bottle switch 595 associated with the feeler finger device 585.

It will be noted, by referring to Figs. 38, 45, 49 and 50, that the continuously driven shaft 353 carries the cam member 352 which manipulates the master air control valve 320. As heretofore explained, the cam member 352 makes a complete revolution during a single indexing advance interval and a single dwelling interval of the machine. The cam member 352 has a raised track section 352" which is so shaped as to manipulate the master control valve 320 in a manner to permit compressed air to flow through air line 256, through branch line 491, through the normally open control valve 490 and into the disc punching and inserting mechanism 370, thereby to downstroke the piston head 375 and plunger block 396 thereof during the first half of the residence interval.

The cam track of cam member 352 also has a depressed track section 352' which manipulates the master control valve 320 so as to direct compressed air through air line 257 into the base end of the air cylinder 250, and at the same time permit exhaust air from the head end of the air cylinder 250 to escape through air line 256, through the air chamber 334 of the control valve, and thence into the receiving cup 360 of the master air control valve 320 during the latter half of the residence interval. When compressed air flows from air line 256 and into the receiving cup 360 of the master control valve 320, compressed air also escapes from the air chamber 385 of the disc blanking and inserting mechanism 370, through the open control valve 490 and through branch line 491 into air line 256, thus permitting the coil springs 400 and 402 of the disc blanking and inserting mechanism 370 to return the piston head 375 and the plunger block 396 thereof to raised residence position.

Thus the master control valve 320 controls the functional operation of the air cylinder 250, which drives the fluting anvil 150 as well as the lower swedging and mouth shaping mechanism 220, and also controls the functional operation of the disc-blanking and inserting mechanism 370. Accordingly, the control valve 490 remains in open position at all times during normal functioning of the machine, and is only closed by the operation of the solenoid 600 when, and only when, one or more empty cell cups should arrive at residence position at the disc blanking and inserting station F.

The continuously rotating shaft 353 has a second cam member 612 fixed thereto as shown in Figs. 38, 45 and 50. The track of cam member 612 is engaged by the contact element 616 of a make and break switch 615. The track of the cam member 612 has a depressed track section 613 approximately 270° in extent, and a raised track section 613' approximately 90° in extent. When the contact element 616 of the make and break switch 615 is in riding contact with the depressed track section 613 of the continuously rotating cam member 612, the cam switch 615 is closed, but when the contact element 616 of switch 615 is in riding contact with the raised track section 613' the switch 615 is open, as indicated in Fig. 50. The cam member 612 is adjustably secured to the continuously rotating shaft 353 so that the make and break switch 615 normally remains open during the indexing advance interval of the turntable plate 50, and normally remains closed during the entire residence or dwelling interval.

The make and break cam switch 615 as manipulated by the cam member 612, the make and break switch 610 as manipulated by the valve stem 495 of the control valve 490, and the make and break bottle switch 595 as manipulated by the finger feeler device 585, are all connected in a primary electric circuit as diagrammatically illustrated in Fig. 50. One of the inlet wires 620, having a suitable manual control switch 621 therein, is connected to one terminal of the winding 601 of the solenoid 600. The other terminal of the solenoid winding is connected to lead wire 622, which is in turn connected to one terminal of the bottle switch 595. The other terminal of the bottle switch 595 is connected to lead wire 623 which in turn is connected to one terminal of the cam switch 615 associated with the cam member 612. The other terminal of the cam switch 615 is connected by lead wire 624 to the other inlet wire 625.

A second electric circuit is formed by connecting inlet wire 625 to one of the terminals of the switch 610 associated with the compressed air control valve 490. The other terminal of the switch 610 is connected by lead wire 626 to the lead wire 623. The secondary circuit is completed by lead wire 623, bottle switch 595, lead wire 622, solenoid winding 601 and inlet wire 620.

The operating characteristics of the safety control mechanism, which operates to automatically prevent the downward stroking movement of the piston head 375 and the plunger block 396 of the disc blanking and inserting mechanism 370 in the event an empty cell cup arrives at the disc blanking and inserting station F, may be more fully understood by referring to the operating diagram shown in Fig. 51. As indicated on this operating diagram, the cam member 352 which manipulates the master air valve 320 makes a complete 360° revolution during one advance or index interval plus one residence or dwelling interval. The master control valve 320 is in operative engagement with the depressed cam track section 352' of the cam member 352, and in open air exhaust adjustment to its receiving cup 360 during the indexing interval and during an initial increment of the dwelling interval, during which stage the cam member 352 rotates approximately 95° to 100°.

Thence, the control valve 320 is manipulated by the raised track section 352", during which second stage the cam member 352 further rotates from its 95° to 100° position to an approximate 185° to 190° position. During this second stage of continuous rotation of cam member 352, a bottle body is normally in dwelling position at station F, and compressed air is admitted by the master control valve 320 through line 491, through normally open control valve 490, and into the disc blanking and inserting mechanism 370, to thereby downstroke the piston head 375 and plunger block 396 thereof and effect blanking and insertion of the bottom member into the bottle body.

During the third and final stage of rotation of the cam member 352 from approximately 185° to 190° to its full 360°, the master control valve 320 is again in riding engagement with the depressed track section 352' of the cam member 352, permitting air exhaust from the disc blanking and inserting mechanism 370 so that the piston head 375 and plunger block 396 thereof will be returned to raised and inoperative position. This third movement stage occurs while the paper bottle is still in residence position at station F.

The cam switch 615, as controlled by the continuously rotating cam member 612, is in open position during the full indexing interval and is in closed position during the full dwelling interval, as indicated in the operating diagram of Fig. 51. However, even though the cam switch 615 is in closed position during the entire dwelling interval, current would not flow to the solenoid 600, to thereby energize the solenoid winding 601, and close control valve 490 so that no compressed air would be supplied to downstroke the disc blanking and inserting mechanism 370, unless and until the circuit is completed by the closed position of the bottle switch 595. It will thus be appreciated that the solenoid winding 601 is not energized and the control valve 490 remains open at all times, except when the bottle switch 595 remains closed during the dwelling interval, which can occur only in the event no bottle body arrives to dwelling position at station F.

As indicated in Figs. 50 and 51, the finger feeler device 585 is engaged by the paper bottle and the bottle switch 595 accordingly remains open during the entire dwelling interval and during a very short instance at the beginning and the end of the indexing interval. During the greater part of the advance or indexing interval, when the finger feeler device is not engaged by a paper bottle and the bottle switch 595 remains closed, it will be noted that cam switch 615 remains open, so that the solenoid winding 601 cannot then be energized, leaving control valve 490 and switch 610 open. During the dwelling interval, when cam switch 615 is closed, a bottle body immediately approaching or immediately leaving or dwelling at station F, would manipulate the feeler finger device 585 so as to permit the bottle switch 595 to remain open so that the circuit to the solenoid winding 601 would remain open, and the control valve 490 and the switch 610 would also remain open.

However, if there is no bottle body immediately approaching or leaving or dwelling at station F to manipulate the bottle finger device 585, the bottle switch 595 remains closed and a primary circuit will be established by cam switch 615 to energize the solenoid winding 601 at the beginning of the dwelling interval at which time the cam switch 615 closes. When the solenoid winding 601 is energized by the thus completed primary circuit, the normally open air control valve 490 is closed and the normal downstroke movement of the disc blanking and inserting mechanism 370 does not take place, and no bottom disc member is then punched or inserted into the empty cell cup in dwelling position at station F.

During the entire dwelling interval of an empty cell cup at station F and during a substantial part of the succeeding indexing interval, it will be noted that the bottle switch 595 remains closed, and so remains until a following bottle body approaches residence position to engage the feeler finger device 585 and thus open bottle switch 595.

The switch 610 in the second circuit, which is independent of the cam switch 615, provides, when closed, an energizing circuit for the solenoid winding 601 which maintains the control valve 490 closed until the bottle switch 595 is opened by bottle body manipulation of the feeler finger device 585.

In this secondary circuit, current flows through inlet wire 620, through solenoid winding 601, through lead line 622, through the closed bottle switch 595, through lead line 623, through lead line 626, through the closed switch 610, and through inlet wire 625. This secondary circuit, wholly independent of the opening and closing movement of the cam switch 615, provides the current for energizing the solenoid winding 601 and to thereby retain both the control valve 490 and the switch 610 in closed position as long as no bottle body has been advanced during the indexing interval to a position where it will manipulate the feeler finger device 585 and open the bottle switch 595.

The purpose of the switch 610 and its secondary circuit is to provide a holding circuit for energizing solenoid coil 601 during a repeated series of indexing movements of turntable 50 in which no bottle bodies arrive at station F. In such a case the arrival at station F of an empty bottle body cell cup 66 insures the initial closing of switch 610 and its associated valve 490 due to the already closed bottle switch 595 and the closing of cam switch 615 at the beginning of turntable dwell, which thus establishes the primary circuit to energize the solenoid coil 601. At the end of the first dwell period just referred to, the cam switch 615 opens but the switch 610, valve 490 and bottle switch 595 still remain closed due to the established secondary holding circuit, and will so remain closed until a bottle body finally arrives at station F and opens bottle switch 595 to break the holding circuit.

If switch 610 was omitted from the circuits, the cam switch 615, which repeatedly opens and closes during each revolution of the cam shaft 353, would cause the solenoid actuated valve 490 also to repeatedly open and close during successive arrivals of a series of empty bottle body cells. Although this repeated closing and opening of solenoid actuated valve 490 would not lead to any objectionable action of the bottom blanking and inserting mechanism, the wear and tear on the solenoid actuated valve 490 would not be avoided. Thus, during machine starting when at least six or more empty bottle body cells pass station F before the first bottle body arrives, the provision of switch 610 and its secondary circuit prevents repeated opening and closing thereof.

As soon as bottle switch 595 is opened, the secondary electric circuit is broken, and solenoid winding 601 will be de-energized, control valve 490 will be restored to open position, and switch 610 will be opened. Thereafter the solenoid winding 601 returns to the influence of the primary circuit and is effected by the closing and opening movement of the cam switch 615. As a result of the closed position of the control valve 490, caused by the presence of an empty cell cup 66 in residence at station F, as above explained, the plunger head 375 fails to make its timely downstroke during the first part of the dwelling interval, and the rocker lever 478 associated with the yoke lever 484 will manipulate the latching dog 464 to disconnect the clutch section 462 from the clutch section 361 and correspondingly halt further advance of the paper strip, as heretofore explained. This improved safety control mechanism thus insures fool-proof operation of the machine under all conditions.

*Operation of the machine*

In the composite machine illustrated in Figs. 12, 13 and 14 of this application, the first section and the second section thereof are driven in synchronism from a common driving motor 110 which may be continuously driven, and is operatively connected to the air clutch 116, as shown in Fig. 16. Both machine sections may be thrown into and out of operation by a manually operated air control valve (not shown) positioned at a convenient location and associated with the air supply line 120 which supplies compressed air to the air clutch 116. Thus the continuously driven motor shaft 113 may be connected or disconnected from the clutch shaft 119 in a manner to bring the composite machine up to the operating speed and to almost instantaneously halt the operation of the machine as desired by the operator.

The first section of the machine is driven from the sprocket wheel 122 fixed to the clutch shaft 119, connected through the sprocket chain 20 to the main drive shaft 8 of the first machine section, as shown in Fig. 15. The drive shaft 8 continuously rotates the Geneva driving member 5 which drives the Geneva gear 4. In the machine as shown in Figs. 12 to 15 inclusive, the Geneva gear 4 is rotated one quarter of a revolution for each full rotation of the Geneva driving member 5, so that the associated mandrel supporting turret 1 makes one quarter of a revolution in approximately one half second, which would be the advance interval of the mandrel supporting turret. The mandrel supporting turret remains fixed and stationary, with its respective mandrels in dwelling position at its respective operating stations, during three quarters of one revolution of the driving member 5, and accordingly, the dwelling interval of the machine as illustrated would be three times the stage advance interval. The Geneva gear 4 is adjustably secured to the turret shaft 3 so as to permit accurate residence indexing of the mandrels at the respective operating stations.

The pressure rollers 11 at the winding station A are continuously rotated from the drive pulley 18 attached to the main drive shaft 8. Thus when a mandrel has been orbitally advanced to the winding station by rotation of the turret, the mandrel at the winding station is immediately rotated by the pressure rollers 11. The moment the mandrel arrives at the winding station, feed mechanism, as shown in our copending application Serial No. 85,783, filed April 6, 1949, advances the leading end of the paired blanks a and b to the rotating mandrel 10 at the winding station, and the blanks are smoothly wound on the mandrel during the residence interval, the winding operation being facilitated by finger assemblies designed to be swung into mandrel embracing position during residence of the mandrel at the winding station, as illustrated and described more particularly in our copending application Serial No. 85,781, filed April 6, 1949.

When the winding operation has been completed, the finger assemblies are automatically swung into inoperative position, and the wound body supporting mandrel is advanced during the second advance interval by the quarter rotation of the mandrel supporting turret 1 to thereby place the body supporting mandrel at the pressing station B. The pressing rollers 21 at the pressing station exert compressive pressure on the wound body supported on the mandrel in dwelling position therebetween. During this dwelling interval, which may be approximately one and one-half seconds as above indicated, the mandrel supported bottle body is subjected to the rolling pressure of the pressure rollers 21, thereby smoothing the surfaces of the bottle body, compressing the joints thereof, and insuring a firm adhesive bond between the plies thereof.

During the third rotative stage of the mandrel supporting turret 1, the compressed bottle body is swung along with the mandrel which it encases, to the spinning station C where the mandrel and its supported bottle body remains for the full dwell interval, which may be one and one-half seconds as above indicated. The spinning head 24 at the spinning station C is continuously rotated by the driving motor 26. The spinning head remains retracted from the orbital path of travel of the mandrels during each advance stage thereof. The moment the mandrel 10 has assumed dwelling position at the spinning station, it is held against rotation, and the spinning head 24 is axially advanced into spinning engagement with the mouth end of the bottle body.

The spinning head 24 is axially advanced by the action of the continuously rotated cam member 33 fixed to shaft 34. The cam member 33 is continuously rotated at the same rate of speed as the Geneva driving member 5, by sprocket chain 36 which is in driving engagement with the sprocket 37 fixed to the stub shaft of the Geneva driving member 5, as shown in Fig. 13. The cam member 33 is so shaped as to swing the lever arm 30, as shown in Fig. 15, in a manner to advance the rotating spinning head 24 into progressive spinning engagement with the mouth end of the bottle body, and thence retract the spinning head from the mouth end of the bottle body, during the dwelling interval of the bottle body at the spinning station. Assuming that the machine is timed to provide a dwelling interval of one and one-half seconds, the mouth spinning operation is completed in slightly less than one and one-half seconds, the cam member 33 then being driven to make a complete revolution in approximately two seconds. An instant prior to the termination of the dwelling interval, cam member 33 has rotated to a position where the tension spring 30' may operate to manipulate the lever 30 to instantly retract the spinning head 30 from spinning position and clear of the orbital movement of the mandrel.

During the fourth quarter revolution of the mandrel supporting turret 1, the mandrel supporting a mouth spun body at the spinning station C, is swung into dwelling position at the stripping station D. During this advance movement, stripping dogs 38 are in their raised inoperative position, as shown in Fig. 17, with the stripping dogs 38 maintained in outswung contact with the abutment plates 40 clear of the advance path of the mandrel.

The moment the body loaded mandrel reaches dwelling position at the stripping station D, compressed air is admitted to the air cylinder 42, manipulating the rack and pinion assembly 42' and the stroking chains 41, to downstroke the stripping dogs 38 in a manner to downwardly strip the container body from its supporting mandrel and deposit the removed container body, formed as shown in Fig. 1, in inverted position within the cell cup 66 located at the loading station D', forming a part of the second section of the composite machine.

The second machine section comprises a conveyor, which as shown in the drawings, may conveniently comprise a horizontal, rotatable turntable plate 50 having a plurality of container body receiving cell cups 66 arranged in equally spaced relationship around the perimeter thereof and forming a part of the turntable structure. Each cell cup 66 has a container body clamping device 70 associated therewith, each clamping device having a plurality of radially movable clamping segments 85 designed to be moved into and out of clamping engagement with the container body seated within its associated cell cup. In the form of invention illustrated in this application, the turntable plate 50 presents six container body receiving cells associated therewith designed to be successively advanced to and from residence position at the loading station D', the fluting and mouth forming station E, the bottom blanking and inserting station F, the bottom spinning station G, the container ejecting station H and the idling station I, each station being positioned in equal spaced relationship around the perimeter of the turntable plate 50.

The turntable plate 50, as illustrated in this application, is rotated through one sixth of a revolution during each advance interval in a manner to accurately index the successive container body supporting cells at the respective operating stations associated with the second conveyor, where the container body supporting cells remain in residence for the established dwelling interval. The turntable plate 50 is rotated from the clutch shaft 119, which is in driving engagement with the continuously rotating Geneva driving member 134 which rotates the Geneva gear 137 through one quarter revolution with each full rotation of the Geneva driving member 134, as illustrated in Fig. 16. The Geneva gear 137 is operably connected by sprocket chain 144 to the sprocket wheel 62 adjustably secured to the tubular casing 56 connected to the turntable plate 50.

The loading station D' associated with the second conveyor is positioned directly below the stripping station D associated with the first conveyor. The mandrel supporting turret 1 of the first machine section and the turntable plate 50 of the second machine section are rotated in synchronism with concurrent advance and dwelling intervals of the same duration. By adjusting the holding bolts 63, the turntable sprocket 62 is adjustably fixed to the tubular casing 56 of the turntable plate so that the successive cell cups 66 will successively advance to residence position between the stripping station D and the loading station D', with the vertical axis of the cell cup in alignment with the vertical axis of the body supporting mandrel 10 in residence position at the stripping station D, thereby also insuring accurate residence indexing of the successive cell cups with the successive operating stations arranged around the perimeter of the turntable plate 50.

During the first advance interval, the loaded cell cup 66 advances from the loading station D', by the rotation of the turntable through one-sixth of a revolution, to place the body loaded cell cup in axial alignment with the swedging anvil 150 located at the fluting and mouth forming station E, which advance movement is effected during the established advance interval of approximately one-half second. During this advance movement, the cam roller 102 associated with the container clamping device 70 whose cell has been loaded with a container body at station D', moves onto the intermediate raised section 97'' of the cam track 97 fixed to the pedestal post 51 which supports the turntable plate. When the loaded cell cup arrives at residence position at the fluting and mouth forming station E, the clamping segments 85 have been moved inwardly against the container body to rigidly hold the container body in true axial alignment with the reciprocable swedging anvil 150.

During the advance movement of the loaded cell cup from the loading station D' to the fluting and mouth forming station E, the piston head 252 is positioned at the head end of the air cylinder 250, as shown in Fig. 26, in which position the rack member 243 operably connected to the piston head 252 and the sprocket chain 172, retains the swedging anvil 150 in its maximum raised position. When the swedging anvil 150 is in its maximum raised position, the bumper ring 162 thereof is in pressing engagement with the lower collar member 179 of the glue applicator device 175, thereby pressing the upper collar member 185 thereof into frictional engagement with the continuously driven friction disc 191', thereby causing rotation of the glue applicator device 175 and at the same time circumferentially expanding the glue applicator surface 178' of the tire member 176 into adhesive receiving contact with the glue transfer wheel 207 of the glue fountain 200, as shown in Fig. 30.

During the advance movement of the container loaded cell cup 66 to residence position at the fluting and mouth forming station E, the cam roller 351 associated with the master control valve 320 is in riding engagement with the depressed section 352' of the cam track of the continuously rotated cam member 352, which cam member makes one complete revolution during one residence interval plus one advance interval of the turntable plate 50. During the advance interval, the valve stem 324 of the master control valve 320 is in the position shown in Fig. 49, and as thus adjusted, compressed air is free to flow from the control valve 320 through air conduit 257 into the base end of the air cylinder 250, maintaining the piston head 252 thereof at the head end of the valve cylinder.

The moment the loaded cell cup arrives at the fluting and mouth forming station E, the cam roller 351 associated with the master control valve rolls onto the raised section 352'' of the continuously rotating cam member 352, so as to manipulate the valve stem 324 to the right as viewed in Fig. 49, admitting compressed air to conduit 256 and into the head end of the cylinder, at the same time permitting escape of compressed air from the base end of the cylinder through air conduit 257. The piston head 352 is thus driven to the right as viewed in Fig. 26, so that the rack member 243 manipulates sprocket chain 172 to downstroke the swedging anvil 150 into the container body during the first part of the residence interval.

The downstroke movement of the swedging anvil 150 carries the glue applicator device 175 downwardly out of contact with the continuously rotating friction disc 191, and thereupon the tire member 176 associated with the glue applicator device contracts out of contact with the glue transfer wheel 207, the glue applicator device ceases to rotate, and is carried downwardly with the swedging anvil 150 into the adjacent bottom end of the inverted container body.

When the laterally extending lugs 181' on the inner tubular sleeve 181 of the glue applicator device have moved downwardly into seating abutment against the resilient cushion 219, as shown in Fig. 30, the tire member 176 thereof is suspended within the container body at the proper position to apply the band of adhesive $h$ to the inner surface thereof. The swedging anvil 150 continues its downward stroke into the container body until the bumper pad 165, associated with the coupling block 164 of the anvil shaft 155, is brought into pressing engagement against the upwardly extending fingers 186' of the outer tubular sleeve 186 of the glue applicator device, with sufficient pressure to depress the top edge of the projecting fingers 186' to the plane of the adjacent laterally projecting lugs 181', thereby causing an incremental telescoping movement of the outer tubular sleeve 186 over the inner tubular sleeve so as to move the upper collar member 185 towards the lower collar member 179, and thereby circumferentially expanding the tire member 176 of the glue applicator device into adhesive applying contact with the inner surface of the container body.

Movement of the piston head 252 from the head end to the base end of the air cylinder 250, during the first part of the residence interval, also raises the lower fluting and mouth forming mechanism 220 to body operating position. The initial raising of the platform 221 of the lower fluting and mouth forming mechanism 220, causes the head portions 270 of the contracted anvil segments 260 to be inserted into the mouth end of the container body, and at the same time the tubular casing 285 which supports the anvil segments 295 is upwardly telescoped over the truncated conical part of the suspended container body, until the abutment pad 315 associated with the casing 285 is brought into abutment against the fixed top plates 225 and 226 and further upward movement of the casing 285 thereby prevented. During the final increment of upward movement of the platform 221, the head portions 270 of the anvil segments 260 are driven outwardly by the conical end 279 of the rising arbor member 278, so as to press the shaping faces and anvil head portions into forming engagement with the inner face of the mouth bead c. The outer casing 287 also rises with the final incremental rise of the platform 221 so as to pivot the links 305 to horizontal position and thereby swing the fluting segments 295 into fluting and mouth forming engagement with the container body, thus operating in cooperation with the expanded head portions 270 of the anvil segments 260 and the swedging anvil 150 positioned within the container body.

During the second part of the residence interval, cam roller 351 associated with the master control valve 320 moves onto the depressed section 352' of the cam track of the continually rotating cam member 352, permitting tension spring 362 associated with the control valve 320 to manipulate the valve stem 324 to the left as shown in Fig. 49, thereby directing the flow of compressed air through air conduit 257 into the base end of the cylinder 250, and permitting escape of compressed air from the head end of the cylinder through air conduit 256 and into the exhaust cup 360. This exhaust air flows through flexible conduit 361 directly to container ejecting mechanism 550 located at the ejecting station H, which is then operated to eject a container from the cell cup 66 in residence at that station.

The in-flow of compressed air to the base end of the air cylinder 250 during the second part of the residence interval, drives the piston head 252 from the base end to the head end thereof. This movement of the piston head 252 lowers the platform 221 of the lower fluting and mouth shaping mechanism 220 and lifts the swedging anvil 150 from the container body. During the initial increment of upward movement of the anvil 150, the abutment pad 165 associated with the shaft 155 thereof is raised out of pressure contact with the fingers 188' of the outer tubular sleeve so as to permit the tire member 176 of the glue applicator device 175 to contract. Thereafter, the rising swedging anvil 150 raises the glue applicator device into driving contact with the driven friction disc 191.

Also during the movement of the piston head 252 to the head end of the air cylinder 250 during the second part of the residence interval, the platform 221 associated with the lower mechanism 220 is initially lowered to withdraw the tapered end 279 of the arbor 278 from the tapered bore defined by the assembled anvil segments 260, thereby permitting the continuous tension spring 267 associated therewith to contract the head portions thereof out of contact with the formed mouth bead c of the container body. During this same initial increment of downward movement of the platform 221, the outer casing 87 is lowered to pivot the links 305 to an acute angle, thereby swinging the swedging segments 295 out of contact with the container body. Thereafter, continued downward movement of the platform 221 carries the upper end of the swedging segment supporting casing 285 below the mouth end of the container body, at the same time withdrawing the anvil segments 260 to a position substantially below the container body. The fluted and mouth formed container body is then free to advance without obstruction from the fluting and mouth forming station E to the bottom blanking and inserting station F. During this advance interval, the cam roller 351 is in contact with the depressed track section 352' of the cam member 352 so that the piston head 352 is retained at the head end of the air cylinder 250.

When the fluted and mouth formed container body arrives in residence position at the bottom blanking and inserting station F, the cam roller 351 rolls onto the raised track section 352'' of the cam member 352, and some of the compressed air directed by the master control valve 320 through conduit 256 is by-passed into conduit 491, through safety control valve 490, through conduit 404 and into the primary air chamber 385 of the disc blanking and inserting mechanism 370 located at station F. The compressed air initially admitted to the primary air chamber 385 operates to drive the piston head 375 downwardly to cut a bottom forming disc from the strip section positioned thereunder. The final increment of downward movement of the piston head 375 is slowed down by operation of the dash pots 410, so that the flat bottom forming disc is gently seated on the inwardly extending ledge 393 of the die plate 391. Thereafter, compressed air flowing into the primary air chamber 385 is bypassed into the secondary air chamber 387 to drive the plunger block 396 downwardly, thereby shaping the flat bottom forming disc into cup shaped form as it is forced through the hole defined by the inner perimeter 394 of the ledge 393. The final increment of downward movement of the plunger block 396 is softened by the dash pots 410, so that the cup shaped bottom member is gently inserted in proper position within the open bottom end of the inverted container body. Thus the downward stroke of the piston head 375 and the plunger block 396 is completed during the first part of the dwelling interval.

During the second part of the residence interval, cam roller 351 rolls onto the depressed section 352' of the cam member 320, manipulating valve 352 so as to reverse the air flow and permit the exhaust compressed air to flow from the primary air chamber 385 of the bottom blanking and inserting mechanism 370, into exhaust cup 360 of the master control valve 320 and thence to the container ejecting mechanism 550. When the compressed air is thus permitted to escape from the primary air chamber 385 of the bottom blanking and inserting mechanism 370, the expansion springs 400 and 402 associated therewith operate to raise the piston head 375 and the plunger block 396 to raised starting position.

The feed rollers 431 and 432 continue to advance the material strip P as long as body containing cell cups 66 continue to arrive in residence position at the bottom blanking and inserting station F. During the first part of the residence period, when the piston head 375 is in engagement with the advanced section of the blank, the preceding intermediate section of the blank is required to hump to the form shown in Figs. 39 and 41, against the pressure exerted thereon by the rider device 450. As soon as the piston head 375 has been raised out of contact with the advanced section of the paper strip during the second part of the residence interval, the humped intermediate section of the strip is flattened by the rider device 450 and projected into blanking position within the casing 371 of the bottom blanking and inserting mechanism 370.

In the event an empty cell cup should arrive at residence position at the bottom blanking and inserting station F, this condition is indicated by the feeler finger device 585, which then closes the circuit to the winding 601 of the solenoid 600. The solenoid then operates to close the safety control valve 490 and shut off the compressed air supply to the primary chamber 385 of the bottom blanking and inserting mechanism 370, thereby halting the normal downstroke movement of the piston head 375 and the plunger block 396 thereof. At the same time, the rocking lever 478, operably connected to the upper yoke plate 403 of the bottom blanking and inserting mechanism 370, operates to trip the latching dog 464 associated with the clutch device 460 through which the strip feeding rollers 431 and 432 are operated, thereby simultaneously halting further advance movement of the strip as long as this empty cell condition prevails. When a loaded cell cup does arrive at residence position at the bottom blanking and inserting station F, the clutch sections 461 and 462 of the clutch device are automatically reconnected to drive the strip advancing rollers 431 and 432, the solenoid 600 is de-energized so as to permit the safety control valve 490 to open and permit normal in-flow and out-flow of compressed air to the bottom blanking and inserting mechanism 370.

The container body having a bottom member inserted therein, is then advanced during the next advance interval to residence position at the bottom spinning station G. During this advance interval, the cam roller 539 associated with the bottom spinning mechanism 500 is in contact with the depressed section 540' of the cam member 540, and the spinning head 501 is maintained in retracted position, but continuously rotated by its driving motor 530.

During this advance movement, the cam roller 102 connected to the clamping device 70 associated with the cell cup in which that container body is seated, moves onto the maximum raised section 97''' of the stationary cam track 97 associated with the supported pedestal 51 of the turntable plate 50. Thus when the cell cup and its container body arrive at residence position at the spinning station G, the clamping segments 85 will have been moved inwardly against the container body so as to form the inwardly pressed rim k therein as shown in Fig. 55. The inwardly pressed rim k prevents inward movement of the bottom forming member during the spinning operation and fixes the predetermined capacity of the container.

When the container has arrived at residence position at the spinning station G, the cam roller 539 rolls onto the spiral section of the cam member 540 so as to axially advance the spinning head 501 into progressive spinning engagement with the bottom end of the container body so as to progressively form an inwardly rolled bottom supporting bead.

When the bottom spinning operation has been completed, the cam roller 539 rolls off from the spiral section of the cam member 540 towards the depressed track section 540' thereof, permitting tension springs 549 associated with the spinning mechanism 500 to quickly retract the spinning head 551 from engagement with the bottom end of the container body, so that the container body and its associated supporting cell is free to advance to the container ejecting station H.

During the advance movement of the container and its supporting cell from the spinning station G to the ejecting station H, the cam roller 102 associated with the clamping device 70 of that supporting cell, rolls off from the maximum raised track section 97''' of the cam track 97 and onto the depressed track section 97' thereof, thereby retracting its clamping segments 85 from the container body. Thus when the container arrives at the ejecting station H, it freely seats within its cell cup 66, where it remains substantially unmolested during the first part of the residence interval at station H. However, during the second part of the residence interval, the master control valve 320 has been manipulated to permit the compressed air exhausted from the head end of the air cylinder 250 and from the air chamber 385 of the disc blanking and inserting mechanism 370, to flow into its air cup 360 and into the air cylinder 551 of the ejecting mechanism 550.

This exhaust air drives the piston plate 558 upwardly to upstroke the air tube 557 into the mouth end of the suspended container in residence at this station. During the initial upstroke movement of the air tube 557, the bumper block 567 associated therewith strikes the mouth end of the container so as to initially loosen the container from its seated position within its cell cup 66. Thereupon the exhaust compressed air flows from the air chamber 564 through the air tube 557 and into the container so as to thereby blow the container through the vertical section 571 of the air chute 570 and into the pocket section 576 thereof, from which point the container is further carried through the chute 577 by the air stream supplied by the blower 578.

During the next succeeding advanced interval, the empty cell 66 is advanced from the ejecting station H to residence position at the idling station I. No operations are performed in the machine illustrated in this application at the idling station. This idling station nevertheless provides an inspection point where the cell cup may be inspected to make sure that it is free of any paper waste and is in condition to be advanced to the loading station D'.

While the second machine section as illustrated in this application has a conveyor which carries a total of six container body receiving cells but has only five operating stations, it will be appreciated that the various operations performed at these five stations may be spread out and allocated to provide six or more active operating stations. It will also be appreciated that the second conveyor may be provided with any desired number of container body receiving cells and any desired complement of operating stations as production requirement may indicate.

This machine is admirably adapted for the manufacture of paper containers of difficult shape, such as paper containers which closely simulate the shape of glass bottles. In the illustrative embodiment as shown in this application, the mandrels associated with the first conveyor are designed to receive and wind a rectangular blank paired with an arcuate blank to provide a tubular bottle body having a cylindrical part and a truncated conical part of plural-ply material. It will be appreciated, however, that with an appropriate change in the shape of the mandrels, machines can be made in accordance with this invention for the manufacture of containers of various shapes, such as containers presenting container bodies of cylindrical form, or truncated conical form, or various other shapes, made from either one or more blanks of selected sheet material.

In the manufacture of the simpler form of sheet material containers, such as containers presenting cylindrical or truncated conical bodies, it will be appreciated that some of the operating stations associated with the second conveyor may be eliminated, and some of the forming mechanisms associated with these stations dispensed with. For example, if formed containers are to be made whose body parts are not to be fluted, or whose mouth parts are not to be shaped, the fluting and mouth shaping station and the mechanism associated therewith may be eliminated. Also, the shaping surfaces of the swedging anvil 150, anvil segments 260 and swedging segments 295 may be modified as desired to insure the production of mouth formations or body formations of almost any desired contour.

While the illustrated embodiment of the machine incorporates a first conveyor in the form of a rotatable mandrel supporting turret, and the second conveyor incorporates a rotatable cell supporting turntable structure, it will be appreciated that the body forming mandrels and the container body receiving cells may be associated with traveling conveyors of any desired form effective to convey and carry the respective mandrels and container body receiving cells to the appropriate operating stations. The selected conveyors are preferably driven in synchronism so as to simultaneously advance the respective mandrels and container supporting cells to the operating stations associated with the conveyors during the same advance interval, followed by residence at the respective operating stations during the same dwelling interval. The various forming mechanisms at the operating stations are also operated in synchronism during the dwelling interval so that the respective container forming operations are executed in proper timed relation.

Container making machines constructed in accordance with this invention are substantially automatic in operation throughout, are substantially foolproof in operation, and require little attention on the part of the operator. This improved machine is compactly designed to occupy a minimum of floor space, with the various parts thereof readily accessible for adjustment and repair. This improved machine may be constructed at a cost which will permit use thereof by product processors and manufacturers, permitting containers to be constructed at the premises, ready to receive the product contents. The containers can thus be manufactured and made by the product processor as conveniently needed for packaging purposes, thereby most effectively serving his production needs, and effecting substantial savings in transportation and storage of empty bulk containers as otherwise supplied.

While certain novel features of the invention have been disclosed herein, and are pointed out in the claims, it will be understood that various omissions, substitutions, modifications and changes may be made by those skilled in the art without departing from the principles of this invention.

What is claimed is:

1. A container body forming machine including in combination, a turntable member rotatable about a vertical axis, a series of container body supporting cells mounted on and arranged in spaced relationship around the perimeter of said turntable member, a plurality of operating stations arranged in spaced relationship around the perimeter of said turntable member, said operating stations being spaced in accordance with the spacing of said cells on said turntable member, mechanism at one of said stations to downwardly project container bodies successively into said supporting cells during residence of the latter at said one station with each container body being arranged with its base end uppermost, mechanism at a following station operative to flute a section of said container body as supported in its cell during residence at said fluting station and to simultaneously apply glue to the inside surface of the base end portion of the container body, mechanism at a following station for inserting a cup-shaped bottom forming member into the container body as supported in its cell during its residence at said inserting station with the side wall of said cup-shaped member contacting the glued surface of the container body, mechanism at a following station operative to roll together said side wall of the cup-shaped member and the adjacent base end portion of the container body to thereby form a rolled bead in the base end of the container body as supported by its cell during its residence at said spinning station, mechanism at a following station for ejecting the container from its cell during its residence at said ejecting station, and driving mechanism operative to rotate said turntable member and move said cells in stage-by-stage advance from and to residence position at said successive operating stations.

2. A container body forming machine including in combination, a rotatably mounted turntable having at least one body supporting cell mounted thereon adjacent the perimeter thereof, a body fluting and gluing station, a bottom inserting station, a bottom spinning station and a container ejecting station arranged in spaced relationship along the path of travel of said cell as defined by the rotation of said turntable, drive mechanism associated with said turntable operative to effect stage-by-stage advance of said cell from and to residence position at said successive operating stations, said drive mechanism including means for retaining the cell in dwelling position at each of said operating stations for a predetermined dwell interval, devices at said fluting and gluing station operating in synchronism with said turntable driving mechanism for fluting a section of the container body as supported in its cell during residence at said fluting station and for simultaneously applying glue to a circumferential portion of the inside surface of the container body adjacent the base end of the latter, devices at said inserting station operating in synchronism with said turntable driving mechanism for inserting a cup-shaped bottom forming member into the base end of the cell-supported container body during its residence at the winding station and in contact with the glued circumferential portion of the container body, devices at the spinning station operating in synchronism with said table driving mechanism to roll together the base end portion of the container and the side wall of the cup-shaped bottom for forming a rolled bead on the cell-supported container body during its residence at said spinning station, and devices at said ejecting station operating in synchronism with said turntable driving mechanism for ejecting the container from the cell during its residence at said ejecting station.

3. A container body forming machine according to claim 2, wherein each body supporting cell includes a receiving pocket for the container body, clamping mechanism associated with said cell cup operative to exert clamping pressure on the container body as pocketed in said cell cup, and means for manipulating said clamping mechanism into and out of clamping engagement with the container body pocketed in said cell cup, the last mentioned means being operative to manipulate said clamping mechanism into moderate clamping engagement with the container body during presence of the body supporting cell at said fluting and gluing station and at said bottom inserting station and into strong clamping engagement during presence of said cell at said spinning station and out of clamping engagement with the container body during movement of said cell from said spinning station past said ejecting station and to said fluting and gluing station.

4. An improved container body supporting cell including, a cell cup providing a receiving pocket for the container body, and clamping mechanism associated with said cell cup operative to exert clamping pressure on the container body as pocketed in said cell cup, said clamping mechanism including a plurality of radially movable clamping segments, a casing surrounding one end of said cell cup for containing said clamping segments, an actuating ring, and means for connecting said actuating ring to said clamping segments whereby clockwise and counter-clockwise rotative movement of said actuating ring will manipulate said clamping segments radially toward and radially away from the axis of said cell cup.

5. An improved container body supporting cell including, a cell cup providing a receiving pocket for the container body, and clamping mechanism associated with said cell cup operative to exert clamping pressure on the container body as pocketed in said cell cup, said clamping mechanism including a plurality of radially movable clamping segments, a casing surrounding one end of said cell cup for containing said clamping segments, means for guiding the radial movement of said clamping segments towards and away from the axis of said cell cup, an actuating ring, and means for connecting said actuating ring to said clamping segments whereby clockwise and counter-clockwise rotative movement of said actuating ring will manipulate said clamping segments radially toward and radially away from the axis of said cell cup.

6. An improved container body supporting cell including, a cell cup providing a receiving pocket for the container body, and clamping mechanism associated with said cell cup operative to exert clamping pressure on the container body as pocketed in said cell cup, said clamping mechanism including a plurality of radially movable clamping segments, an actuating ring, a casing surrounding one end of said cell cup for containing said clamping segments and actuating ring, a plurality of radial and chordal slide plates associated with said casing and actuating ring for guiding the radial movement of said clamping segments towards and away from the axis of said cell cup, and means for connecting said actuating ring, slide plates and clamping segments whereby clockwise and counter-clockwise rotative movement of said actuating ring will manipulate said clamping segments radially toward and radially away from the axis of said cell cup.

7. A container forming machine including in combination, a turntable member, a fixed pedestal for rotatably supporting said turntable member, a container body receiving cell supported by and positioned adjacent the perimeter of said turntable member, said container body receiving cell including a cell cup providing a receiving pocket for the container body, and clamping mechanism associated with said cell cup operative to exert clamping pressure on the container body as pocketed in said cell cup, said clamping mechanism including a plurality of movable clamping segments, an actuating ring, a casing surrounding one end of said cell cup for containing said clamping segments, an actuating ring, an actuating stem extending from said actuating ring, means for connecting said actuating ring and clamping segments whereby clockwise and counter-clockwise manipulation of said actuating stem will manipulate said clamping segments toward and away from the axis of said cell cup, a fixed cam member associated with said supporting pedestal, and means operatively connecting said actuating stem to said fixed cam member whereby said clamping segments are automatically manipulated into and out of clamping engagement with the container body during rotation of said turntable member through predetermined arcuate sectors.

8. A container forming machine including in combination, a turntable member, a fixed pedestal for rotatably supporting said turntable member, a plurality of container body receiving cells supported by and arranged in spaced relationship around the perimeter of said turntable member, each of said container body receiving cells including a cell cup providing a receiving pocket for the container body, and clamping mechanism associated with each of said cell cups operative to exert clamping pressure on the container body as pocketed in said cell cup, each of said clamping mechanisms including a plurality of radially movable clamping segments, an actuating ring, a casing surrounding one end of said cell cup for containing said clamping segments and actuating ring, a plurality of radially and chordal slide plates associated with said casing and actuating ring for guiding the radial movement of said clamping segment towards and away from the axis of the cell cup, an actuating stem extending from said actuating ring, means for connecting said actuating ring, slide plates and clamping segments whereby clockwise and counter-clockwise movement of said actuating stem will manipulate said clamping segments radially toward and radially away from the axis of said cell cup, a fixed cam member associated with said supporting pedestal, and means operatively connecting each of said actuating stems to said fixed cam member whereby said clamping segments are successively and automatically manipulated into and out of clamping engagement with the container bodies during rotation of said turntable member through predetermined arcuate sectors.

9. A container forming machine including in combination, a turntable member, a fixed pedestal for rotatably supporting said turntable member, a plurality of successive operating stations arranged in spaced relationship around the perimeter of said turntable member and including leading, fluting and gluing, bottom inserting, bottom spinning, and ejecting stations, a plurality of container body receiving cells supported by and arranged in spaced relationship around the perimeter of said turntable member, driving means operative to rotate said turntable member to advance said cells to and from residence position at said successive operating stations, clamping mechanism associated with each of said cells operative to exert clamping pressure on the container body, each of said clamping mechanisms including a plurality of radially moving clamping segments, a fixed cam member associated with said supporting pedestal, means opertaively connecting said clamping segments to said fixed cam member whereby to successively manipulate said clamping segments into and out of clamping engagement with the container bodies during rotation of said turntable member through predetermined arcuate sectors, said fixed cam member being formed to effect moderate clamping engagement during residence of each cell at said fluting and gluing station and said bottom inserting station, to effect strong clamping action during residence of the cell at the spinning station, and to manipulate the clamping segments out of clamping engagement during advance of the cell from said spinning station, past said ejecting and loading stations, to said fluting and gluing station.

10. Mechanism for fluting and mouth shaping a container body including in combination, means for supporting the container body at the outer surface of the latter, a swedging anvil designed to be telescoped axially into the container body to underlie a section of the latter, a plurality of expandable anvil segments each having a head portion adapted to be inserted into the mouth end of the container body, a plurality of swedging segments designed to enclose a said section of the container body, and means for simultaneously manipulating said swedging anvil, anvil segments and swedging segments into and out of forming engagement with the bottle body.

11. Mechanism for shaping a container body including in combination, means for supporting the container body, a plurality of anvil segments each having a head portion adapted to be inserted axially into the mouth end of the container body, resilient means for resiliently contracting said anvil segments radially toward the axis of said container body to permit insertion of the head portion thereof into the container body, and means for driving said head portions radially outwardly into shaping engagement with the inside face of the container body in response to axial movement of said segments into the mouth of the container body.

12. Mechanism for shaping a container body including in combination, means for supporting the container body, a plurality of anvil segments each having a head portion adapted to be inserted axially into the mouth end of the container body, resilient means for resiliently contracting said anvil segments radially toward the axis of said container body to permit insertion of the head portion thereof into the container body, a plurality of swedging segments designed to enclose an exterior section of the container body, and means for simultaneously manipulating said anvil segments and swedging segments into and out of forming engagement with the container body.

13. Mechanism for shaping a container body including in combination, means for supporting the container body at the outside of the latter, a swedging anvil designed to be telescoped axially into the container body, a plurality of anvil segments each having a head portion adapted to be inserted axially into the container body and into abutment against the swedging anvil inserted therein, resilient means for normally radially contracting said anvil segments to facilitate insertion of the head portions thereof into the container body, and means for forcibly expanding said anvil segments in the radial direction to press the head portions thereof into forming engagement with the inside surface of the container body.

14. Mechanism for shaping a container body including in combination, means for supporting the container body at the outside of the latter, a swedging anvil designed to be telescoped axially into the container body, a plurality of anvil segments each having a head portion adapted to be inserted axially into the container body and into abutment against the swedging anvil inserted therein, resilient means for normally radially contracting said anvil segments to facilitate insertion of the head portions thereof into the container body, a plurality of swedging segments designed to enclose an exterior section of the container body in the area occupied by the swedging anvil, and means for manipulating said swedging anvil, anvil segments and swedging segments in timed relation into and out of forming engagement with the container body.

15. Mechanism for shaping a container body including in combination, means for supporting the container body at the outside of the latter, a plurality of anvil segments each having a head portion adapted to be inserted axially into the container body, an axially reciprocating member for supporting said anvil segments, resilient means for contracting said anvil segments radially toward the axis of said container body to permit insertion of the head portions thereof into the container body, an arbor member having an end portion adapted to be projected into a conical bore defined by the inner surfaces of the anvil segments, means for reciprocating said anvil supporting member to move the head portions of said anvil segments axially into and out of the container body, and means for axially telescoping the end portion of said arbor member into the axial said conical bore defined by the inner surfaces of the assembled anvil segments to thereby radially drive the head portions thereof into forming engagement with the container body.

16. Mechanism for shaping a container body including in combination, means for supporting the container body at the outside of the latter, a plurality of anvil segments each having a head portion adapted to be axially inserted into the container body, an axially reciprocating member for supporting said anvil segments, resilient means for radially contracting said anvil segments toward the axis of said container body to permit insertion of the head portions thereof into the container body, an arbor member having a conical end portion adapted to be projected axially through a conical bore defined by the inner surfaces of the anvil segments, and means for repicrocating said anvil supporting member and said arbor member to thereby manipulate said anvil segments into and out of forming engagement with the container body.

17. Mechanism for shaping a container body including in combination, means for supporting the container body at the outside of the latter, a swedging anvil designed to telescope axially into the container body through one end thereof, a plurality of anvil segments each having a head portion designed to telescope axially into the container body through the other end thereof, a plurality of swedging segments designed to enclose an exterior section of the container body in the area occupied by the swedging anvil, means swingably supporting said swedging segments for movement into and out of forming engagement with the container body, and means for manipulating said swedging anvil, anvil segments and swedging segments in timed relation into and out of forming engagement with the container body.

18. Mechanism for shaping a container body including in combination, means for supporting the container body at the outside of the latter, an axially reciprocatable platform member, a support member resiliently supported on said platform member, a plurality of anvil segments resting on said support member, each of said anvil segments having a head portion designed to be telescoped axially into the container body, resilient means for normally contracting said anvil segments radially towards the axis of the container body to permit insertion of the head portions thereof into the container body, an arbor fixed to said platform member having a conical end portion designed to be inserted axially into a conical bore defined by the inner faces of the assembled anvil segments, an inner casing fixed to said support member designed to telescope over an exterior section of the container body, a plurality of swedging segments swingably supported in said inner casing, an outer guide casing fixed to said platform member and movable therewith, toggle elements extending through said inner casing and hingedly connecting each of said swedging segments to said outer guide casing, and means for reciprocating said platform member to manipulate said anvil segments and swedging segments into and out of forming engagement with the container body.

19. A container forming machine including in combination, a conveyor, a series of container body receiving cells mounted in spaced relationship on said conveyor to each support a container body at the outside of the latter and with its base end uppermost, a container forming station adjacent said conveyor, means for driving said conveyor to convey said body containing cells in stage-by-stage advance from and to residence position at said forming station, said forming station including a swedging anvil mounted above said conveyor and designed to telescope downwardly into the container body through the base end thereof, a plurality of expandible anvil segments positioned below said conveyor, each of said anvil segments having a head portion designed to telescope upwardly into the container body through the mouth end thereof, a plurality of swedging segments positioned below said conveyor and constructed and arranged to be raised to enclose an exterior section of the container body and to be radially contracted into forming engagement with the container body, and means for manipulating said swedging anvil, anvil segments and swedging segments in timed relation into and out of forming engagement with the container bodies as successively advanced to residence position at said forming station.

20. A container forming machine including in combination, a conveyor, a series of container body receiving cells mounted in spaced relationship on said conveyor, a series of operating stations arranged in spaced relationship along said conveyor including a glue applying station, a bottom inserting station and a bottom spinning station, means for driving said conveyor to convey said body containing cells in stage-by-stage advance from and to residence position at said successive stations, said glue applying station including a glue applicator device operative to apply a band of adhesive to the inside face of the container body adjacent one end thereof, said bottom inserting station including a bottom inserting device for inserting a cup-shaped bottom forming member into the container body with a side portion of said member in cementing contact with the adhesive band applied to the container body, said bottom spinning station including a spinning head, power means for rotating said spinning head, a mounting for said spinning head permitting axial manipulation of said spinning head into and out of spinning engagement with the end of the container body, said head being operative, when in spinning engagement with the container body, to roll together the contacting side portion of the cup-shaped member and end portion of the container body to thereby provide a rolled supporting bead at that end of the container body, and means for manipulating said glue applicator device, said bottom inserting device and said spinning head in timed relation during residence of the successive container bodies at said successive stations.

21. A container forming machine including in combination, a conveyor, a series of container body receiving cells mounted in spaced relationship on said conveyor, a series of operating stations arranged in spaced relationship along said conveyor including a loading station, fluting and gluing station, a bottom inserting station, a bottom spinning station and an ejecting station, means for driving said conveyor to convey said body containing cells in stage-by-stage advance from and to residence position at said successive stations, clamping mechanism associated with each of said cells operative to exert clamping pressure on the container body, and means associated with said conveyor for manipulating said clamping mechanisms into moderate clamping engagement with the successive container bodies as they successively advance to residence at said fluting and gluing station and said bottom inserting station and into strong clamping engagement with the successive bodies as they successively advance to said spinning station, said bottom inserting station including a bottom inserting device for inserting a bottom forming member into the container body, said spinning station including a spinning head fixed to one end of a rotatable shaft, power means for rotating said shaft, a mounting for said shaft whereby said spinning head may be manipulated into progressive spinning engagement with the bottom end of the container body as supported in its receiving cell, and means for manipulating said bottom inserting device and said spinning head shaft in timed relation during residence of the successive container bodies at said successive stations.

22. A container forming machine including in combination, a container body receiving cell, a device for inserting a flanged bottom forming member into the open bottom end of the container body, and spinning mechanism operative to roll the flange portion of said inserted bottom member and the adjacent end portion of said container body together to provide an inwardly rolled supporting bead, said spinning mechanism including a spinning head fixed to the end of a rotatable shaft, means for axially shifting said shaft to thereby axially advance said spinning head into progressive spinning engagement with the end portion of said container body and the adjacent flange portion of said bottom member as supported in said cell, said spinning head including a head block, and a plurality of spinning rollers rotatably mounted on said head block for rotation around axes substantially at right angles to the rotational axis of said rotatable shaft, each of said rollers having a bead forming groove in the periphery thereof.

23. A container forming machine including in combination, a container body receiving cell, a device for inserting a flanged bottom forming member into the open bottom end of the container body, and spinning mechanism operative to roll the flange portion of said inserted bottom member and the adjacent end portion of said container body together to provide an inwardly rolled supporting bead, said spinning mechanism including a spinning head fixed to the end of a rotatable shaft, means for axially shifting said shaft to thereby axially advance said spinning head into progressive spinning engagement with the end portion of said container body and the adjacent flange portion of said bottom member as supported in said cell, said spinning head including a head block, a plurality of spinning rollers, means for rotatably mounting each of said rollers on said head block for rotation about axes forming obtuse angles with the axis of said rotatable shaft, each of said rollers having a bead forming groove in the periphery thereof, each of said grooves presenting an inner face substantially parallel to the axis of the container body and outer face outwardly inclined with respect to the axis of the container body.

24. A container forming machine including in combination, a rotatably mounted turret having a series of body supporting mandrels mounted in radial spaced relationship, a plurality of operating stations including a winding station, a pressing station, a mouth spinning station and a stripping station arranged in spaced relationship along the orbital path of travel of said mandrels as defined by the rotation of said turret, driving mechanism associated with said turret operative to effect stage-by-stage advance of the mandrels supported thereon from and to residence position at said successive stations, a rotatably mounted turntable having a series of axially extending container body receiving cells arranged in spaced relationship around the periphery of said turntable, a series of operating stations arranged in spaced relationship adjacent the periphery of said turntable including a loading station, driving mechanism for rotating said turntable operative to effect stage-by-stage advance of the body receiving cells associated therewith from and to residence position at its successive stations, said turret driving mechanism and said turntable driving mechanism operating in synchronism and having means associated therewith for retaining said mandrels and said cells in dwelling position for a predetermined dwelling interval at the successive stations associated with said turret and said turntable respectively, said turret and turntable being mounted for rotation in right angularly related planes, said stripping station associated with said turret being positioned adjacent the loading station associated with said turntable, and stripping means operative to remove successive container bodies from their supporting mandrels during residence at the stripping station and to project the container bodies into said cells as said cells successively advance to residence position at said loading station.

25. A container forming machine including in combination, a turret mounted to rotate in a vertical plane, said turret having a series of body supporting mandrels mounted in radial spaced relationship, a plurality of operating stations including a stripping station arranged in spaced relationship along the orbital path of travel of said mandrels as defined by the rotation of said turret, driving mechanism associated with said turret operative to effect stage-by-stage advance of the mandrels supported thereon from and to residence position at said successive stations, a turntable mounted to rotate in a horizontal plane directly below said turret, said turntable having a series of axially extending container body receiving cells arranged in spaced relationship around the periphery thereof, a series of operating stations arranged in spaced relationship adjacent the periphery of said turntable including a loading station, driving mechanism for rotating said turntable operative to effect stage-by-stage advance of the body receiving cells associated therewith from and to residence position at its successive stations, said turret driving mechanism and said turntable driving mechanism operating in synchronism and having means associated therewith for retaining said mandrels and said cells in dwelling position for a predetermined dwelling interval at the successive stations associated with said turret and said turntable respectively, said stripping station associated with said turret being positioned adjacent the loading station associated with said turntable, and stripping means operative to remove successive container bodies from their supporting mandrels during residence at the stripping station and to project the container bodies into said cells as said cells successively advance to residence position at said loading station.

26. A container forming machine including in combination, a turret mounted to rotate in a vertical plane, said turret having a series of body supporting mandrels mounted in radial spaced relationship, a winding station, a pressing station, a spinning station and a stripping station arranged in spaced relationship along the orbital path of travel of said mandrels as defined by the rotation of said turret, driving mechanism associated with said turret operative to effect stage-by-stage advance of the mandrels supported thereon from and to residence position at said successive stations, a turntable mounted to rotate in a horizontal plane directly below said turret, said turntable having a series of container body receiving cells arranged in spaced relationship around the periphery thereof to follow a circular path tangential to the vertical plane of movement of said mandrels, a series of operating stations arranged in spaced relationship adjacent the periphery of said turntable including a loading station, driving mechanism for rotating said turntable and operative to effect stage-by-stage advance of the body receiving cells associated therewith from and to residence position at its successive stations, said turret driving mechanism and said turntable driving mechanism operating in synchronism and having means associated therewith for retaining said mandrels and said cells in dwelling position for a predetermined dwelling interval at the successive operating stations associated with said turret and said turntable respectively, said stripping station associated with said turret being positioned in axial alignment with the loading station associated with said turntable, and stripping means operative to remove successive container bodies from their supporting mandrels during residence at the stripping station and to project the container bodies into said cells as said cells successively advance to residence position at said loading station.

27. A container forming machine including in combination, a turret mounted to rotate in a vertical plane, said turret having a series of body supporting mandrels mounted in radial spaced relationship, a winding station, a pressing station, a spinning station and a stripping station arranged in spaced relationship along the orbital path of travel of said mandrels as defined by the rotation of said turret, driving mechanism associated with said turret operative to effect stage-by-stage advance of the mandrels supported thereon from and to residence position at said successive stations, a turntable mounted to rotate in a horizontal plane directly below said turret, said turntable having a series of container body receiving cells arranged in spaced relationship around the periphery thereof to follow a circular path having the vertical plane of movement of said mandrels tangential thereto, a series of operating stations arranged in spaced relationship adjacent the periphery of said turntable including a loading station, a container body swedging and glue applying station, a bottom inserting station, a bottom spinning station and an unloading station, driving mechanism for rotating said turntable and operative to effect stage-by-stage advance of the body receiving cells associated therewith from and to residence position at its successive stations, said turret driving mechanism and said turntable driving mechanism operating in synchronism and having means associated therewith for retaining said mandrels and said cells in dwelling position for a predetermined dwelling interval at the successive operating stations associated with said turret and said turntable respectively, said stripping station associated with said turret being positioned in axial alignment with the loading station associated with said turntable, and stripping means operative to remove successive container bodies from their supporting mandrels during residence at the stripping station and to project the container bodies into said cells as said cells successively advance to residence position at said loading station.

28. A container forming machine including in combination, a conveyor, a plurality of container body receiving cells supported in spaced relationship on said conveyor, a plurality of successive operating stations arranged in spaced relationship along the path of travel of said conveyor including a body shaping station, a bottom inserting station and a container ejecting station, conveyor driving means operative to successively advance said cells to and from residence position at said successive operating stations, means associated with said driving mechanism for retaining said cells in dwelling position for a predetermined dwelling interval at said successive operating stations, said body shaping station including a pneumatically operated body shaping device movable into and out of shaping engagement with the container body in residence at said station, said bottom inserting station including a pneumatically operated device for inserting a bottom forming member into the container body in residence at said station, said ejecting station including a pneumatically operated device emitting compressed air in a stream directed against the container at the ejecting station for removing the container from its supporting cell in residence at said station, a master control valve operably connected to said body shaping device, bottom inserting device and container ejecting device for controlling the supply of compressed air to said devices, and automatic means operably connected to said conveyor driving mechanism for manipulating said master control valve during said residence interval in a manner to move said body shaping device into shaping engagement with the container body and move said bottom inserting device into bottom inserting position and thereafter to retract said body shaping device from the container body and move said ejecting device into container removing position.

29. A container forming machine including in combination, a conveyor, a plurality of container body receiving cells suported in spaced relationship on said conveyor, a plurality of successive operating stations arranged in spaced relationship along the path of travel of said conveyor including a bottom blanking and inserting station, conveyor driving mechanism operative to successively advance said cells to and from residence position at said successive operating stations, means associated with said driving mechanism for retaining said cells in dwelling position for a predetermined dwelling interval at said successive operating stations, said bottom blanking and inserting station including a pneumatically operated device for blanking and inserting a bottom forming member into the container body in residence at said station, a device for automatically advancing successive sections of a material strip into blanking position at said bottom blanking and inserting station, and means for controlling the operation of said strip advancing device in accordance with the movement of said bottom blanking and inserting device, an air control valve operably connected to said bottom blanking and inserting device, and automatic means for manipulating said control valve to halt the operation of said bottom blanking and inserting device in the event a body empty cell should arrive in residence position at said station, said automatic means including a feeler device adjacent said bottom blanking and inserting station operative to indicate the non-presence or presence of a container body in residence at said station, and electrical means operably connecting said feeler device and control valve and operative to manipulate said control valve in accordance with the indications provided by said feeler device.

30. A container forming machine including in combination a turret mounted to rotate in a vertical plane, said turret having a series of body suporting mandrels mounted in radial spaced relationship thereon, a plurality of operating stations including a stripping station arranged in spaced relationship along the orbital path of travel of said mandrels as defined by the rotation of said turret, said stripping station being disposed at the bottom of said orbital path of travel of said mandrels, driving mechanism associated with said turret operative to effect stage-by-stage advance of said mandrels from and to residence at the successive operating stations, a turntable mounted to rotate in a horizontal plane directly below said turret, said turntable having a series of upwardly opening container body receiving cells arranged in spaced relationship around the peripheral portion thereof to travel along a circular path having the vertical plane of movement of said mandrels tangential thereto, a series of operating stations arranged in spaced relationship along the circular path of travel of said cells as defined by rotation of said turntable and including a loading station axially aligned with said stripping station, driving mechanism for rotating said turntable operative to effect stage-by-stage advance of said cells from and to residence position at the successive operating stations associated with said turntable, said turret driving mechanism and said turntable driving mechanism operating in synchronism to simultaneously position successive mandrels and cells in residence position at said stripping station and said loading station, respectively, and having means associated therewith for retaining said mandrels and said cells in dwelling position for a predetermined dwelling interval at the successive stations associated with said turret and said turntable, respectively, and stripping means at said stripping station operative to remove successive container bodies downwardly from their supporting mandrels during residence at said stripping station and to extend the successively removed bodies downwardly into said cells simultaneously advanced to residence position at said loading station.

31. A container forming machine including in combination, a conveyor, a series of container body receiving cells mounted in spaced relationship on said conveyor to each support a container body at the outside of the latter and with its base end uppermost, a container forming and gluing station adjacent said conveyor, means for driving said conveyor to convey said cells in stage-by-stage advance from and to residence position at said forming and gluing station, and mechanisms at said station including a swedging anvil mounted above said conveyor to telescope downwardly into the container body through the base end thereof, glue applicator means movable in response to displacement of said swedging anvil between a raised glue receiving position and a lowered position extending into the base end of the container body at said station, said glue applicator means being operative in said lowered position to apply a circumferential band of glue to the interior surface of the container body adjacent the base end of the latter, a plurality of radially expandible anvil segments positioned below said conveyor and having head portions formed to telescope upwardly into the container body through the mouth end of the latter, a plurality of swedging segments positioned below said conveyor and mounted to be raised to enclose the section occupied by said swedging anvil and then radially contracted into forming engagement with the container body, and means for manipulating said swedging anvil, anvil segments and swedging segments in timed relation into and out of forming engagement with the container bodies as successively advanced to residence position at said forming station.

32. A container forming machine according to claim 31; wherein said glue applicator means includes a flexible circular applicator member, means for radially expanding said applicator member at said raised and lowered positions and for radially contracting said applicator member during movement between said positions, and glue delivering means adjacent said raised position operative to there deliver glue to the periphery of said circular applicator member when the latter is radially expanded.

33. A container forming machine according to claim 32; wherein circular applicator member is rotatable, and including means operative, when said applicator means is in its raised position, to rotate said applicator member so that the glue delivered to the periphery of the latter is distributed along the entire circumference of said periphery.

BRUNO A. WITTKUHNS.
H. GEORGE D. NUTTING.
GILBERT F. HILL.

References Cited in the file of this patent

UNITED STATES PATENTS

| Number | Name | Date |
|---|---|---|
| 1,113,217 | House | Oct. 13, 1914 |
| 1,193,574 | Luellen | Aug. 8, 1916 |
| 1,199,160 | Cooley | Sept. 26, 1916 |
| 1,471,225 | Weis | Oct. 16, 1923 |
| 1,511,693 | Webber | Oct. 14, 1924 |
| 1,876,931 | Heywood | Sept. 13, 1932 |
| 1,913,212 | Ristow | June 6, 1933 |
| 1,917,374 | Jones | July 11, 1933 |
| 1,957,470 | Milmoe | May 8, 1934 |
| 1,962,983 | Cooley | June 12, 1934 |
| 2,022,309 | Bodor | Nov. 26, 1935 |
| 2,027,484 | Koch | Jan. 14, 1936 |
| 2,066,130 | Hofe | Dec. 29, 1936 |
| 2,135,219 | Reifsnyder | Nov. 1, 1938 |
| 2,423,486 | Cutler | July 8, 1947 |
| 2,441,525 | Zesbaugh | May 11, 1948 |